(12) United States Patent
Solomon et al.

(10) Patent No.: US 8,696,987 B2
(45) Date of Patent: Apr. 15, 2014

(54) METHOD FOR CONTROLLING WATER EVAPORATION

(75) Inventors: David Henry Solomon, Murrumbeena (AU); Emma Louise Prime, Melbourne (AU); Devi Sunartio, Clifton Hill (AU); Greg Guanghua Qiao, Doncaster East (AU); Ian Dagley, Lower Templestowe (AU); Anton Blencowe, Abbotsford (AU)

(73) Assignee: Polymers CRC Ltd, Notting Hill, Victoria (AU)

( * ) Notice: Subject to any disclaimer, the term of this patent is extended or adjusted under 35 U.S.C. 154(b) by 349 days.

(21) Appl. No.: 13/141,568

(22) PCT Filed: Dec. 22, 2009

(86) PCT No.: PCT/AU2009/001684
§ 371 (c)(1),
(2), (4) Date: Oct. 7, 2011

(87) PCT Pub. No.: WO2010/071931
PCT Pub. Date: Jul. 1, 2010

(65) Prior Publication Data
US 2012/0018387 A1  Jan. 26, 2012

(30) Foreign Application Priority Data

Dec. 22, 2008  (AU) .................... 2008906587
Dec. 22, 2008  (AU) .................... 2008906588

(51) Int. Cl.
*B01J 19/00*  (2006.01)

(52) U.S. Cl.
USPC ............... 422/43; 422/40; 422/41; 422/42

(58) Field of Classification Search
USPC ........................... 422/43, 40, 41, 42
See application file for complete search history.

(56) References Cited

U.S. PATENT DOCUMENTS

| 3,199,944 A | * | 8/1965 | Gabor et al. ............. 422/40 |
| 3,273,957 A | * | 9/1966 | Beredjick ............. 422/43 |
| 3,285,692 A | * | 11/1966 | Robertson ............. 241/55 |
| 3,425,791 A | * | 2/1969 | Koberg ............. 422/43 |
| 3,650,980 A | * | 3/1972 | Gothel et al. ............. 252/384 |
| 4,147,658 A | | 4/1979 | Savoit et al. |
| 2007/0152190 A1 | | 7/2007 | Borish et al. |

FOREIGN PATENT DOCUMENTS

EP  0797615 B1  1/1999
WO  2008/014566 A1  2/2008

OTHER PUBLICATIONS

International Search Report for PCT/AU2009/001684, mailed Mar. 9, 2010.

* cited by examiner

*Primary Examiner* — Regina M Yoo
(74) *Attorney, Agent, or Firm* — LeClairRyan, a Professional Corporation

(57) ABSTRACT

The present invention relates to a method for controlling evaporation from a body of water. The method of the invention uses a water insoluble compound and a water soluble polymer, which interact with each other by non-covalent bonding interactions.

20 Claims, 14 Drawing Sheets

METHOD FOR CONTROLLING WATER EVAPORATION

This application is a national stage application under 35 U.S.C. §371 from PCT Application No. PCT/AU2009/001684, filed Dec. 22, 2009, which claims the priority benefit of Australian Application Nos. 2008906587, filed Dec. 22, 2008 and 2008906588, filed Dec. 22, 2008.

FIELD OF THE INVENTION

The present invention relates to a method for controlling evaporation from a body of water.

BACKGROUND

The need to conserve water is important in many areas. For example, areas that are generally hot, which receive little annual rainfall or little seasonal rainfall or which are subject to periodic droughts and water shortages can suffer from a lack of sufficient water. The lack of water can restrict the ability to provide for purposes such as drinking, domestic or industrial use or agricultural use such as crop irrigation and for other needs.

The storage of water in tanks, dams and reservoirs is one way of ensuring that sufficient water reserves are available for domestic, industrial and agricultural use. However, the evaporation of water from these bodies of water can result in significant losses of critical water resources. In some instances, annual losses of water by evaporation from storage dams can exceed 50% of the water volume.

In an attempt to reduce water evaporation, physical covers that float on the surface of a body of water have been used. However, a problem with such covers is that they are not practical for large volumes of water such as reservoirs and large dams.

In other attempts to reduce water evaporation the formation of thin films or monolayer structures on the surface of water bodies has been described. Such films or monolayers can reduce the rate of water loss to the surrounding atmosphere by creating a barrier between the water body and the atmosphere.

Layer structures such as monolayers can be formed from molecules that possess a polar hydrophilic head group and a non-polar hydrophobic tail. These molecules can align themselves at an air-water interface and self-assemble to ideally form a one-molecule thick layer on the surface of a body of water.

A problem with many monolayer structures however is they do not persist on the surface of the body of water for more than a couple of days. As a result, frequent re-application of the monolayer to the water body is required in order to provide effective evaporation control over a period of time. In addition, the lack of stability of many monolayer structures against wind disruption is also an issue which limits their usefulness in many circumstances.

It would be desirable to address some or all of the problems of the prior art and to provide an effective method for controlling water evaporation.

A reference herein to a patent document or other matter which is given as prior art is not to be taken as an admission that the document or matter was known or that the information it contains was part of the common general knowledge as at the priority date of any of the claims.

Where the terms "comprise", "comprises", "comprised" or "comprising" are used in the specification (including the claims) they are to be interpreted as specifying the presence of the stated features, integers, steps or components, but not precluding the presence of one or more other features, integers, steps or components, or group thereof.

SUMMARY

In one aspect, the present invention provides a method for controlling evaporation from a body of water including applying a water insoluble compound and a water soluble polymer to the body of water, wherein the water insoluble compound assembles to form a layer at the surface of the body of water, and wherein the water soluble polymer interacts with the water insoluble compound by non-covalent bonding interactions.

In another aspect, the present invention provides a method for controlling evaporation from a body of water including applying a water insoluble compound and a water soluble polymer including at least one polymer selected from the group consisting of (i) carbonyl polymers including at least one functional group having a carbonyl moiety and (ii) non-carbonyl polymers having a molecular weight of at least about 5000 to the body of water,
    wherein the water insoluble compound assembles to form a layer at the surface of the body of water and the water soluble polymer is adapted to interact with the water insoluble compound by non-covalent bonding interactions, and
    wherein the water soluble polymer includes less than 10% (w/w) of water soluble ionized polymers.

In another aspect, the present invention provides a system for controlling the air-water interface of a body of water, the system including a layer formed from the assembly of a water insoluble compound and a water soluble polymer, wherein the water soluble polymer interacts with the water insoluble compound of the layer by non-covalent bonding interactions and includes at least one polymer selected from the group consisting of (i) carbonyl polymers including at least one carbonyl functional group and (ii) non-carbonyl polymers having a molecular weight of at least about 5000, and wherein the water soluble polymer further includes less than 10% (w/w) of water soluble ionized polymers.

In some embodiments the water soluble polymer includes a carbonyl polymer including at least one functional group selected from the group consisting of carboxylic acid, ketone, aldehyde, ester and amide functional groups.

In some embodiments the water soluble polymer includes a non-carbonyl polymer including at least one functional group selected from the group consisting of alcohol, ether, amine, imine and thiol functional groups.

In some embodiments the water soluble polymer includes a mixture of (i) at least one carbonyl polymer including at least one functional group having a carbonyl moiety and (ii) at least one non-carbonyl polymer having a molecular weight of at least about 5000, wherein the mixture includes less than 10% (w/w) of water soluble ionized polymers.

In some embodiments the water soluble polymer includes a non-carbonyl polymer having a molecular weight of at least about 10,000, preferably at least about 100,000.

In some embodiments of the invention the water insoluble compound includes at least one functional group selected from the group consisting of alcohol, carboxylic acid, ketone, aldehyde, ester, ether, amine, amide, sulfone, sulfonic acid, sulfoxide, thiol, phosphonic acid and phosphate functional groups and a corresponding anion, cation or salt thereof, and wherein the functional group of the water insoluble compound is adapted to interact with the water soluble polymer by non-covalent bonding interactions.

In some specific embodiments the water insoluble compound may include at least one functional group selected from the group consisting of an alcohol and an ether and the water soluble polymer includes at least one carbonyl polymer including at least one functional group selected from the group consisting of a carboxylic acid and an amide functional group.

In some specific embodiments the water insoluble compound may include at least one functional group selected from the group consisting of a carboxylic acid and an amide functional group and the water soluble polymer includes at least one non-carbonyl polymer including a functional group selected from the group consisting of an alcohol and an ether.

In some specific embodiments the water soluble polymer may include a homopolymer or copolymer derived from at least one compound selected from the group consisting of acrylic acid, methacrylic acid, acrylamide, N-alkyl acrylamide, glycerol, ethyleneimine, ethylene oxide, vinyl pyrrolidone, vinyl acetate, the hydrolysis products of vinyl acetate, 2-hydroxyethyl acrylate, maleic acid, maleic anhydride and dimethylaminoethylacrylate.

In embodiments of the invention the water soluble polymer may include at least one polymer selected from:
(i) carbonyl polymers selected from the group consisting of poly(acrylic acid), poly(methacrylic acid), poly(acrylic acid-co-methacrylic acid), copolymers of maleic acid, poly(acrylamide), poly(acrylamide-co-acrylic acid), poly(vinyl pyrrolidone), poly(N-alkylacrylamide), poly(N-alkylmethacrylamide) and poly(dimethylaminoethylacrylate); and
(ii) non-carbonyl polymers selected from the group consisting of poly(glycerol), poly(ethyleneimine), poly(ethylene glycol) and poly(vinyl alcohol).

In embodiments of the invention the water insoluble compound is at least one selected from the group consisting of fatty acids, fatty alcohols, fatty amides and alkyleneglycol monoethers of a fatty alcohol.

In some embodiments the water insoluble compound is of Formula (I):

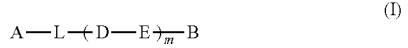

where
A is a hydrophobic moiety including at least 12 carbon atoms;
L is selected from the group consisting of a bond, O, NR, S, COO, OCO, COS, SCO, S=O, $SO_2$, $O_2P(=O)(OH)$, NRCO, CONR, O(C=O)NR, NR(C=O)O and NR(C=O)NR;
D is an alkylene including at least one carbon atom;
E is selected from the group consisting of a bond, O, $NR^1$, S, COO, OCO, COS, SCO, S=O, $SO_2$, $O_2P(=O)(OH)$, $NR^1CO$, $CONR^1$, $O(C=O)NR^1$, $NR^1(C=O)O$ and $NR^1(C=O)NR^1$;
R at each occurrence is independently selected from the group consisting of H, $C_1$ to $C_4$ alkyl and the group -(D-E)$_m$-B;
$R^1$ is selected from the group consisting of H and $C_1$ to $C_4$ alkyl;
B is selected from the group consisting of hydrogen, $C_1$ to $C_4$ alkyl and a hydrophilic moiety including at least one hydrophilic functional group; and
m is 0, 1, 2, 3 or 4.

In some specific embodiments the water insoluble compound is selected from the group consisting of cetyl alcohol, stearyl alcohol, arachidyl alcohol, behenyl alcohol, ethylene glycol monocetyl ether, ethylene glycol monostearyl ether, ethylene glycol monoarachidyl ether, ethylene glycol monobehenyl ether and mixtures thereof.

In some embodiments, the method and system of the invention may also include an operative moiety. The operative moiety may be selected from the group consisting of a radiation absorbing moiety, a radiation reflecting moiety, a biologically active moiety, a crosslinking moiety and a sensor moiety.

In some embodiments, the method and system of the invention may also include a crosslinking agent. The crosslinking agent enables the water soluble polymer and the water insoluble compound to interact by providing associations between the water soluble polymer and the water insoluble compound via non-covalent bonding interactions. In some embodiments, the crosslinking agent enables the water soluble polymer and the water insoluble compound to interact by providing associations between the water soluble polymer and the water insoluble compound via hydrogen bonds or ionic bonds.

In some embodiments, the crosslinking agent may include two or more functional groups adapted to interact with the water soluble polymer and the water insoluble compound, wherein the functional groups of the crosslinking agent are each independently selected from the group consisting of alcohol, carboxylic acid, ketone, aldehyde, ester, ether, amine, amide, sulfone, sulfonic acid, sulfoxide, thiol, phosphonic acid, phosphate and a corresponding anion, cation or salt thereof.

DETAILED DESCRIPTION

Figure 1:
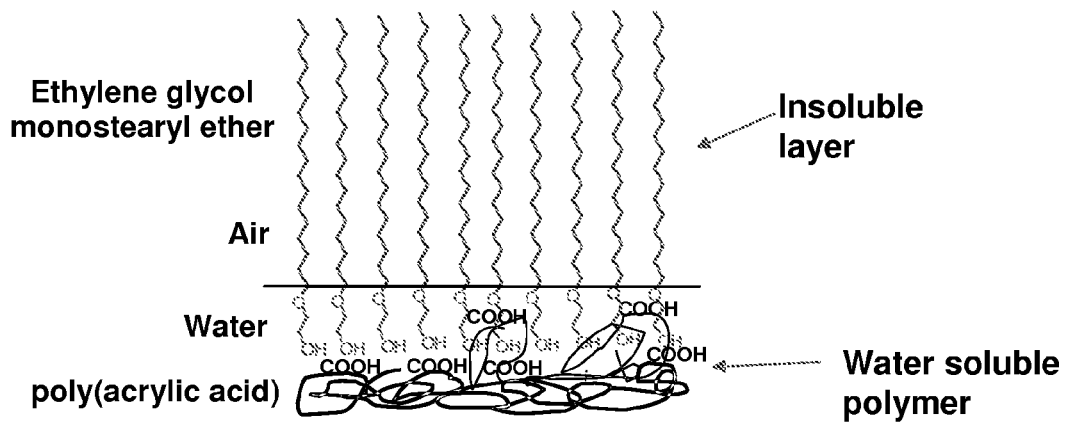
FIG. 1 is an illustration showing the interaction of a layer formed from a water insoluble compound with a water soluble polymer in accordance with one embodiment of the invention.

Various terms that will be used throughout the specification have meanings that will be well understood by a skilled addressee. However, for ease of reference some of these terms will now be defined.

As used herein, "non-covalent bonding interaction" refers to a bonding interaction that does not involve a covalent bonding link. A number of non-covalent bonding interactions exist and examples include hydrogen bonds, ionic interactions, electrostatic interactions, van der Waals interactions, charge transfer interactions, complexation, and hydrophobic interactions. An exemplary non-covalent bonding interaction is hydrogen bonding.

As used herein, "hydrogen bonding" refers to a non-covalent bonding interaction that occurs between an electronegative atom (such as nitrogen, oxygen or fluorine) and a hydrogen atom that is activated for hydrogen bonding, generally as a result of the hydrogen atom being covalently bonded to another electronegative atom. The hydrogen atom may act as a hydrogen bond donor while the electronegative atom may act as a hydrogen bond acceptor, allowing the formation of a hydrogen bond therebetween.

As used herein, the term "water insoluble compound" refers to a molecule that is substantially incompatible with an aqueous medium. A determination of water insolubility may involve an investigation of the extent in which the compound is able to be dissolved in an aqueous medium.

As used herein, the term "water soluble" when used in relation to polymers refers to macromolecular compounds that are capable of being solvated by, and mixed into or dissolved in an aqueous medium. Thus, water soluble polymers are able to form a solution in an aqueous medium that is free of insoluble polymer particles. The determination of a solution that is free of insoluble polymer particles may be made using conventional light scattering techniques or turbidity measurements. Reference texts such as the Concise Encyclopedia of Polymer Science and Engineering, 1990, edited by J. I. Kroschwitz also describe a range of water soluble polymers, which include naturally occurring polymers and synthetic polymers.

As used herein, the term "functional group" refers to a group of atoms that confer a particular chemical property to a compound. Examples of functional groups include the hydroxyl and carboxyl functional groups of alcohols and organic acids, respectively.

As used herein, the term "carbonyl polymer" refers to a macromolecular compound including at least one functional group having a carbonyl moiety. Functional groups having a carbonyl moiety are also described herein as carbonyl functional groups. Examples of carbonyl functional groups include carboxylic acid, ketone, aldehyde, ester and amide functional groups.

As used herein, the term "non-carbonyl polymer" refers to a macromolecular compound including one or more functional groups, where the functional groups in the polymer are each non-carbonyl functional groups. Non-carbonyl functional groups are functional groups that do not contain a carbonyl moiety. Examples of non-carbonyl functional groups include hydroxyl (—OH), amine (including primary, secondary or tertiary amine), ether and thiol functional groups.

As used herein, the term "water soluble ionized polymer" refers to a macromolecular compound having at least one functional group that exists in an ionized state at neutral pH (pH of approximately 7). Ionized polymers may have anionic, cationic or zwitterionic character at neutral pH.

As used herein, the term "alkyl" includes linear and branched saturated hydrocarbon alkyl.

As used herein, the term "operative moiety" refers to a moiety which imparts additional utility to the system of the invention, as compared to a system without the operative moiety.

As used herein, a reference to polymer molecular weight will be understood to be a reference to weight average molecular weight, unless otherwise indicated.

The present invention relates in one aspect to a method for controlling evaporation from bodies of water.

In one aspect, the present invention provides a method for controlling evaporation from a body of water including applying a water insoluble compound and a water soluble polymer including at least one polymer selected from the group consisting of (i) carbonyl polymers including at least one functional group having a carbonyl moiety and (ii) non-carbonyl polymers having a molecular weight of at least about 5000 to the body of water, wherein the water insoluble compound assembles to form a layer at the surface of the body of water and the water soluble polymer is adapted to interact with the water insoluble compound by non-covalent bonding interactions, and wherein the water soluble polymer includes less than 10% (w/w) of water soluble ionized polymers.

A method of controlling evaporation in accordance with one aspect of the invention involves the use of at least one water insoluble compound and at least one water soluble polymer. In accordance with the method of the invention, the water insoluble compound and water soluble polymer are applied to a body of water and after application, each become located at the surface of the body of water. The water insoluble compound spreads across the surface of the water body and assembles to form a layer or film at the air-water interface of the water body.

The layer is a substantially water impermeable film that is located at the surface of the body of water. The layer can be a generally thin film that is spread across the surface of the aqueous subphase. In some embodiments, the layer may be a monolayer that is from one to five molecules thick. In some embodiments, the monolayer is one-molecule thick.

The water soluble polymer employed in the method of the invention is adapted to interact with the water insoluble compound by non-covalent bonding interactions, such as electrostatic, van der Waals and hydrogen bonding interactions. The water soluble polymer may be adapted to interact with the water insoluble compound by more than one type of non-covalent bonding interaction. In specific embodiments, the water soluble polymer is adapted to interact with the water insoluble compound by hydrogen bonding interactions. The water soluble polymer and the water insoluble compound may each include functional groups which are able to associate via hydrogen bonds.

It is an advantage of the invention that the non-covalent bonding interaction between the water soluble polymer and the water insoluble compound contributes to the effectiveness of the invention in controlling evaporation from bodies of water. Without wishing to be limited by theory, it is believed that association of the water insoluble compound with the water soluble polymer assists in reducing the susceptibility of loss of the layer structure due to the disruptive action of wind or other forces.

The water insoluble compound employed in the method of the invention may include at least one functional group that is capable of participating in non-covalent bonding interactions such as hydrogen bonding interactions. In some embodiments, the water insoluble compound may include two or more functional groups. In some embodiments, the water insoluble compound includes at least one functional group selected from the group consisting alcohol, carboxylic acid, ketone, aldehyde, ester, ether, amine, amide, sulfone, sulfonic acid, sulfoxide, thiol, phosphonic acid and phosphate functional groups. Corresponding anions, cations or salts of any one of the aforementioned functional groups may also be included. In some specific embodiments, the water insoluble compound includes at least one functional group selected from the group consisting of alcohol, carboxylic acid and ether functional groups. In some specific embodiments, the water insoluble compound includes an alcohol (hydroxyl) and an ether functional group.

The water soluble polymer employed in the method of the invention includes at least one polymer including at least one functional group. The functional group of the polymer is adapted to participate in non-covalent bonding interactions, such as hydrogen bonding. More typically, the water soluble polymer includes a plurality of functional groups adapted to participate in non-covalent bonding interactions. In some embodiments, the water soluble polymer includes 2 or more, 3 or more, 4 or more, or 5 or more functional groups adapted to participate in non-covalent bonding interactions.

It would be appreciated by one skilled in the art that polymers are formed when appropriate monomer compounds are polymerised. Thus, when a monomer compound including a functional group is reacted under polymerisation conditions, a plurality of functional groups is introduced into the resulting polymer. The plurality of functional groups present in the water soluble polymer may each be of the same type. Alternatively, the plurality of functional groups in the water soluble polymer may include a mixture of different types of functional groups. A person skilled in the art would understand that the types of functional group present in the polymer may depend on the nature of the monomer compounds used to form the polymer.

In some embodiments, the water soluble polymer may include at least one polymer including a functional group selected from the group consisting of alcohol, carboxylic acid, ketone, aldehyde, ester, ether, amine, amide and thiol functional groups.

In one aspect of the method of the invention the water soluble polymer includes at least one polymer selected from the group consisting of (i) carbonyl polymers including at least one functional group having a carbonyl moiety and (ii) non-carbonyl polymers having a molecular weight of at least about 5000.

In some embodiments the water soluble polymer includes a carbonyl polymer. Carbonyl polymers as defined herein are water soluble macromolecular compounds including at least one carbonyl functional group. The carbonyl functional group contains a carbonyl moiety. Examples of carbonyl containing functional groups include carboxylic acid, ketone, aldehyde, ester and amide functional groups. Carbonyl polymers used in the method of the invention include at least one carbonyl functional group and may include a plurality of carbonyl functional groups. In some embodiments carbonyl polymers used in the method of the invention include 2 or more, 3 or more, 4 or more, or 5 or more carbonyl functional groups. Where a plurality of carbonyl functional groups are present, they may each be of the same type or they may be a mixture of two or more different types of carbonyl functional groups, such as for example, a mixture of carboxylic acid and amide functional groups.

In some embodiments the water soluble polymer includes a non-carbonyl polymer having a molecular weight of at least 5000. Non-carbonyl polymers as defined herein are water soluble polymeric compounds including at least one functional group, where the functional groups are each non-carbonyl. Examples of non-carbonyl functional groups include alcohol, ether, amine, imine and thiol functional groups. Non-carbonyl polymers employed in the method of the invention include at least one non-carbonyl functional group and may include a plurality of non-carbonyl functional groups. In some embodiments, non-carbonyl polymers employed in the method of the invention include 2 or more, 3 or more, 4 or more, or 5 or more non-carbonyl functional groups. Where a plurality of non-carbonyl functional groups are present, they may each be of the same type or they may be a mixture of two or more different types of non-carbonyl functional groups, such as for example, a mixture of alcohol (hydroxyl) and ether functional groups.

In some embodiments the water soluble polymer may include a mixture of two or more polymers, such as two or more carbonyl polymers or two or more non-carbonyl polymers. In other embodiments the water soluble polymer may include a mixture of (i) at least one carbonyl polymer including a carbonyl functional group and (ii) at least one non-carbonyl polymer having a molecular weight of at least about 5000.

In some embodiments of the invention, functional groups present on the water insoluble compound and the water soluble polymer are selected from those that are capable of participating in non-covalent bonding interactions with one another. Some examples of functional groups that may be present on the water insoluble compound and the water soluble polymer and which are able to associate by non-covalent interactions such as hydrogen bonds are shown in Table 1:

TABLE 1

Examples of functional groups

| Functional group of water insoluble compound | Functional group of water soluble polymer |
|---|---|
| Alcohol | Carboxylic acid |
| Ether | Carboxylic acid |
| Amide | Carboxylic acid |
| Amine | Carboxylic acid |
| Carboxylic acid | Alcohol |
| Carboxylic acid | Ether |
| Carboxylic acid | Amine |
| Carboxylic acid | Amide |
| Quaternary ammonium | Carboxylic acid |
| Alcohol | Amide |
| Ether | Amide |

It would be appreciated by one skilled in the art that the order of the functional groups of the water insoluble compound and the water soluble polymer may in some instances also be reversed. That is, for example, in some embodiments, the water insoluble compound may include a carboxylic acid functional group while the water soluble polymer may include a polymer including a functional group selected from the group consisting of alcohol, ether, amine and amide functional groups.

When the water soluble polymer or water insoluble compound includes an amine functional group, the amine may be a primary, secondary or tertiary amine.

When the water soluble polymer or water insoluble compound includes an amide functional group, the amide may be an unsubstituted amide, an N-alkyl substituted amide, an N-aryl substituted amide or a cyclic amide, such as a lactam.

When the water insoluble compound includes an amine functional group, the primary, secondary or tertiary amine group may be protonated to form an ammonium group. In some embodiments, the ammonium group may be a quaternary ammonium functional group. In the quaternary ammonium group, the nitrogen may be substituted with linear or branched alkyl groups. Typical linear or branched alkyl groups include methyl, ethyl, n-propyl, i-propyl, n-butyl, i-butyl and t-butyl. Two of the alkyl groups may be linked together to form a cyclic structure.

In some embodiments, when the water insoluble compound includes at least one functional group selected from the group consisting of an alcohol and an ether functional group then the water soluble polymer includes at least one carbonyl polymer including at least one functional group selected from the group consisting of a carboxylic acid and an amide functional group.

In other embodiments, when the water insoluble compound includes at least one functional group selected from the group consisting of an carboxylic acid and an amide functional group then the water soluble polymer includes at least one non-carbonyl polymer including at least one functional group selected from the group consisting of an alcohol and an ether functional group. Carboxylic acid and amide functional groups are believed to be able to associate with alcohol and/or ether functional groups by hydrogen bonding interactions.

Water soluble carbonyl polymers and non-carbonyl polymers used in embodiments of the invention may be homopolymers or copolymers. The homopolymers and copolymers may be derived from at least one compound selected from the group consisting of acrylic acid, methacrylic acid, maleic acid, maleic anhydride, acrylamide, N-alkylacrylamide, N-alkylmethacrylamide, glycerol, ethyleneimine, ethylene oxide, vinyl pyrrolidone, vinyl acetate, the hydrolysis products of vinyl acetate, 2-hydroxyethyl acrylate and dimethylaminoethylacrylate. It would be appreciated by a person skilled in the art that when such compounds are reacted to form a polymer, functional groups such as hydroxyl (alcohol), carboxylic acid, ester, ether and amide functional groups are introduced into the resulting polymer.

Where the water soluble polymer includes a copolymer, the copolymer is typically formed from two or more different monomer compounds. The different monomers may each include the same type of functional group, such as for example a carboxylic acid functional group. Alternatively, the different monomers may include different types of functional groups, such as for example carboxylic acid and hydroxyl functional groups. In this instance, a mixture of different functional groups will be present in the resulting copolymer. Where a copolymer includes a mixture of carbonyl and non-carbonyl functional groups (such as carboxylic acid and hydroxyl functional groups), such copolymers are regarded as carbonyl polymers in accordance with the invention.

The compounds used to form the water soluble polymer may be optionally reacted with a compound that forms water insoluble polymers, such as methyl acrylate, to provide a water soluble copolymer having a degree of hydrophobic character. Such copolymers may be useful if a water soluble polymer of controlled properties (e.g. hydrophilicity or solubility) is desired.

Some specific examples of water soluble carbonyl polymers and non-carbonyl polymers that may be used in the water soluble polymer employed in the method of the present invention include natural polymers and synthetic polymers. Examples of natural carbonyl polymers that may be used include polypeptides, while examples of natural non-carbonyl polymers that may be used include natural gums and polysaccharides such as cellulose and starch. Examples of synthetic carbonyl polymers that may be used include polyacid polymers, ester containing polymers and amide containing polymers. Examples of synthetic non-carbonyl polymers that may be used include polyether polymers, polyhydroxy polyether polymers, amine containing polymers and polyhydroxy polymers. Synthetic derivatives of natural polymers may also be used.

Some examples of polyacid polymers include poly(acrylic acid), poly(methacrylic acid) and poly(acrylic acid-co-methacrylic acid).

Some examples of polyhydroxy polyether polymers include poly(glycerol).

Some examples of polyether polymers include poly(ethylene glycol), mono-$C_1$ to $C_4$ alkyl ethers of poly(ethylene glycol) and di-$C_1$ to $C_4$ alkyl ethers of poly(ethylene glycol). A person skilled in the art would understand that poly(ethylene glycol) is also known as poly(ethylene oxide).

Some examples of amide containing polymers include poly(acrylamide), poly(methacrylamide), poly(N-alkyl acrylamide), poly(N-alkylmethacrylamide), poly(acrylamide-co-acrylic acid) and cyclic amides such as poly(vinyl pyrrolidone). In some embodiments the water soluble polymer includes poly(N-methylacrylamide). In still other embodiments the polymer includes poly(N-ethylacrylamide). In still other embodiments the polymer includes poly(N-isopropylacrylamide). Other N-alkylacrylamides suitable for use with the invention would be evident to one having skill in the art.

Some examples of amine containing polymers include poly(ethyleneimine).

Some examples of ester containing polymers include poly(2-hydroxyethylacrylate) and poly(dimethylaminoethylacrylate).

Some examples of polyhydroxy polymers include poly (vinyl alcohol). It would be appreciated by a person skilled in the art that poly(vinyl alcohol) may be obtained from the hydrolysis of poly(vinyl acetate).

Some examples of synthetic derivatives of natural polymers include ether derivatives of polysaccharides such as cellulose and starch, such as for example, methylcellulose and hydroxypropyl cellulose.

Other examples of water soluble polymer that may be used in the invention include poly(vinyl pyrrolidone) and copolymers of maleic acid or maleic anhydride.

In some embodiments of the invention the water soluble polymer includes at least one polymer selected from:
(i) carbonyl polymers selected from the group consisting of poly(acrylic acid), poly(methacrylic acid), poly(acrylic acid-co-methacrylic acid), copolymers of maleic acid, poly (acrylamide), poly(acrylamide-co-acrylic acid), poly(vinyl pyrrolidone), poly(N-alkylacrylamide), poly(N-alkylmethacrylamide) and poly(dimethylaminoethylacrylate); and
(ii) non-carbonyl polymers selected from the group consisting of poly(glycerol), poly(ethyleneimine), poly(ethylene glycol) and poly(vinyl alcohol).

The non-carbonyl polymer has a molecular weight of least about 5000.

The water soluble carbonyl polymers and non-carbonyl polymers employed in embodiments of the invention may also be of any architecture, including for example, linear, branched and comb architectures. Additionally, when the water soluble polymer includes a copolymer formed from two or more monomers, the copolymer may be a random, graft or block copolymer, including di-block and tri-block copolymers.

The water soluble carbonyl polymer employed in the embodiments of the invention may be of any suitable molecular weight, provided that the carbonyl polymer remains compatible with an aqueous environment. The ability of a given polymer to remain soluble in water may, at least in part, be influenced by the number and nature of the functional groups present in the polymer. Where the polymer includes a large number of polar carbonyl functional groups, such as carboxylic acid functional groups, high polymer molecular weights may be accommodated without a significant reduction in water solubility. In some embodiments the carbonyl polymer has a molecular weight selected from the group consisting of at least about 2000, at least about 5000, at least about 10,000, at least about 50,000 and at least about 100,000. For some carbonyl polymers, high molecular weights in the order of at least about $10^5$ may be used.

Non-carbonyl polymers used in embodiments of the invention generally have a molecular weight of at least about 5000. In some embodiments the non-carbonyl polymer has a molecular weight selected from group consisting of at least about 10,000, at least about 50,000 and at least about 100,000. For some non-carbonyl polymers, high molecular weights in the order of at least $10^5$ may be used. It can be desirable to use non-carbonyl polymers of high molecular weight as such polymers may be more effective in associating with the water insoluble compound by non-covalent bonding interactions than non-carbonyl polymers of molecular weight of less than 5000 and thereby provide greater assistance in evaporation control.

In some instances it may be convenient to use commercially available water soluble polymers in the invention. Commercially available polymers may contain a small amount of crosslinked polymeric material. The presence of crosslinked material may be desirable to obtain a desired polymer molecular weight or polymer structure, such as branching. Such crosslinked material may be present in low concentrations, such as in the order of less than about 0.1% of the water soluble polymer. Higher concentrations of crosslinked material may be tolerated in some instances provided the solubility of the polymer in the aqueous environment is not adversely affected by a significant degree.

In some embodiments, the method of the invention involves the application of one type of water soluble polymer to the body of water. In other embodiments, blends of two or more water soluble polymers may be applied to the body of water. As an example, a blend of a carbonyl polymer such as poly(acrylic acid) and a non-carbonyl polymer such as poly (ethylene glycol) may be used.

The water soluble polymer employed in the method of the invention further includes less than 10% (w/w) of water soluble ionized polymers. As defined herein water soluble ionized polymers are typically macromolecular compounds that possess functional groups which exist in an ionized state in a neutral pH aqueous environment (pH of approximately 7). Water soluble ionized polymers may be ampholytic (i.e. zwitterionic), anionic or cationic in character at neutral pH. Water soluble ionized polymers may also be associated with a metal salt. Examples of water soluble ionized polymers include cationic polymers such as poly(N-(triethylammonium ethyl)acrylamide) and anionic polymers such as sodium carboxymethyl cellulose.

In some embodiments the water soluble polymer includes less than 5% (w/w) of water soluble ionized polymers. In some specific embodiments it is desirable that the water soluble polymer be substantially free of water soluble ionized polymers. As used herein, the term "substantially free" indicates that the water soluble ionized polymers may be present in an incidental amount which does not effect desired properties. In other words, the material is not intentionally added to an indicated composition, but may be present at minor or inconsequential levels, for example, because it was carried over as an impurity or as part of an intended composition component. In some embodiments it is desirable to have low levels of water soluble ionized polymers to ensure that non-covalent bonding interactions which occur between the water insoluble compound and the water soluble polymer are not adversely disrupted by the ionized polymers.

Compounds that are capable of forming films or layers at an air-water interface are typically surface active molecules that possess a polar hydrophilic head group and a non-polar hydrophobic tail. The hydrophilic head group extends into the body of water and allows the compound to interact with the aqueous subphase while the hydrophobic tail extends into the surrounding atmosphere. In many cases, in order to form layers, the water insoluble compound should possess a relatively small hydrophilic head group compared to the hydrophobic tail. A small hydrophilic head group may be desirable to ensure that the water insoluble compound is able to assemble at the air-water interface of a body of water, rather than acting as an emulsifier or surfactant when it is applied to the water body.

In accordance with the method of the invention, at least one water insoluble compound is applied to the body of water to form a film or layer at the surface of the body of water. In some embodiments, a mixture of two or more water insoluble compounds may be applied to the body of water. Any conventional water insoluble compound that is suitable for forming layers at an air-water interface may be used.

In some embodiments, the water insoluble compound may be a fatty acid, a fatty alcohol, a fatty amide, an alkylene glycol monoester analogue of a fatty acid or an alkylene glycol monoether analogue of a fatty alcohol. Thus in some embodiments, at least one water insoluble compound selected from the group consisting of fatty acids, fatty alcohols, amide analogues of fatty acids or fatty alcohols and alkylene glycol monoether analogues of the fatty acids or fatty alcohols is applied to the body of water to form the layer.

In some embodiments, the water insoluble compound is of Formula (I):

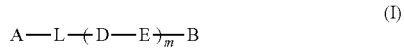
(I)

where
A is a hydrophobic moiety including at least 12 carbon atoms, preferably 16 to 22 carbon atoms;
L is selected from the group consisting of a bond, O, NR, S, COO, OCO, COS, SCO, S=O, $SO_2$, $O_2P(=O)(OH)$, NRCO, CONR, O(C=O)NR, NR(C=O)O and NR(C=O)NR;
D is an alkylene including at least one carbon atom;
E is selected from the group consisting of a bond, O, $NR^1$, S, COO, OCO, COS, SCO, S=O, $SO_2$, $O_2P(=O)(OH)$, $NR^1CO$, $CONR^1$, $O(C=O)NR^1$, $NR^1(C=O)O$ and $NR^1(C=O)NR^1$;
R at each occurrence is independently selected from the group consisting of H, $C_1$ to $C_4$ alkyl and the group $-(D-E)_m-B$;
$R^1$ is selected from the group consisting of H and $C_1$ to $C_4$ alkyl;
B is selected from the group consisting of hydrogen, $C_1$ to $C_4$ alkyl and a hydrophilic moiety including at least one hydrophilic functional group; and
m is 0, 1, 2, 3 or 4.

In the compound of Formula (I), the moiety A is a hydrophobic moiety including at least 12 carbon atoms. The hydrophobic moiety may contain an odd or even number of carbon atoms. The hydrophobic moiety extends into the atmosphere surrounding the water body and assists to inhibit the loss of water to the surrounding atmosphere by evaporation. In some embodiments, the hydrophobic moiety is a saturated long chain hydrocarbon, such as a saturated $C_{12}$ to $C_{22}$ alkyl chain. The hydrocarbon chain may include an odd or an even number of carbon atoms. In some embodiments, the hydrophobic moiety is a saturated $C_{16}$ to $C_{22}$ alkyl chain. In some embodiments, the hydrophobic moiety is a cetyl ($C_{16}$), stearyl ($C_{18}$), arachidyl ($C_{20}$), or behenyl ($C_{22}$) hydrocarbon chain. Saturated hydrocarbon chains such as cetyl and stearyl hydrocarbon chains may be advantageous as they are thought to be capable of packing closely with one another when they are aligned at the air-water interface. Without wishing to be limited by theory, it is believed that the ability of the saturated hydrocarbon chains to form a closely packed layer structure at the surface of the water body can contribute to the effectiveness of the invention in evaporation control.

The compound of Formula (I) also contains the group $-L-(D-E)_m$. In this group, the moieties L and E are each independently selected from the group consisting of O, NR, COO and OCO. Such L and E moieties, when present, can provide ether linkages, amide or ester linkages in the water insoluble compound of Formula (I).

The group $-L-(D-E)_m$ also includes the moiety D, which is an alkylene including at least one carbon atom. In some embodiments, the moiety D may be an alkylene including from between 2 to 6 carbon atoms or from between 2 to 4 carbon atoms. The alkylene may be linear or branched alkylene. In some embodiments, D at each occurrence may be independently selected from the group consisting of ethylene, propylene and butylene groups. In some embodiments, D may be optionally substituted with one or more $C_1$ to $C_4$ alkyl, such as methyl ($CH_3$).

In some embodiments, the moieties D and E may together provide a group such as an alkyleneoxy group in the compound of Formula (I). Examples of alkyleneoxy groups include ethyleneoxy and linear or branched propyleneoxy groups.

In the compound of Formula (I), the group (D-E) may be absent (when m is 0) or present. In one embodiment, the group m is 1 and the group (D-E) occurs once. In other embodiments, the group m may be 2, 3 or 4 and the group (D-E) is repeated 2, 3 or 4 times. Compounds in which m is 0 or 1 may exhibit better layer forming properties than compounds in which m is 2, 3 or 4.

The water insoluble compound of Formula (I) also includes a moiety B. The moiety B may be selected from the group consisting of hydrogen, $C_1$ to $C_4$ alkyl and a hydrophilic moiety including at least one hydrophilic functional group selected from the group consisting of an alcohol, a $C_1$ to $C_4$ alkoxy and a carboxylic acid functional group. In one embodiment, B is hydrogen or a $C_1$ to $C_4$ alkyl group.

In some embodiments, the water insoluble compound is a compound of Formula (II):

(II)

where
A is a hydrocarbon chain including at least 12 carbon atoms;
L is O;
B is selected from the group consisting of hydrogen, $C_1$ to $C_4$ alkyl and a hydrophilic moiety including at least two hydrophilic functional groups; and
m is 0, 1, 2, 3 or 4.

In one embodiment, in Formula (II), A is a saturated hydrocarbon chain including at least 16 carbon atoms and m is 0 or 1. In some specific embodiments A is a saturated $C_{16}$ to $C_{22}$ hydrocarbon chain.

In some embodiments the water insoluble compound is a compound of Formula (III):

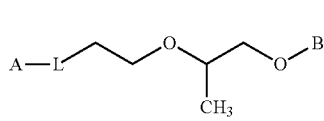
(III)

where
A is a hydrophobic moiety including at least 12 carbon atoms, preferably 16 to 22 carbon atoms;
L is O or NH; and
B is selected from the group consisting of hydrogen, $C_1$ to $C_4$ alkyl and a hydrophilic moiety including at least one hydrophilic functional group.

In some embodiments of the invention, the moiety B in the water insoluble compound is a polyol including at least two hydroxy functional groups. In other embodiments B has a structure of Formula (IV):

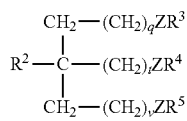
(IV)

where
R² is selected from the group consisting of hydrogen, the group $R^6Z(CH_2)_r$ and the group $A-L-(D-E)_m$ where $A-L-(D-E)_m$ is hereinbefore defined;

q, r, t and v are each independently 0 or 1;

Z at each occurrence is independently selected from the group consisting of O, S and NH; and $R^3$, $R^4$, $R^5$ and $R^6$ are independently selected from the group consisting of hydrogen, lower alkyl (preferably $C_1$ to $C_4$ alkyl), lower acyl (preferably $C_2$ to $C_4$ acyl) and the group $A-L-(D-E)_m$, wherein at least one of $R^2$ to $R^6$ is the group $A-L-(D-E)_m$.

In some embodiments, in Formula (IV), at least two of $R^2$ to $R^6$ are hydrogen.

In some embodiments the polyol is derived from a compound selected from the group consisting of glycerol, 1,2-ethane diol, butan-1,2-4-triol, 2-(hydroxymethyl)butan-1,4-diol, 3-(hydroxymethyl)pentan-1,5-diol, pentan-1,3,5-triol, 2-(hydroxymethyl)propan-1,2-3-triol, 2-(hydroxymethyl)butan-1,2-4-triol, 2,2-bis(hydroxymethyl)butan-1,4-diol, 3,3-bis(hydroxymethyl)pentan-1,5-diol, 3-(hydroxymethyl)pentan-1,3,5-triol and pentaerythritol.

In some embodiments the water insoluble compound of Formula (I) is a polyol compound selected from the group consisting of:

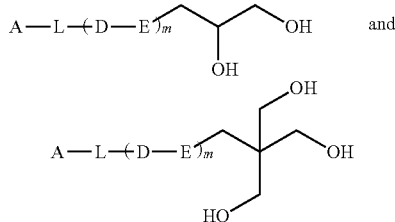

where
A, L, D and E are as hereinbefore defined; and
m is 0, 1, 2, 3 or 4.

In other embodiments the water insoluble compound of Formula (I) is a polyol compound selected from the group consisting of:

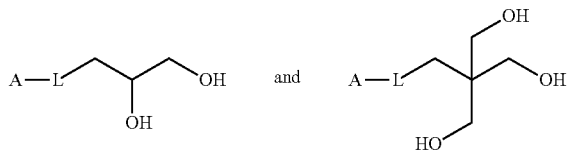

where A and L are as hereinbefore defined.

In some embodiments the water insoluble compound is of Formula (V):

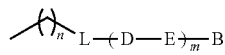
(V)

where
n is 15 to 21; and
the group $-L-(D-E)_m-B$ is selected from the group consisting of:

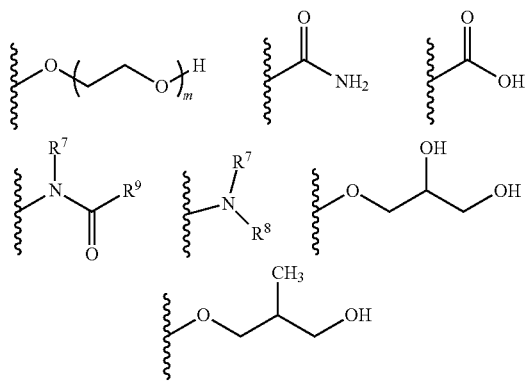

where
$R^7$ and $R^8$ are independently selected from the group consisting of H and $C_1$ to $C_4$ alkyl;
$R^9$ is $C_1$ to $C_4$ alkyl; and
m is 0, 1, 2, 3 or 4.

In some embodiments of the water insoluble compounds defined above, m may be 0 or 1.

In some embodiments the invention may employ a blend of two or more water insoluble compounds as described herein. The blend may include for example, two or more compounds of Formula (I), such as a blend including at least one compound where m is 0 or 1, in combination with at least one compound where m is 2, 3 or 4. In such blends however, compounds where m is 2, 3 or 4 are generally only present in minor amounts.

In accordance with some embodiments of the method of the invention, at least one water insoluble compound selected from the group consisting of cetyl alcohol, stearyl alcohol, arachidyl alcohol, behenyl alcohol, ethylene glycol monocetyl ether, ethylene glycol monostearyl ether, ethylene glycol monoarachidyl ether and ethylene glycol monobehenyl ether is applied to the body of water.

The water insoluble compound employed in the invention preferably includes at least one functional group that is adapted to interact with the water soluble polymer via non-covalent bonding interactions, such as hydrogen bonds. In some embodiments, the water insoluble compound may include two or more functional groups. Examples of water insoluble compounds that have more than one functional group capable of interacting with the water soluble polymer include ethylene glycol monostearyl ether, ethylene glycol monocetyl ether, ethylene glycol monoarachidyl ether and ethylene glycol monobehenyl ether (alcohol and ether groups) and 2-(octadecylamino)ethanol (amine and hydroxyl groups). Without wishing to be limited by theory, it is believed that at least one of, and possibly each of, the functional groups of the water insoluble compound is able to interact with the functional groups of the water soluble polymer.

In the carrying out the method of the invention, a suitable combination of water soluble polymer and water insoluble compound is applied to the body of water. A person skilled in the art would understand that a suitable combination could involve at least one water insoluble compound and at least one water soluble polymer, where each molecule has at least one functional group that is able to associate with at least one functional group of the other molecule by non-covalent bonding interactions. In some embodiments it may be convenient to select a water insoluble compound that will form a layer, and then select a water soluble polymer having functional groups that will associate with the functional groups of that water insoluble compound.

Some specific examples of water insoluble compounds that may be used in the invention together with some water soluble polymers that may associate with the water insoluble compounds by non-covalent bonding interactions are shown in Table 2.

TABLE 2

Some examples of specific combinations of water insoluble compounds and water soluble polymer

| Water insoluble compound | Water soluble polymer |
|---|---|
| long chain carboxylic acid, HO-C(=O)-(CH₂)ₙ-CH₃, n = 1 to 12 | Poly(N-vinyl pyrrolidone); Polyacrylamide; Poly(N-alkylacrylamide) R = H or C1-C4 alkyl; Poly(ethylene glycol) |
| long chain carboxylic acid (n = 1 to 12); long chain amide RHN-C(=O)- (R = H, alkyl, alkylamino etc, n = 1 to 12); long chain amide with NH (R = alkylamino, hydroxyalkyl etc, n = 1 to 12) | Poly(vinyl alcohol) |

TABLE 2-continued

Some examples of specific combinations of water insoluble compounds and water soluble polymer

| Water insoluble compound | Water soluble polymer |
|---|---|
| 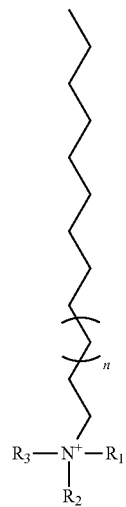 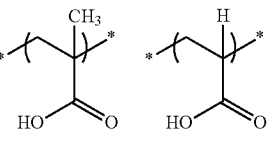 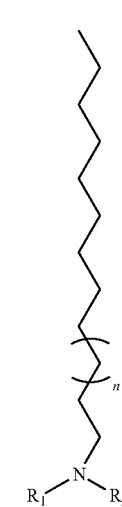 <br>$R_1, R_2, R_3$ = H, C1-C4 alkyl etc; n = 1 to 12    $R_1, R_2$ = H, alkyl, alkylamino etc; n = 1 to 12    R = H, alkyl, alkylamino etc; n = 1 to 12    R = alkylamino, hydroxyalkyl etc; n = 1 to 12 | 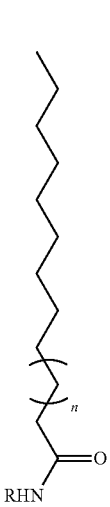 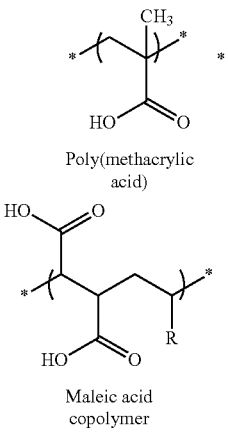<br>Poly(methacrylic acid)    Polyacrylic acid)<br>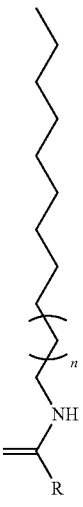 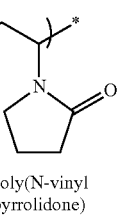<br>Maleic acid copolymer    Poly(N-vinyl pyrrolidone) |
|  <br>n = 1 to 12    R = H, C1-C4 alkyl; m = 0 or 1; n = 1 to 12 | 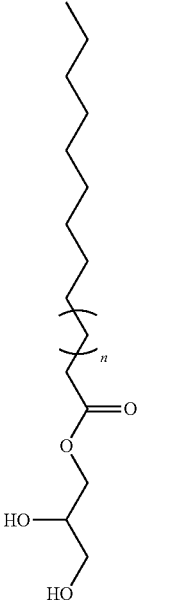 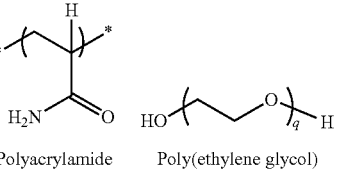<br>Polyacrylamide    Poly(ethylene glycol) |

TABLE 2-continued

Some examples of specific combinations of water insoluble compounds and water soluble polymer

| Water insoluble compound | Water soluble polymer |
|---|---|
| 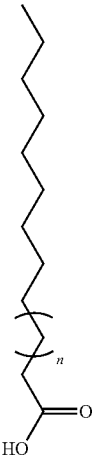<br>n = 1 to 12 | Polyethyleneimine |
| Carboxylic acid containing water insoluble compounds, including fatty acids such as myristic acid, palmitic acid and stearic acid | Poly(vinyl pyrrolidone)<br>Poly(vinyl alcohol)<br>Poly(acrylamide)<br>Poly(N-alkylacrylamide)<br>Poly(ethylene glycol)<br>Poly(ethyleneimine) |
| Alcohol containing water insoluble compounds including fatty alcohols such as lauryl alcohol, cetyl alcohol, stearyl alcohol, arachidyl alcohol, behenyl alcohol | Poly(acrylic acid)<br>Poly(methacrylic acid)<br>Poly(ethylene glycol)<br>Copolymers of maleic acid<br>Poly(vinyl pyrrolidone) |
| Ether containing water insoluble compounds including alkylene glycol monoethers of fatty alcohols such ethylene glycol monostearyl ether, ethylene glycol monocetyl ether, ethylene glycol monoarachidyl ether, ethylene glycol monobehenyl ether and 3-(octadecyloxy)propane-1,2-diol | Poly(acrylic acid)<br>Poly(methacrylic acid)<br>Copolymers of maleic acid<br>Poly(vinyl pyrrolidone)<br>Poly(acrylamide) |
| Ester containing water insoluble compounds including monoglyceryl esters of fatty acids, such ethyleneglycol monostearate, ethyleneglycol monopalmitate, glyceryl stearate, glyceryl palmitate and glycery laurate | Poly(acrylic acid)<br>Poly(methacrylic acid)<br>Poly(acrylic-co-methacrylic acid)<br>Copolymers of maleic acid |
| Primary, secondary or tertiary amine containing water insoluble compounds, such as stearamidopropyl dimethylamine and 2-(octadecylamino) ethanol. | Poly(acrylic acid) or poly(methacrylic acid)<br>Poly(ethylene glycol)<br>Poly(acrylic-co-methacrylic acid)<br>Copolymers of maleic acid |
| Amide containing water insoluble compounds including alkylamides and fatty amides such as stearamide. | Poly(vinyl alcohol)<br>Poly(acrylic acid)<br>Poly(methacrylic acid)<br>Poly(ethylene glycol)<br>Poly(acrylic-co-methacrylic acid)<br>Copolymers of maleic acid |
| Ammonium containing water insoluble compounds such as stearyl trimethylammonium chloride, cetyl trimethylammonium chloride, lauryl trimethylammonium chloride, stearyl trimethylammonium bromide, cetyl trimethylammonium bromide, lauryl trimethylammonium bromide, dilauryldimethylammonium chloride and stearyldimethyl benzylammonium chloride. | Poly(acrylic acid)<br>Poly(methacrylic acid)<br>Poly(ethylene glycol)<br>Poly(vinyl alcohol)<br>Poly(acrylic-co-methacrylic acid)<br>Copolymers of maleic acid |
| Sulfate containing water insoluble compounds such as sodium myreth sulfate. | Poly(ethyleneimine) |
| Phosphonate containing water insoluble compounds such as phospholipids | Poly(ethyleneimine) |

Other water insoluble compounds that are capable of forming layers in addition to those mentioned in Table 2 above would be appreciated by one skilled in the art.

The water insoluble compound and the water soluble polymer may be applied to the body of water separately or in admixture.

When the water insoluble compound and the water soluble polymer are applied separately, it may be beneficial to apply the water insoluble compound to the body of water first, prior to application of the water soluble polymer. In this way, the layer structure may firstly be formed from the water insoluble compound and thus made available for interaction with the water soluble polymer. Subsequent application of the water soluble polymer after formation of the layer may also help to reduce or avoid undesirable migration of the water soluble polymer within the aqueous subphase to sites that are remote from the layer structure.

When the water insoluble compound and the water soluble polymer are applied in admixture, the admixture may include the water insoluble compound and the water soluble polymer in mutual association with one another through non-covalent bonding interactions. This enables simultaneous application of the water insoluble compound and water soluble polymer to the water body.

When applied in admixture, the water insoluble compound and the water soluble polymer may be formulated in a composition that is applied to the body of water. The composition may be a solid or a liquid composition, including single phase solution, emulsion, suspension or dispersion. In some embodiments the composition is applied as a solid to the surface of the body of water.

In the method of the invention, the relative amounts of water insoluble compound and water soluble polymer applied to the body of water are such that the advantages of the invention can be obtained. The amount of water insoluble compound applied to the body of water can be determined relative to the quantity of functional groups present in the water soluble polymer. Generally, the quantity of functional groups in the water soluble polymer may be ascertained by having regard to the number of repeating monomer units in the polymer and the types of functional groups present in those monomer units. Where the repeating monomer unit includes two or more functional groups however, the amount of water insoluble compound that is used can be adjusted accordingly.

In some embodiments of the method of the invention, the mole ratio of water insoluble compound to the functional groups of the water soluble polymer may be in the range of from about 1.0:0.01 to 0.01:1.0. That is, in some embodiments, the amount of water insoluble compound applied to the water body is such that there is a molar excess of the water insoluble compound relative to the quantity of functional groups present in the water soluble polymer. In other embodiments, the amount of water insoluble compound applied to the water body is such that there are fewer moles of the compound, relative to the functional groups of the water soluble polymer. In some instances it may be useful to have an excess amount of functional groups provided by the water soluble polymer compared to the amount of water insoluble compound in order to further stabilise the layer structure.

In other embodiments the mole ratio of the water insoluble compound to the functional groups of the water soluble polymer is in the range of from about 0.2:1.0 to 1.0:0.2. In still other embodiments the mole ratio of the water insoluble compound to the functional groups of the water soluble polymer is in the range of from about 0.5:1.0 to 1.0:0.5. In other embodiments, the mole ratio of water insoluble compound to the functional groups of the water soluble polymer may be about 1:1.

In some aspects, the method of the invention may also employ an operative moiety. Thus the method of the invention may further include the step of applying an operative moiety to the body of water. The operative moiety can act to impart additional utility or properties in addition to evaporation control. In some embodiments the operative moiety may be a radiation absorbing moiety or radiation reflecting moiety. In other embodiments the operative moiety may be a sensor moiety. In still other embodiments the operative moiety may be a biologically active moiety. In still other embodiments the operative moiety may be a crosslinking moiety.

In some embodiments the operative moiety is associated with the water soluble polymer. In one embodiment, the operative moiety is covalently bonded to the water soluble polymer. In an alternative embodiment, the operative moiety is associated with the water soluble polymer by non-covalent bonding interactions such as those described herein. Examples of non-covalent bonding interactions include electrostatic bonding and hydrogen bonding interactions. The association of the operative moiety with the water soluble polymer enables the operative moiety to become located at the air-water interface of the body of water when the water soluble polymer interacts with the water insoluble compound.

Where the operative moiety associates with the water soluble polymer by non-covalent bonding interactions, the operative moiety may include at least one, and in some embodiments, may include two or more, functional groups to enable the moiety to participate in the non-covalent bonding interactions. In some embodiments, the operative moiety may include at least one functional group selected from the group consisting of alcohol, carboxylic acid, ketone, aldehyde, ester, ether, amine, amide, sulfone, sulfonic acid, sulfoxide, thiol, phosphonic acid and phosphate functional groups. Corresponding anions, cations or salts of any one of the aforementioned functional groups may also be included in the operative moiety. In some specific embodiments, the operative moiety includes a functional group selected from the group consisting of alcohol, ether and carboxylic acid functional groups.

Where the operative moiety is a radiation absorbing moiety, such moieties may absorb electromagnetic radiation having a wavelength in the ultraviolet, infrared or visible range. Examples of radiation absorbing moieties include dye molecules and other conjugated organic compounds. Radiation absorbing moieties may also act as fluorophores and chromophores. Fluorophores are molecules that fluoresce by absorbing a wavelength of energy then re-emitting that energy at a different wavelength. Chromophores are molecules that exhibit colour upon absorption of a specific wavelength of energy. Radiation absorbing moieties may be useful in applications when it is desired to absorb energy in order to raise the temperature of the body of water or to provide visual detection of the layer structure. Such moieties may be used to chemically tag the layer and assist in detecting and monitoring the presence of the layer. The ability to raise the temperature of the water in addition to providing evaporation control (e.g. to either reduce or enhance the rate of evaporation) may be useful in agricultural applications such as rice cultivation, where higher water temperatures may promote the yield of the crop. It may also be useful for other applications, such as in swimming pools to retain heat.

Where the operative moiety is a radiation reflecting moiety, such moieties may reflect electromagnetic radiation having a wavelength in the ultraviolet, infrared or visible range. Radiation reflecting moieties may be useful to reflect electromagnetic radiation that may cause photodegradation of the layer structure and/or water soluble polymer. Radiation reflecting moieties may also be useful to prevent or reduce significant elevations in the temperature of the body of water as such elevations in temperature can cause an enhancement to the rate of evaporation. Radiation reflecting moieties that may be used in the invention may be organic or inorganic compounds or mixtures thereof.

When the operative moiety is a sensor moiety, the moiety may act to detect chemical entities in the water body, which give rise to changes in the environment of the water body. In some embodiments, the sensor moiety is adapted to detect a pollutant in the body of water. Pollutants are undesirable materials that can contaminate water and make the water unsuitable for consumption or use. Examples of pollutants include organic water pollutants such as bacteria, algae, volatile organic compounds, fertilizers, pesticides, sewage effluent, detergents and petroleum hydrocarbons, and inorganic water pollutants such as ammonia, sulphur dioxide and heavy metals including lead, mercury, iron, cadmium, aluminium and magnesium.

Where the operative moiety is a biologically active moiety, the moiety may in one embodiment act to selectively control the viability of an undesirable organism. In some embodiments, the biologically active moiety may be a selective toxin for the undesirable organism. The biologically active moiety may act to kill the undesirable organism, or interrupt or retard the growth or reproduction of the organism. It is desirable however, that the biologically active moiety does not significantly affect the health of any other plant or animal life which it is not selectively designed to control.

Undesirable organisms may adversely affect the health or productivity of plants and animals in agriculture or aquaculture. Undesirable organisms may include microorganisms such as bacteria, fungi, yeasts, moulds and viruses, animals such as insects and worms, plant material such as weeds, and algae material. Accordingly, in some embodiments, the biologically active moiety is designed to selectively control the viability of these organisms.

In one embodiment the biologically active moiety is an insecticidal moiety which may be derived from an insecticidal agent. The insecticidal moiety may be used to control insect pests such as mosquitoes and other insects that live or breed in water bodies or that affect plant or marine life in the water bodies. Examples of insecticidal agents include the following:
    antibiotic insecticides such as allosamidin thuringiensin;
    macrocyclic lactone insecticides including:
        avermectin insecticides such as abamectin, doramectin, emamectin, eprinomectin, ivermectin and selamectin;
        milbemycin insecticides such as lepimectin, milbemectin, milbemycin oxime and moxidectin;
        spinosyn insecticides such as spinetoram and spinosad;
    botanical insecticides such as anabasine, azadirachtin, d-limonene, nicotine, pyrethrins, cinerins, cinerin I, cinerin II, jasmolin I, jasmolin II, pyrethrin I, pyrethrin II, quassia, rotenone, ryania and sabadilla Botanical oils, such as, terpenes, Tasmanone, Eremophilone, eucalyptus oils, Melaleuca Oil and other insecticidal oils;
    carbamate insecticides including bendiocarb; carbaryl;
    benzofuranyl methylcarbamate insecticides such as benfuracarb, carbofuran, carbosulfan, decarbofuran and furathiocarb;
    dimethylcarbamate insecticides such as dimetan, dimetilan, hyquincarb and pirimicarb;
    oxime carbamate insecticides such as alanycarb, aldicarb, aldoxycarb, butocarboxim, butoxycarboxim, methomyl, nitrilacarb, oxamyl, tazimcarb, thiocarboxime, thiodicarb and thiofanox;
    phenyl methylcarbamate insecticides such as allyxycarb, aminocarb, bufencarb, butacarb, carbanolate, cloethocarb, dicresyl, dioxacarb, EMPC, ethiofencarb, fenethacarb, fenobucarb, isoprocarb, methiocarb, metolcarb, mexacarbate, promacyl, promecarb, propoxur, trimethacarb, XMC and xylylcarb;
    diamide insecticides such as chlorantraniliprole and flubendiamide;
    desiccant insecticides such as boric acid;
    dinitrophenol insecticides such as dinex, dinoprop, dinosam and DNOC;
    fluorine insecticides such as barium hexafluorosilicate, cryolite, sodium fluoride, sodium hexafluorosilicate and sulfluramid;
    formamidine insecticides such as amitraz, chlordimeform, formetanate and formparanate;
    insect growth regulators including:
        chitin synthesis inhibitors such as bistrifluoron, buprofezin, chlorfluazuron, cyromazine, diflubenzuron, flucycloxuron, flufenoxuron, hexaflumuron, lufenuron, novaluron, noviflumuron, penfluoron, tefluben zuron and triflumuron;
        juvenile hormone mimics such as epofenonane, fenoxycarb, hydroprene, kinoprene, methoprene, pyriproxyfen and triprene;
        juvenile hormones such as juvenile hormone I juvenile hormone II and juvenile hormone III;
        moulting hormone agonists such as chromafenozide, halofenozide, methoxyfenozide and tebufenozide;
        moulting hormones such as α-ecdysone and ecdysterone;
        moulting inhibitors such as diofenolan;
        precocenes such as precocene I, precocene II and precocene III; and
        unclassified insect growth regulators such as dicyclanil;
    nereistoxin analogue insecticides such as bensultap, cartap, thiocyclam and thiosultap;
    nicotinoid insecticides including flonicamid;
    nitroguanidine insecticides such as clothianidin, dinotefuran, imidacloprid, Acetamiprid and thiamethoxam;
    nitromethylene insecticides such as nitenpyram and nithiazine;
    pyridylmethylamine insecticides such as acetamiprid, imidacloprid (duplicated), nitenpyram and thiacloprid;
    organophosphorus insecticides including:
        organophosphate insecticides such as bromfenvinfos, chlorfenvinphos, crotoxyphos, dichlorvos, dicrotophos, dimethylvinphos, fospirate, heptenophos, methocrotophos, mevinphos, monocrotophos, naled, naftalofos, phosphamidon, propaphos, TEPP and tetrachlorvinphos;
        organothiophosphate insecticides such as dioxabenzofos, fosmethilan and phenthoate;
        aliphatic organothiophosphate insecticides such as acethion, amiton, cadusafos, chlorethoxyfos, chlormephos, demephion, demephion-O, demephion-S, demeton, demeton-O, demeton-S, demeton-methyl, demeton-O-methyl, demeton-S-methyl, demeton-S-methylsulphon, disulfoton, ethion, ethoprophos, IPSP, isothioate, malathion, methacrifos, oxydemeton-methyl, oxydeprofos, oxydisulfoton, phorate, sulfotep, terbufos and thiometon;

aliphatic amide organothiophosphate insecticides such as amidithion, cyanthoate, dimethoate, ethoate-methyl, formothion, mecarbam, omethoate, prothoate, sophamide and vamidothion;

oxime organothiophosphate insecticides such as chlorphoxim, phoxim and phoxim-methyl;

heterocyclic organothiophosphate insecticides such as azamethiphos, coumaphos, coumithoate, dioxathion, endothion, menazon, morphothion, phosalone, pyraclofos, pyridaphenthion and quinothion;

benzothiopyran organothiophosphate insecticides such as dithicrofos and thicrofos;

benzotriazine organothiophosphate insecticides such as azinphos-ethyl andazinphos-methyl;

isoindole organothiophosphate insecticides such as dialifos and phosmet;

isoxazole organothiophosphate insecticides such as isoxathion and zolaprofos;

pyrazolopyrimidine organothiophosphate insecticides such as chlorprazophos and pyrazophos;

pyridine organothiophosphate insecticides such as chlorpyrifos and chlorpyrifos-methyl;

pyrimidine organothiophosphate insecticides such as butathiofos, diazinon, etrimfos, lirimfos, pirimiphos-ethyl, pirimiphos-methyl, primidophos, pyrimitate and tebupirimfos;

quinoxaline organothiophosphate insecticides such as quinalphos and quinalphos-methyl;

thiadiazole organothiophosphate insecticides such as athidathion, lythidathion, methidathion and prothidathion;

triazole organothiophosphate insecticides such as isazofos and triazophos;

phenyl organothiophosphate insecticides such as azothoate, bromophos, bromophos-ethyl, carbophenothion, chlorthiophos, cyanophos, cythioate, dicapthon, dichlofenthion, etaphos, famphur, fenchlorphos, fenitrothion, fensulfothion, fenthion, fenthion-ethyl, heterophos, jodfenphos, mesulfenfos, parathion, parathion-methyl, phenkapto, phosnichlor, profenofos, prothiofos, sulprofos, temephos, trichlormetaphos-3 and trifenofos;

phosphonate insecticides such as butonate and trichlorfon;

phosphonothioate insecticides including mecarphon;
phenyl ethylphosphonothioate insecticides such as fonofos and trichloronat; and
phenyl phenylphosphonothioate insecticides such as cyanofenphos, EPN and leptophos;

phosphoramidate insecticides such as crufomate, fenamiphos, fosthietan, mephosfolan, phosfolan and pirimetaphos;

phosphoramidothioate insecticides such as acephate, isocarbophos, isofenphos, methamidophos and propetamphos;

phosphorodiamide insecticides such as dimefox, mazidox, mipafox and schradan;

oxadiazine insecticides such as indoxacarb;
oxadiazolone insecticides such as metoxadiazone;
phthalimide insecticides such as dialifos, phosmet and tetramethrin;
pyrazole insecticides including chlorantraniliprole, dimetilan, tebufenpyrad and tolfenpyrad and phenylpyrazole insecticides such as acetoprole, ethiprole, fipronil, pyraclofos, pyrafluprole, pyriprole and vaniliprole;

pyrethroid insecticides including:
pyrethroid ester insecticides such as acrinathrin, allethrin, bioallethrin, barthrin, bifenthrin, bioethanomethrin, cyclethrin, cycloprothrin, cyfluthrin, beta-cyfluthrin, cyhalothrin, gamma-cyhalothrin, lambda-cyhalothrin, cypermethrin, alpha-cypermethrin, beta-cypermethrin, theta-cypermethrin, zeta-cypermethrin, cyphenothrin, deltamethrin, dimefluthrin, dimethrin, empenthrin, fenfluthrin, fenpirithrin, fenpropathrin, fenvalerate, esfenvalerate, flucythrinate, fluvalinate, tau-fluvalinate, furethrin, imiprothrin, metofluthrin, permethrin, biopermethrin, transpermethrin, phenothrin, prallethrin, profluthrin, pyresmethrin, resmethrin, bioresmethrin, cismethrin, tefluthrin, terallethrin, tetramethrin, tralomethrin and transfluthrin; and
pyrethroid ether insecticides such as etofenprox, flufenprox, halfenprox, protrifenbute and silafluofen;
natural pyrethrins or synthetic pyrethroids such as permethrin, fenvalerate, deltamethrin, cyhalothrin, biphenthrin, fenpropathrin, cyfluthrin, tefluthrin, empenthrin, cypermethrin, tetramethrin, bioallethrin, fenfluthrin, prallethrin, 5-benzyl-3-furylmethyl (E)-(1R,3S)-2,2-dimethyl-3-(2-oxothiolan-3-ylidenemethyl)cyclopropane carboxylate and pentafluorobenzyl (cis)-3-[2-fluoro-2-(methoxycarbonyl)ethenyl]-2,2-dimethylcyclopropane carboxylate;

pyrimidinamine insecticides such as flufenerim and pyrimidifen;
pyrrole insecticides such as chlorfenapyr;
tetramic acid insecticides such as spirotetramat;
tetronic acid insecticides such as spiromesifen; spiromesifen;
thiazole insecticides such as clothianidin and thiamethoxam;
thiazolidine insecticides such as tazimcarb and thiacloprid;
thiourea insecticides such as diafenthiuron;
urea insecticides such as flucofuron and sulcofuron; and
unclassified insecticides such as closantel, copper naphthenate, crotamiton, EXD, fenazaflor, fenoxacrim, hydramethylnon, isoprothiolane, malonoben, metaflumizone, nifluridide, pyridaben, pyridalyl, pyrifluquinazon, rafoxanide, triarathene and triazamate;
N-methyl phosphonylvaline (Valosate); and
Biological Insecticides such as *Bacillus Thuringinesis*.

In some embodiments, the insecticidal moiety may be derived from an insecticidal agent used to control insect pests of agricultural crops such as rice in a paddy-field. Examples of rice insecticides include, for example, the compounds described in UK Patent Application No. GB-2178739-A, such as 1,1,1-trifluoro-2-(4-ethoxyphenyl)-3-(3-phenoxybenzyloxy)propane, 1,1,1-trifluoro-2-(4-ethoxyphenyl)-3-[3-(4-chlorophenoxy)benzyloxy]propane, 1,1,1-trifluoro-2-(4-trifluoromethoxyphenyl)-3-(3-phenoxybenzyloxy) propane, 1,1,1-trifluoro-2-(4-ethoxyphenyl)-3-(3-phenoxy-4-fluorobenzyloxy)propane or 1,1,1-trifluoro-2-(4-ethoxyphenyl)-3-[3-(4-bromophenoxy)benzyloxy]propane; etofenprox; cartap; buprofezin; chlorpyrifos-methyl; fenthion; fenitrothion; cycloprothrin; isoxathion; phenthoate; BPMC (fenobucarb); XMC (xylylcarb); carbaryl; the compounds described in European Patent Application No. 240121-A, such as 1,1,1-trifluoro-2-(4-ethoxyphenyl)-5-(4-fluoro-3-phenoxyphenyl)pentane; the compounds described in PCT Patent Application No. WO88/08416, for example 2-(phenoxybenzyloxy)-1-cyclopropyl-1-(4-chlorophenyl) ethane or 2-(4-fluoro-3-phenoxybenzyloxy)-1-cyclopropyl-1-(4-chlorophenyl)ethane; insecticidally active silaneophanes such as (4-ethoxyphenyl)-(dimethyl)-[3-(4- fluoro-3-phenoxyphenyl)propyl]-silane; or nitromethylene insecticides and their analogues, for example 1-[(6-chloro-3-pyridinyl)methyl]-N-nitro-1H-imidazol-2-amine.

In another embodiment the biologically active moiety is a fungicidal moiety which may be derived from a fungicidal agent. The fungicidal moiety may be used to control fungal infestations of plant and/or animal life living in the water body. The control of fungal infestations may be beneficial to promote agricultural and aquaculture production. The fungicidal moiety may be derived from any suitable fungicidal agent.

Examples of fungicidal agents that may be used to provide the fungicidal moiety include:

- aliphatic nitrogen fungicides such as butylamine, cymoxanil, dodicin, dodine, guazatine and iminoctadine;
- amide fungicides such as bixafen, carpropamid, chloraniformethan, cyflufenamid, diclocymet, ethaboxam, fenoxanil, flumetover, furametpyr, isopyrazam, mandipropamid, penthiopyrad, prochloraz, quinazamid, silthiofam and triforine;
- acylamino acid fungicides such as benalaxyl, benalaxyl-M, furalaxyl, metalaxyl, metalaxyl-M and pefurazoate;
- anilide fungicides such as benalaxyl, benalaxyl-M, boscalid, carboxin, fenhexamid, isotianil, metalaxyl, metalaxyl-M, metsulfovax, ofurace, oxadixyl, oxycarboxin, pyracarbolid, sedaxane, thifluzamide and tiadinil;
- benzanilide fungicides such as benodanil, flutolanil, mebenil, mepronil, salicylanilide and tecloftalam;
- furanilide fungicides such as fenfuram, furalaxyl, furcarbanil and methfuroxam;
- sulfonanilide fungicides such as flusulfamide;
- benzamide fungicides such as benzohydroxamic acid, fluopicolide, fluopyram, tioxymid, trichlamide, zarilamid and zoxamide;
- furamide fungicides such as cyclafuramid and furmecyclox;
- phenylsulfamide fungicides such as dichlofluanid and tolylfluanid;
- sulfonamide fungicides such as amisulbrom and cyazofamid;
- valinamide fungicides such as benthiavalicarb and iprovalicarb;
- antibiotic fungicides such as aureofungin, blasticidin-S, cycloheximide, griseofulvin, kasugamycin, natamycin, polyoxins, polyoxorim, streptomycin and validamycin;
- strobilurin fungicides such as azoxystrobin, dimoxystrobin, fluoxastrobin, kresoxim-methyl, metominostrobin, orysastrobin, picoxystrobin, pyraclostrobin and trifloxystrobin;
- aromatic fungicides such as biphenyl, chlorodinitronaphthalene, chloroneb, chlorothalonil, cresol, dicloran, hexachlorobenzene, pentachlorophenol, quintozene, sodium pentachlorophenoxide and tecnazene;
- benzimidazole fungicides such as benomyl, carbendazim, chlorfenazole, cypendazole, debacarb, fuberidazole, mecarbinzid, rabenzazole and thiabendazole;
- benzimidazole precursor fungicides such as furophanate, thiophanate and thiophanate-methyl;
- benzothiazole fungicides such as bentaluron, benthiavalicarb, chlobenthiazone, probenazole and TCMTB;
- bridged diphenyl fungicides such as bithionol, dichlorophen and diphenylamine;
- carbamate fungicides such as benthiavalicarb, furophanate, iprovalicarb, propamocarb, pyraclostrobin, pyribencarb, thiophanate and thiophanate-methyl;
- benzimidazolylcarbamate fungicides such as benomyl, carbendazim, cypendazole, debacarb and mecarbinzid;
- carbanilate fungicides such as diethofencarb;
- conazole fungicides;
- conazole fungicides (imidazoles) such as climbazole, clotrimazole, imazalil, oxpoconazole, prochloraz and triflumizole;
- conazole fungicides (triazoles) such as azaconazole, bromuconazole, cyproconazole, diclobutrazol, difenoconazole, diniconazole, diniconazole-M, epoxiconazole, etaconazole, fenbuconazole, fluquinconazole, flusilazole, flutriafol, furconazole, furconazole-cis, hexaconazole, imibenconazole, ipconazole, metconazole, myclobutanil, penconazole, propiconazole, prothioconazole, quinconazole, simeconazole, tebuconazole, tetraconazole, triadimefon, triadimenol, triticonazole, uniconazole and uniconazole-P;
- copper fungicides such as Bordeaux mixture, Burgundy mixture, Cheshunt mixture, copper acetate, copper carbonate, basic copper hydroxide, copper naphthenate, copper oleate, copper oxychloride, copper silicate, copper sulfate, copper sulfate, basic copper zinc chromate, cufraneb, cuprobam, cuprous oxide, mancopper and oxine-copper;
- dicarboximide fungicides such as famoxadone and fluoroimide;
- dichlorophenyl dicarboximide fungicides such as chlozolinate, dichlozoline, iprodione, isovaledione, myclozolin, procymidone and vinclozolin;
- phthalimide fungicides such as captafol, captan, ditalimfos, folpet and thiochlorfenphim;
- dinitrophenol fungicides such as binapacryl, dinobuton, dinocap, dinocap-4, dinocap-6, meptyldinocap, dinocton, dinopenton, dinosulfon, dinoterbon and DNOC;
- dithiocarbamate fungicides such as azithiram; carbamorph, cufraneb; cuprobam, disulfuram, ferbam, metam, nabam, tecoram, thiram and ziram;
- cyclic dithiocarbamate fungicides such as dazomet, etem and milneb;
- polymeric dithiocarbamate fungicides such as mancopper, mancozeb, maneb, metiram, polycarbamate, propineb and zineb;
- imidazole fungicides such as cyazofamid, fenamidone, fenapanil, glyodin, iprodione, isovaledione, pefurazoate and triazoxide;
- inorganic fungicides such as potassium azide, potassium thiocyanate, sodium azide, sulfur, copper fungicides as described herein and inorganic mercury fungicides as described herein;
- mercury fungicides;
- inorganic mercury fungicides such as mercuric chloride, mercuric oxide and mercurous chloride;
- organomercury fungicides such as (3-ethoxypropyl)mercury bromide, ethylmercury acetate, ethylmercury bromide, ethylmercury chloride, ethylmercury 2,3-dihydroxypropyl mercaptide, ethylmercury phosphate, N-(ethylmercury)-p-toluenesulphonanilide, hydrargaphen, 2-methoxyethylmercury chloride, methylmercury benzoate, methylmercury dicyandiamide, methylmercury pentachlorophenoxide, 8-phenylmercurioxyquinoline, phenylmercuriurea, phenylmercury acetate, phenylmercury chloride, phenylmercury derivative of pyrocatechol, phenylmercury nitrate, phenylmercury salicylate, thiomersal and tolylmercury acetate;
- morpholine fungicides such as aldimorph, benzamorf, carbamorph, dimethomorph, dodemorph, fenpropimorph, flumorph and tridemorph;

organophosphorus fungicides such as ampropylfos, ditalimfos, edifenphos, fosetyl, hexylthiofos, iprobenfos, phosdiphen, pyrazophos, tolclofos-methyl and triamiphos;

organotin fungicides such as decafentin, fentin and tributyltin oxide;

oxathiin fungicides such as carboxin and oxycarboxin;

oxazole fungicides such as chlozolinate, dichlozoline, drazoxolon, famoxadone, hymexazol, metazoxolon, myclozolin, oxadixyl and vinclozolin;

polysulfide fungicides such as barium polysulfide, calcium polysulfide, potassium polysulfide and sodium polysulfide;

pyrazole fungicides such as bixafen, furametpyr, isopyrazam, penthiopyrad, pyraclostrobin, rabenzazole and sedaxane;

pyridine fungicides such as boscalid, buthiobate, dipyrithione, fluazinam, fluopicolide, fluopyram, pyribencarb, pyridinitril, pyrifenox, pyroxychlor and pyroxyfur;

pyrimidine fungicides such as bupirimate, cyprodinil, diflumetorim, dimethirimol, ethirimol, fenarimol, ferimzone, mepanipyrim, nuarimol, pyrimethanil and triarimol' pyrrole fungicides such as fenpiclonil, fludioxonil and fluoroimide;

quinoline fungicides such as ethoxyquin, halacrinate, 8-hydroxyquinoline sulfate, quinacetol and quinoxyfen;

quinone fungicides wuch as benquinox, chloranil, dichlone and dithianon;

quinoxaline fungicides such as chinomethionat, chlorquinox and thioquinox;

thiazole fungicides such as ethaboxam, etridiazole, isotianil, metsulfovax, octhilinone, thiabendazole and thifluzamide;

thiazolidine fungicides such as flutianil and thiadifluor;

thiocarbamate fungicides such as methasulfocarb and prothiocarb;

thiophene fungicides such as ethaboxam and silthiofam;

triazine fungicides such as anilazine;

triazole fungicides such as amisulbrom, bitertanol, fluotrimazole, triazbutil and conazole fungicides (triazoles);

urea fungicides such as bentaluron, pencycuron and quinazamid;

unclassified fungicides such as acibenzolar, acypetacs, allyl alcohol, benzalkonium chloride, benzamacril, bethoxazin, carvone, chloropicrin, DBCP, dehydroacetic acid, diclomezine, diethyl pyrocarbonate, fenaminosulf, fenitropan, fenpropidin, formaldehyde, furfural, hexachlorobutadiene, iodomethane, isoprothiolane, methyl bromide, methyl isothiocyanate, metrafenone, nitrostyrene, nitrothal-isopropyl, OCH, 2-phenylphenol, phthalide, piperalin, proquinazid, pyroquilon, sodium orthophenylphenoxide, spiroxamine, sultropen, thicyofen, tricyclazole and zinc naphthenate.

In another embodiment the biologically active agent may be a herbicidal moiety, which is derived from a herbicidal agent. The herbicidal moiety can be used to control undesirable weeds which may complete with desirable agricultural crops for water, light and nutrients. Examples of herbicidal agents that may be used to provide the herbicidal moiety include:

amide herbicides such as allidochlor, amicarbazone, beflubutamid, benzadox, benzipram, bromobutide, cafenstrole, CDEA, cyprazole, dimethenamid, dimethenamid-P, diphenamid, epronaz, etnipromid, fentrazamide, flucarbazone, flupoxam, fomesafen, halosafen, isocarbamid, isoxaben, napropamide, naptalam, pethoxamid, propyzamide, quinonamid, saflufenacil and tebutam;

anilide herbicides such as chloranocryl, cisanilide, clomeprop, cypromid, diflufenican, etobenzanid, fenasulam, flufenacet, flufenican, ipfencarbazone, mefenacet, mefluidide, metamifop, monalide, naproanilide, pentanochlor, picolinafen, propanil and sulfentrazone;

arylalanine herbicides such as benzoylprop, flamprop, flamprop-M; chloroacetanilide herbicides such as acetochlor, alachlor, butachlor, butenachlor, delachlor, diethatyl, dimethachlor, metazachlor, metolachlor, S-metolachlor, pretilachlor, propachlor, propisochlor, prynachlor, terbuchlor, thenylchlor and xylachlor;

sulfonanilide herbicides such as benzofluor, cloransulam, diclosulam florasulam, flumetsulam, metosulam, perfluidone, pyrimisulfan and profluazol;

sulfonamide herbicides such as asulam, carbasulam, fenasulam, oryzalin, penoxsulam and pyroxsulam;

thioamide herbicides such as bencarbazone and chlorthiamid;

antibiotic herbicides such as bilanafos;

aromatic acid herbicides;

benzoic acid herbicides such as chloramben, dicamba, 2,3,6-TBA and tricamba;

pyrimidinyloxybenzoic acid herbicides such as bispyribac and pyriminobac;

pyrimidinylthiobenzoic acid herbicides such as pyrithiobac;

phthalic acid herbicides such as chlorthal;

picolinic acid herbicides such s aminopyralid, clopyralid and picloram;

quinolinecarboxylic acid herbicides such as quinclorac and quinmerac;

arsenical herbicides such as cacodylic acid, CMA, DSMA, hexaflurate, MAA, MAMA, MSMA, potassium arsenite and sodium arsenite;

benzoylcyclohexanedione herbicides such as mesotrione, sulcotrione, tefuryltrione and tembotrione;

benzofuranyl alkylsulfonate herbicides such as benfuresate and ethofumesate;

benzothiazole herbicides such as benazolin, benzthiazuron, fenthiaprop, mefenacet and methabenzthiazuron;

carbamate herbicides such as asulam, carboxazole, chlorprocarb, dichlormate, fenasulam, karbutilate and terbucarb;

carbanilate herbicides such as barban, BCPC, carbasulam, carbetamide, CEPC, chlorbufam, chlorpropham, CPPC, desmedipham, phenisopham, phenmedipham, phenmedipham-ethyl, propham and swep;

cyclohexene oxime herbicides such as alloxydim, butroxydim, clethodim, cloproxydim, cycloxydim, profoxydim, sethoxydim, tepraloxydim and tralkoxydim;

cyclopropylisoxazole herbicides such as isoxachlortole and isoxaflutole;

dicarboximide herbicides such as cinidon-ethyl, flumezin, flumiclorac, flumioxazin and flumipropyn;

dinitroaniline herbicides such as benfluralin, butralin, dinitramine, ethalfluralin, fluchloralin, isopropalin, methalpropalin, nitralin, oryzalin, pendimethalin, prodiamine, profluralin and trifluralin;

dinitrophenol herbicides such as dinofenate, dinoprop, dinosam, dinoseb, dinoterb, DNOC, etinofen and medinoterb;

diphenyl ether herbicides such as ethoxyfen;

nitrophenyl ether herbicides such as acifluorfen, aclonifen, bifenox, chlomethoxyfen, chlornitrofen, etn iprom id, fluorodifen, fluoroglycofen, fluoronitrofen, fomesafen, furyloxyfen, halosafen, lactofen, nitrofen, nitrofluorfen and oxyfluorfen;
dithiocarbamate herbicides such as dazomet and metam;
halogenated aliphatic herbicides such as alorac, chloropon, dalapon, flupropanate, hexachloroacetone, iodomethane, methyl bromide, monochloroacetic acid, SMA and TCA;
imidazolinone herbicides such as imazamethabenz, imazamox, imazapic, imazapyr, imazaquin and imazethapyr;
inorganic herbicides such as ammonium sulfamate, borax, calcium chlorate, copper sulfate, ferrous sulfate, potassium azide, potassium cyanate, sodium azide, sodium chlorate and sulfuric acid;
nitrile herbicides such as bromobonil, bromoxynil, chloroxynil, dichlobenil, iodobonil, ioxynil and pyraclonil;
organophosphorus herbicides such as amiprofos-methyl, anilofos, bensulide, bilanafos, butamifos, 2,4-DEP, DMPA, EBEP, fosamine, glufosinate, glufosinate-P, glyphosate and piperophos;
oxadiazolone herbicides such as dimefuron, methazole, oxadiargyl and oxadiazon
oxazole herbicides such as carboxazole, isouron, isoxaben, isoxachlortole, isoxaflutole, monisouron, pyroxasulfone and topramezone;
phenoxy herbicides such as bromofenoxim, clomeprop, 2,4-DEB, 2,4-DEP, difenopenten, disul, erbon, etnipromid, fenteracol and trifopsime;
phenoxyacetic herbicides such as 4-CPA, 2,4-D, 3,4-DA, MCPA, MCPA-thioethyl and 2,4,5-T;
phenoxybutyric herbicides such as 4-CPB, 2,4-DB, 3,4-DB, MCPB and 2,4,5-TB;
phenoxypropionic herbicides such as cloprop, 4-CPP, dichlorprop, dichlorprop-P, 3,4-DP, fenoprop, mecoprop and mecoprop-P;
aryloxyphenoxypropionic herbicides such as chlorazifop, clodinafop, clofop, cyhalofop, diclofop, fenoxaprop, fenoxaprop-P, fenthiaprop, fluazifop, fluazifop-P, haloxyfop, haloxyfop-P, isoxapyrifop, metamifop, propaquizafop, quizalofop, quizalofop-P and trifop;
phenylenediamine herbicides such as dinitramine and prodiamine;
pyrazole herbicides such as azimsulfuron, difenzoquat, halosulfuron, metazachlor, pyrazosulfuron and pyroxasulfone;
benzoylpyrazole herbicides such as benzofenap, pyrasulfotole, pyrazoxyfen and topramezone;
phenylpyrazole herbicides such as fluazolate, nipyraclofen and pyraflufen;
pyridazine herbicides such as credazine, pyridafol and pyridate;
pyridazinone herbicides such as brompyrazon, chloridazon, dimidazon, flufenpyr, metflurazon, norflurazon, oxapyrazon and pydanon;
pyridine herbicides such as aminopyralid, cliodinate, clopyralid, diflufenican, dithiopyr, flufenican, fluoroxypyr, haloxydine, picloram, picolinafen, pyriclor, pyroxsulam, thiazopyr and triclopyr;
pyrimidinediamine herbicides such as iprymidam and tioclorim;
quaternary ammonium herbicides such as cyperquat, diethamquat, difenzoquat, diquat, morfamquat and paraquat;
thiocarbamate herbicides such as butylate, cycloate, di-allate, EPTC, esprocarb, ethiolate, isopolinate, methiobencarb, molinate, orbencarb, pebulate, prosulfocarb, pyributicarb, sulfallate, thiobencarb, tiocarbazil, tri-allate and vernolate;
thiocarbonate herbicides such as dimexano, EXD and proxan;
thiourea herbicides such as methiuron;
triazine herbicides such as dipropetryn, indaziflam, triaziflam and trihydroxytriazine;
chlorotriazine herbicides such as atrazine, chlorazine, cyanazine, cyprazine, eglinazine, ipazine, mesoprazine, procyazine, proglinazine, propazine, sebuthylazine, simazine, terbuthylazine and trietazine;
thoxytriazine herbicides such as atraton, methometon, prometon, secbumeton, simeton and terbumeton;
methylthiotriazine herbicides such as ametryn, aziprotryne, cyanatryn, desmetryn, dimethametryn, methoprotryne, prometryn, simetryn and terbutryn;
triazinone herbicides such as ametridione, amibuzin, hexazinone, isomethiozin, metamitron and metribuzin;
triazole herbicides such as amitrole, cafenstrole, epronaz and flupoxam;
triazolone herbicides such as amicarbazone, bencarbazone, carfentrazone, flucarbazone, ipfencarbazone, propoxycarbazone, sulfentrazone and thiencarbazone;
triazolopyrimidine herbicides such as cloransulam, diclosulam, florasulam, flumetsulam, metosulam, penoxsulam and pyroxsulam;
uracil herbicides such as benzfendizone, bromacil, butafenacil, fluropacil, isocil, lenacil, saflufenacil and terbacil;
urea herbicides such as benzthiazuron, cumyluron, cycluron, dichloralurea, diflufenzopyr, isonoruron, isouron, methabenzthiazuron, monisouron and noruron;
phenylurea herbicides such as anisuron, buturon, chlorbromuron, chloreturon, chlorotoluron, chloroxuron, daimuron, difenoxuron, dimefuron, diuron, fenuron, fluometuron, fluothiuron, isoproturon, linuron, methiuron, methyldymron, metobenzuron, metobromuron, metoxuron, monolinuron, monuron, neburon, parafluoron, phenobenzuron, siduron, tetrafluoron and thidiazuron;
sulfonylurea herbicides;
pyrimidinylsulfonylurea herbicides such as amidosulfuron, azimsulfuron, bensulfuron, chlorimuron, cyclosulfamuron, ethoxysulfuron, flazasulfuron, flucetosulfuron, flupyrsulfuron, foramsulfuron, halosulfuron, imazosulfuron, mesosulfuron, nicosulfuron, orthosulfamuron, oxasulfuron, primisulfuron, propyrisulfuron, pyrazosulfuron, rimsulfuron, sulfometuron, sulfosulfuron and trifloxysulfuron;
triazinylsulfonylurea herbicides such as chlorsulfuron, cinosulfuron, ethametsulfuron, iodosulfuron, metsulfuron, prosulfuron, thifensulfuron, triasulfuron, tribenuron, triflusulfuron and tritosulfuron;
thiadiazolylurea herbicides such as buthiuron, ethidimuron, tebuthiuron, thiazafluoron and thidiazuron;
unclassified herbicides such as acrolein, allyl alcohol, aminocyclopyrachlor, azafenidin, bentazone, benzobicyclon, buthidazole, calcium cyanamide, cambendichlor, chlorfenac, chlorfenprop, chlorflurazole, chlorflurenol, cinmethylin, clomazone, CPMF, cresol, cyanamide, ortho-dichlorobenzene, dimepiperate, endothal, fluoromidine, fluridone, fluorochloridone, flurtamone, fluthiacet, indanofan, methyl isothiocyanate, OCH, oxaziclomefone, pentachlorophenol, pentoxazone, phenylmercury acetate, pinoxaden, prosulfalin, pyribenzoxim, pyriftalid, quinoclamine, rhodethanil, sulglycapin, thidiazimin, tridiphane, trimeturon, tripropindan and tritac.

In another embodiment the biologically active moiety is an algicidal moiety which may be derived from an algicide. The algicidal moiety may be useful in controlling the undesirable growth of algae in the water body. Examples of algicides that may be used to provide the algicidal moiety include benzalkonium chloride; bethoxazin; copper sulfate; cybutryne; dichlone; dichlorophen; diuron; endothal; fentin; hydrated lime; isoproturon; methabenzthiazuron; nabam; oxyfluorfen; quinoclamine; quinonamid; simazine and terbutryn.

In another embodiment the biologically active moiety is a bactericidal moiety which may be derived from an appropriate bactericidal agent. The bactericidal moiety may act to kill or at least reduce the presence of undesirable bacteria in the water body. Examples of bactericidal agents that may be used to provide the bactericidal moiety include bronopol; copper hydroxide; cresol; dichlorophen; dipyrithione; dodicin; fenaminosulf; formaldehyde; hydrargaphen; 8-hydroxyquinoline sulfate; kasugamycin; nitrapyrin; octhilinone; oxolinic acid; oxytetracycline; probenazole; streptomycin; tecloftalam and thiomersal.

Where the operative moiety is a crosslinking moiety, such moieties may participate in crosslinking reactions under appropriate conditions. In some embodiments the crosslinking reaction may occur between a crosslinking moiety and either the water insoluble compound or another chain of the water soluble polymer. This results in the formation of a crosslink between the chain of water soluble polymer in which the crosslinking moiety is associated with either the water insoluble compound or another chain of the water soluble polymer. Crosslinking reactions that occur between the crosslinking moiety and the water insoluble compound generally proceed via non-covalent bonding interactions. Crosslinking reactions that occur between the crosslinking moiety and another chain of the water soluble polymer may proceed via covalent or non-covalent bonding interactions.

In some embodiments the crosslinking reaction may occur between a first crosslinking moiety associated with a first chain of water soluble polymer and a second crosslinking moiety associated with a second chain of water soluble polymer, to form a crosslink there-between. An example of a crosslinking moiety is anthracene, which can dimerize under UV light to form a crosslink. Where the operative moiety is a crosslinking moiety, it may be beneficial for the crosslinking moiety to be covalently bonded to the water soluble polymer.

In some aspects the method of the invention may also employ a crosslinking agent in addition to, or instead of, an operative moiety which is a crosslinking moiety. Thus in another aspect the method of the invention may further include the step of applying a crosslinking agent to the body of water. Where the water insoluble compound and water soluble polymer are applied separately, the crosslinking agent may be applied immediately prior to or after application of the water soluble polymer. Alternatively, the crosslinking agent may be included in an admixture with the water insoluble compound and water soluble polymer for simultaneous application to the water body.

In some embodiments the crosslinking agent may be used to provide crosslinks between the water soluble polymer and the water insoluble compound and therefore enhance the interaction between the water insoluble compound and the water soluble polymer. In other embodiments the crosslinking agent may be used to provide crosslinks between different chains of the water soluble polymer.

The crosslinking agent associates with the water soluble polymer and either the water insoluble compound or another chain of the water soluble polymer by non-covalent bonding interactions, such as those described herein. In some embodiments the crosslinking agent enables the water soluble polymer and the water insoluble compound to interact by providing non-covalent associations, such as via hydrogen bonds.

In some embodiments the crosslinking agent may include two or more functional groups which are each capable of participating in non-covalent bonding interactions with the water soluble polymer and either the water insoluble compound or another chain of the water soluble polymer. In some embodiments a first functional group of the crosslinking agent interacts with a functional group of the water soluble polymer, while a second functional group of the crosslinking agent interacts with at least one functional group of either the water insoluble compound or another chain of the water soluble polymer to form a crosslink there-between. In this manner, the crosslinking agent is able to provide associations between the water soluble polymer and either the water insoluble compound or another chain of the water soluble polymer. In some embodiments, the functional groups of the crosslinking agent are each independently selected from the group consisting of alcohol, carboxylic acid, ketone, aldehyde, ester, ether, amine, amide, sulfone, sulfonic acid, sulfoxide, thiol, phosphonic acid and phosphate functional groups. Corresponding anions, cations or salts of the aforementioned functional groups may also be included. In some embodiments, the functional groups of the crosslinking agent are each independently selected from the group consisting of alcohol, carboxylic acid and ether functional groups. Corresponding anions, cations or salts of any one of the aforementioned functional groups may also be included in the crosslinking agent. In some embodiments, the crosslinking agent includes two or more functional groups. For example, the crosslinking agent may include a carboxylic acid functional group as a first functional group and a hydroxyl functional group as a second functional group. In other embodiments, the crosslinking agent includes two or more functional groups which are each of the same type. For example, the crosslinking agent may be a dicarboxylic acid or a diol, where the first and second functional groups are each of the same type.

The use of a crosslinking agent to provide associations between the water soluble polymer and the water insoluble compound may be beneficial in instances where the water insoluble compound and the water soluble each include the same type of functional group. In such circumstances, the water soluble polymer and the layer formed from the water insoluble compound may not be able to adequately associate with one another via non-covalent interactions due to charge repulsion or electrostatic repulsion between the functional groups or other factors. Accordingly, the use of a crosslinking agent having two or more functional groups that are able to interact with the functional groups of both the layer forming compound and the water soluble polymer can help to facilitate non-covalent interactions between these two components and crosslinking there-between.

The ability of the crosslinking agent to provide crosslinks between the water soluble polymer and the water insoluble compound may help to improve the durability of the layers employed in the invention and therefore assist in providing more effective evaporation control. Moreover, as the crosslinking moiety is associated with the water soluble polymer and the resulting layer by non-covalent interactions, the association can be reversed under appropriate conditions. The ability to reverse the associations may be useful if it is desired to disperse or disrupt the system of the invention.

In addition, the use of a crosslinking agent to provide associations between two different chains of water soluble polymer may be desirable to increase the viscosity of the water soluble component of the layer structure or to impart additional properties to the water soluble component of the layer. An example of a crosslinking agent that may be used to crosslink chains of a water soluble polymer is poly(ethylene glycol). Where the water soluble polymer includes a carboxylic acid containing polymer, such as poly(acrylic acid), the hydroxyl end groups of the poly(ethylene glycol) may associate with the carboxylic acid groups of the water soluble polymer. When used as a crosslinking agent, the poly(ethylene glycol) may have a molecular weight in range of from about 400 to 5,000 Da.

In accordance with the invention the loss of water from the body of water by evaporation is controlled. Typically, the loss of water from the body of water is reduced.

In some embodiments of the invention the proliferation of organisms in a body of water is also controlled. In some further embodiments reproductive processes such as the deposition of insect eggs are reduced. In other embodiments reproductive processes such as the deposition of insect eggs are inhibited. In some embodiments the proliferation of mosquito larvae in a body of water is controlled. In other embodiments the proliferation of mosquito larvae in a body of water is reduced. In still other embodiments the proliferation of mosquito larvae in a body of water is inhibited.

In other embodiments the transport of contaminants into a body of water is controlled. In still further embodiments the transport of contaminants into a body of water is reduced. In other embodiments the transport of contaminants into a body of water is inhibited.

In still other embodiments the passing of light into a body of water is attenuated. In other embodiments the passing of light into a body of water is reduced. In still other embodiments the passing of light of a specific range of wavelengths into a body of water is attenuated. In other embodiments the passing of light of a specific range of wavelengths into a body of water is reduced.

A further aspect of the invention is the provision of a system for controlling evaporation from a body of water, the system including a layer formed from the assembly of a water insoluble compound and a water soluble polymer, wherein the water soluble polymer interacts with the water insoluble compound of the layer by non-covalent bonding interactions and includes at least one polymer selected from the group consisting of (i) carbonyl polymers including at least one functional group having a carbonyl moiety and (ii) non-carbonyl polymers having a molecular weight of at least about 5000, and wherein the water soluble polymer further includes less than 10% (w/w) of water soluble ionized polymers.

In some embodiments of the system, the water insoluble compound and the water soluble polymer interact by hydrogen bonding. The water soluble polymer and the water insoluble compound may include functional groups which associate by hydrogen bonding interactions.

The system of the invention includes a layer which is prepared from a water insoluble compound. The layer may be included in a water insoluble component of the system and is formed when a water insoluble compound is spread onto a body of water and assembles at the air-water interface to generate the layer structure. The layer may be regarded as a thin film that is spread over the surface of the body of water.

In some embodiments, the layer includes a plurality of functional groups. The plurality of functional groups can be derived from functional groups that may be present in the water insoluble compound used to form the layer.

In forming the layer of the system of the invention, at least one water insoluble compound as described herein may be employed. In some embodiments, a mixture of two or more water insoluble compounds may be used to form the layer structure.

When functional groups are present in the water insoluble compound used to form the layer of the system of the invention, the functional groups are capable of participating in non-covalent bonding interactions. In some embodiments, the water insoluble compound includes at least one functional group selected from the group consisting alcohol, carboxylic acid, ketone, aldehyde, ester, ether, amine, amide, sulfone, sulfonic acid, sulfoxide, thiol, phosphonic acid and phosphate functional groups. Corresponding anions, cations or salts of the aforementioned functional groups may also be included. In some specific embodiments, the water insoluble compound includes at least one functional group selected from the group consisting of alcohol, carboxylic acid and ether functional groups. In some specific embodiments, the water insoluble compound includes an alcohol (hydroxyl) and an ether functional group.

In some embodiments, the layer is formed from at least one water insoluble compound selected from the group consisting of fatty acids, fatty alcohols and alkylene glycol monoethers of fatty alcohols.

In some embodiments, the layer is formed from at least one water insoluble compound as described herein. The layer may be formed from at least one compound of Formula (I), Formula (II), Formula (III), Formula (IV) or Formula (V) as described herein.

In accordance with some embodiments the layer is formed from at least one water insoluble compound selected from the group consisting of cetyl alcohol, stearyl alcohol, arachidyl alcohol, behenyl alcohol, ethylene glycol monocetyl ether, ethylene glycol monostearyl ether, ethylene glycol monoarachidyl ether and ethylene glycol monobehenyl ether.

The system of the invention also includes a water soluble polymer. The water soluble polymer may be included in a water soluble component of the system. The water soluble polymer includes at least one polymer selected from the group consisting of (i) carbonyl polymers including at least one functional group having a carbonyl moiety and (ii) non-carbonyl polymers having a molecular weight of at least about 5000. Such carbonyl polymers and non-carbonyl polymers are described herein. The water soluble polymer further includes less than 10% (w/w) of water soluble ionized polymers. Examples of water soluble ionized polymers are described herein.

In embodiments of the invention, the water soluble polymer includes less than 5% (w/w) water soluble ionized polymers. In specific embodiments, the water soluble polymer is substantially free of water soluble ionized polymers.

Generally, water soluble carbonyl polymers and non-carbonyl polymers used in the invention include at least one functional group adapted to participate in non-covalent bonding interactions with the layer. More typically, the water soluble polymers include a plurality of functional groups. The water soluble carbonyl polymers and non-carbonyl polymers may contain a single type of functional group or alternatively, the polymers may contain a mixture of different types of functional groups. Mixtures of functional groups may be obtained if different types of functional monomer compounds are used to prepare the polymers.

In one aspect of the invention the water soluble polymer is adapted to interact with the layer by non-covalent bonding interactions that occur between respective functional groups present on the water soluble polymer and the layer. In some embodiments, the non-covalent bonding interactions may be selected from the group consisting of electrostatic bonding, van der Waals and hydrogen bonding interactions. More than one type of non-covalent bonding interaction may exist between the water soluble polymer and the layer. The system may also include blends of two or more water soluble polymers.

In some embodiments of the system of the invention, the water soluble polymer includes at least one polymer including at least one functional group selected from the group consisting of alcohol, carboxylic acid, ketone, aldehyde, ester, ether, amine, amide, sulfone and thiol functional groups. In some specific embodiments, the water soluble polymer includes a carbonyl polymer including at least one functional group selected from the group consisting of amide and carboxylic acid functional groups. In other specific embodiments, the water soluble polymer includes a non-carbonyl polymer including at least one functional group selected from the group consisting of alcohol and ether functional groups.

It is an aspect of the invention that the water soluble polymer includes a polymer having functional groups that are selected from those that are adapted to participate in non-covalent bonding interactions, such as hydrogen bonding interactions, with the layer formed from the water insoluble compound. Some specific examples of functional groups that may be present on the water soluble polymer and the water insoluble compound used to form the layer are described herein.

Water soluble polymers employed in the invention may include a homopolymer or a copolymer as described herein. In some embodiments of the system the water soluble polymer includes a homopolymer or copolymer derived from at least one compound selected from the group consisting of acrylic acid, methacrylic acid, acrylamide, N-alkyl acrylamide, glycerol, ethyleneimine, ethylene oxide, vinyl pyrrolidone, vinyl acetate, the hydrolysis products of vinyl acetate, 2-hydroxyethyl acrylate, maleic acid, maleic anhydride and dimethylaminoethylacrylate. Such compounds can be used to form a homopolymer or copolymer having functional groups such as hydroxyl (alcohol), carboxylic acid, ester, ether and amide functional groups.

In some specific examples, the water soluble polymer used in the present invention may include natural polymers and/or synthetic polymers. Examples of natural carbonyl polymers that may be used include polypeptides, while examples of non-carbonyl polymers that may be used include natural gums and polysaccharides such as cellulose and starch. Examples of synthetic carbonyl polymers that may be used include polyacid polymers, ester containing polymers and amide containing polymers. Examples on synthetic non-carbonyl polymers that may be used include polyhydroxy polyether polymers, polyether polymers and amine containing polymers. Synthetic derivatives of natural polymer may also be used.

Some examples of polyacid polymers include poly(acrylic acid), poly(methacrylic acid) and poly(acrylic acid-co-methacrylic acid).

Some examples of polyhydroxy polyether polymers include poly(glycerol).

Some examples of polyether polymers include poly(ethylene glycol), mono-$C_1$ to $C_4$ alkyl ethers of poly(ethylene glycol) and di-$C_1$ to $C_4$ alkyl ethers of poly(ethylene glycol). A person skilled in the art would understand that poly(ethylene glycol) is also known as poly(ethylene oxide).

Some examples of amide containing polymers include poly(acrylamide), poly(methacrylamide), poly(N-alkyl acrylamide), poly(N-alkylmethacrylamide), poly(acrylamide-co-acrylic acid) and poly(vinyl pyrrolidone). In some embodiments the water soluble polymer is poly(N-methylacrylamide). In still other embodiments the polymer is poly(N-ethylacrylamide). In still other embodiments the polymer is poly(N-isopropylacrylamide). Other N-alkylacrylamides suitable for use with the invention would be appreciated by one having skill in the art.

Some examples of amine containing polymers include poly(ethyleneimine).

Some examples of ester containing polymers include poly (2-hydroxyethylacrylate) and poly(dimethylaminoethylacrylate).

Some examples of polyhydroxy polymers include poly(vinyl alcohol). It would be appreciated by a person skilled in the art that poly(vinyl alcohol) may be obtained from the hydrolysis of poly(vinyl acetate).

Some examples of synthetic derivatives of natural polymers include ether derivatives of polysaccharides such as cellulose and starch, such as for example, methylcellulose and hydroxypropyl cellulose.

Other examples of water soluble polymer that may be used in the invention include poly(vinyl pyrrolidone) and copolymers of maleic acid or maleic anhydride.

Some examples of specific combinations of water soluble polymer and water insoluble compound are described herein. Other water insoluble compounds that are capable of forming layers or films at an air-water interface would be understood by one skilled in the art.

In one specific embodiment, the layer may be formed from a water insoluble compound including an alcohol and/or an ether functional group. In this embodiment, the water soluble polymer may include a carbonyl polymer including at least one functional group selected from the group consisting of a carboxylic acid and an amide functional group.

In another specific embodiment, the layer may be formed from a water insoluble compound including at least one functional group selected from the group consisting of a carboxylic acid and an amide functional group. In this embodiment the water soluble polymer may include a non-carbonyl polymer including alcohol and/or ether functional groups. Carboxylic acid and amide functional groups are believed to be able to associate with alcohol and/or ether functional groups by hydrogen bonding interactions.

The association of the water soluble polymer with the layer results in a two-component or "duolayer" system being generated. Without wishing to be limited by theory, it is believed that the non-covalent bonding interactions between the water soluble polymer and the layer assist to anchor the layer to the aqueous subphase and help stabilise the layer against loss due to the disruptive action of wind, volatilization to the atmosphere or other mechanisms. It has been found by the inventors that layers which are associated with a water soluble polymer by non-covalent bonding interactions display a reduced susceptibility to loss after exposure to wind.

In one embodiment, the system of the invention includes a layer formed from the water insoluble compound ethylene glycol monostearyl ether and a water soluble polymer including poly(acrylic acid). An example of this system is shown in FIG. 1. Ethylene glycol monostearyl ether includes hydroxyl and ether functional groups while poly(acrylic acid) includes carboxylic acid functional groups. Referring to FIG. 1, the ethylene glycol monostearyl ether assembles to form a water impermeable layer structure at the air-water interface of a body of water. The hydrophilic head group, which includes hydroxyl and ether functional groups, extends into the aqueous subphase while the hydrophobic stearyl tail extends into the surrounding atmosphere. The carboxylic acid functional groups of the poly(acrylic acid) associates with the hydroxyl and ether functional groups of the ethylene glycol monostearyl ether via hydrogen bonds. The hydrogen bonding interaction of the layer with the polymer acts to stabilise the layer against undesirable loss.

The system of the invention may in some embodiments, also include an operative moiety. The operative moiety may be associated with the water soluble polymer of the system of the invention. In one embodiment, the operative moiety is covalently bonded to the water soluble polymer. In an alternative embodiment, the operative moiety is associated with the water soluble polymer by non-covalent bonding interactions such as those described herein. Examples of non-covalent bonding interactions include electrostatic bonding and hydrogen bonding interactions. The operative moiety may include at least one, and in some embodiments, may include two or more, functional groups to enable the moiety to participate in non-covalent bonding interactions. The association of the operative moiety with the water soluble polymer enables the operative moiety to become located at the air-water interface of the body of water. In some embodiments the operative moiety may be selected from the group consisting of a radiation absorbing moiety, a radiation reflecting moiety, a sensor moiety, a crosslinking moiety and a biologically active moiety. Examples of operative moieties that may be used in the system of the invention are described herein.

In some embodiments the system of the invention may also include a crosslinking agent. The crosslinking agent may associate with the water soluble polymer and the layer and therefore enhance the interaction between the layer and the water soluble polymer by providing crosslinks there-between. The crosslinking agent may also be used to provide crosslinks between different chains of water soluble polymer.

In some embodiments, the crosslinking agent associates with the water soluble polymer and either the layer or another chain of water soluble polymer by non-covalent bonding interactions, such as those described herein. The non-covalent interactions may be hydrogen bonds.

The crosslinking agent may include two or more functional groups which are each adapted to participate in non-covalent bonding interactions with the functional groups of the water soluble polymer and either the layer or another chain of the water soluble polymer. In some embodiments a first functional group of the crosslinking agent interacts with a functional group of the water soluble polymer, while a second functional group of the crosslinking agent interacts with a functional group of either the layer or another chain of the water soluble polymer to form a crosslink there-between. In this manner, the crosslinking agent is able to provide associations between the water soluble polymer and either the layer or another chain of the water soluble polymer. In some embodiments, the functional groups of the crosslinking agent are each independently selected from the group consisting of alcohol, carboxylic acid, ketone, aldehyde, ester, ether, amine, amide, sulfone, sulfonic acid, sulfoxide, thiol, phosphonic acid, phosphate and a corresponding anion, cation or salt thereof. In some embodiments, the functional groups of the crosslinking agent are each independently selected from the group consisting of alcohol, carboxylic acid and ether functional groups. Examples of crosslinking agents that may be employed in the system of the invention are described herein.

The ability of the crosslinking agent to provide crosslinks between the water soluble polymer and the layer may help to improve the durability of the layers employed in the invention and therefore assist in providing more effective evaporation control. Moreover, as the crosslinking agent is associated with the water soluble polymer and the layer by non-covalent interactions, the crosslinking association can be reversed under appropriate conditions. The ability to reverse the associations may be desirable for controlled dispersion or disruption of the system of the invention.

In addition, the use of a crosslinking agent to provide associations between two different chains of water soluble polymer may be desirable to increase the viscosity of the water soluble component of the layer structure or to impart additional properties to the water soluble component of the layer.

In one aspect of the invention the water insoluble compound and the water soluble polymer may be formulated in a composition for application to the body of water. The composition may be formulated for application to the body of water by any suitable method. In one embodiment the composition may be a liquid composition that is applied to the body of water. The liquid composition may be poured or sprayed into the water to apply the water insoluble compound and the water soluble polymer to the body of water. The liquid composition may be in the form of a single phase solution or in the form of an emulsion, suspension or dispersion. Suspensions and dispersions may involve a mixture of finely divided solid in a liquid solvent medium. In another embodiment the composition may be a solid composition. The solid composition may be dispersed in the body of water to apply the water insoluble compound and the water soluble polymer to the water. The solid composition may dissolve or disintegrate upon contact with the water. The solid composition may be of any form, including for example, powder, particulate or granular form.

The composition may also include a carrier. The carrier may be a suitable ecologically or physiologically compatible carrier. The carrier may be a water-soluble solid or a liquid. When used, the carrier is combined with the water insoluble compound and the water soluble polymer to form the composition. It is desirable that the carrier does not present a significant adverse risk to the health of plant, aquatic or animal life. In one embodiment the carrier is a water soluble solvent. The water soluble solvent may be selected from water and a $C_1$-$C_4$ alcohol, such as ethanol. Other suitable water soluble solvents may also be used. In other embodiments the composition may include one or more inorganic carriers. Suitable inorganic carriers may be selected from the group consisting of water soluble salts and water insoluble inorganic minerals, such as kaolin, clays and talc.

The composition may also be contained in a container that allows for automated or controlled dispensing of the composition to the body of water. In some embodiments, the composition is contained in a buoyant dispenser including a housing containing the composition. The housing may include one or more pores for providing controlled release of the composition to the body of water.

The composition can include at least one water insoluble compound and at least one water soluble polymer in admixture, and may include a blend of two or more water insoluble compounds and/or two or more water soluble polymers. When a blend of compounds and/or polymers is used, the mixture of compounds and polymers can become intermingled and may impart unique properties to the layer.

The composition may include from about 1% to 99% (by weight) of at least one water soluble polymer and from about 1% to 99% (by weight) of at least one water insoluble compound as described herein.

The composition may be applied to a body of water at a suitable rate and a person skilled in the art would understand that such rates may be dependent on the surface area of the body of water and the desired frequency of application. In some embodiments it is desirable that the composition be applied no more than once per day. In some specific embodiments the composition is applied to the surface of the body of water at a rate of from about 1 mg/m$^2$ to 20 mg/m$^2$ and preferably, from 2 mg/m$^2$ to 15 mg/m$^2$, over a period of no more than 24 hours.

It is believed that the present invention can provide one or more advantages over conventional compositions, methods and systems described in the prior art, including reduced volatilization, improved wind resistance, enhanced spreadability, improved evaporation resistance, and the need for less frequent application than compositions and systems of the prior art.

EXAMPLES

The following examples illustrate the present invention in further detail however the examples should by no means be construed as limiting the scope of the invention as described herein.

Materials

Stearyl alcohol (C18OH), cetyl alcohol (C16OH) and ethylene glycol monocetyl ether (C16E1) were all purchased from Sigma Aldrich and were all ≥99% pure. Ethylene glycol monostearyl ether (C18E1) was purchased from Shanghai TitanChem and was >98.5% pure.

Stearyl diethylene glycol monomethyl ether (C18E2Me) was prepared by reacting stearyl bromide (0.6 mmol) with diethylene glycol monomethyl ether (3 mmol) in the presence of tetrabutylammonium hydrogen sulphate (0.15 mmol) in 3:1 tetrahydrofuran:sodium hydroxide solution (50%) at 90° C. for 72 hours. The product was separated by solvent extraction using water and diethyl ether and purified by column chromatography. $^1$H NMR and TLC verified the purity and structure of the resulting product.

Poly(acrylic acid) (PAA) (4×10$^6$ g/mol and 2×10$^3$ g/mol), poly(vinyl pyrrolidone) (PVP) (1.3×10$^6$ g/mol), carboxymethyl cellulose sodium salt (CMC) (0.7×10$^6$ g/mol), poly(ethylene oxide) (PEO) (4×10$^6$ g/mol), poly(vinyl alcohol) (PVA) (8.9–9.8×10$^4$ g/mol), poly(ethylene-alt-maleic anhydride) (PEMA) (1-5×10$^5$ g/mol) and poly(acrylamide-co-acrylic acid) (5×10$^6$ g/mol) were all purchased from Sigma Aldrich and used as received.

Poly(acrylamide) (PAAm) (molecular weights of 10×10$^6$ g/mol, 14×10$^6$ g/mol, 20×10$^6$ g/mol) were obtained from Orica Australia, poly(acrylamide) (4×10$^6$ g/mol) was obtained from Ciba.

Poly(vinyl pyrrolidone-co-methyl acrylate) was synthesized by conventional free radical polymerization. It contained 75% vinyl pyrrolidone and 25% methyl acrylate.

Example 1

System with poly(acrylic acid) and ethylene glycol monostearyl ether

Monolayer Properties

A 700 cm$^2$ Langmuir trough (Nima) was filled with ultra-pure water (18.2 MΩMillipore) and allowed to equilibrate to a temperature of 25±1° C.

A composition containing poly(acrylic acid) and ethylene glycol monostearyl ether was prepared by firstly making up a 1 mg/ml solution of poly(acrylic acid) (PAA, MW=4×10$^6$ g/mol) in water and a 1 mg/ml solution of ethylene glycol monostearyl ether (C18E1) in ethanol, then combining desired quantities of the two solutions to form a single composition solution having a desired molar ratio of PAA:C18E1. In this matter, compositions containing a molar ratio of PAA:C18E1 of 1:0.1 and 1:1 were prepared.

Comparative compositions containing either cetyl alcohol (C16OH) or ethylene glycol monostearyl ether (C18E1) on their own in chloroform at a concentration of 1 mg/ml were also prepared. Cetyl alcohol (C16OH) and ethylene glycol monostearyl ether (C18E1) have both been described in the prior art as compounds that are capable for forming layers at an air-water interface.

For each set of measurements the solution was deposited onto the water surface via a microsyringe. Water without any surface film was used as a control.

Evaporation Resistance

The Langmuir Schaefer method (J. Franklin Inst, 235, (1943) pg 119-162) was used to determine the rate of water evaporation. Using this method, a container of dried lithium chloride with a base of permeable cloth was supported 2.5 mm above the water surface for various lengths of time. The container was weighed before and after each measurement with the difference being the amount of water lost to evaporation during that time. The results are shown in FIG. 2.

Figure 2:
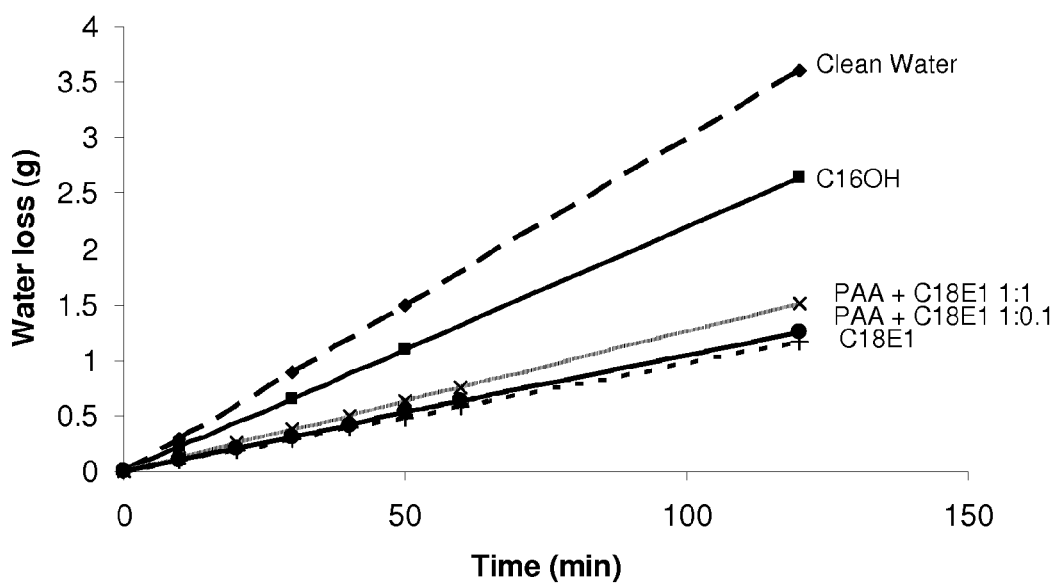
FIG. 2 is a graph illustrating the amount of water lost due to evaporation over time for water samples treated with systems containing poly(acrylic acid) (PAA) and ethylene glycol monostearyl ether (C18E1) in accordance with one embodiment of the invention, as well as water samples treated with comparative systems containing either cetyl alcohol (C16OH) or ethylene glycol monostearyl ether (C18E1) alone and an untreated water sample (control).

As seen in FIG. 2, layers formed with compositions containing a mixture of poly(acrylic acid) and ethylene glycol monostearyl ether at PAA:C18E1 molar ratios of 1:1 and 1:0.1 were effective at controlling water evaporation as evidenced by the reduced water loss compared with an untreated control sample of water. In addition, the films formed from a mixture of PAA and C18E1 were also more effective at reducing water loss by evaporation than a layer formed with cetyl alcohol (C16OH) alone. The PAA and C18E1 systems tested were observed to provide similar evaporation resistance as that of a layer formed with ethylene glycol monostearyl ether (C18E1) alone.

Wind Resistance

The wind resistance of a system containing ethylene glycol monostearyl ether (C18E1) with poly(acrylic acid) (1:1 molar ratio) and comparative layers formed with either cetyl alcohol alone (C16OH) or ethylene glycol monostearyl ether (C18E1) alone were tested according to the following procedure:

Firstly, a barrier was inserted into a trough of water to divide the water in the trough. A prepared composition was then spread on the surface of the water on one side of the barrier and a thin layer of talc was applied to the surface of the water on the other side of the barrier. The barrier was then removed with the surface pressure of the layer holding the talc in place. A fan was used to blow air over the trough at increasing velocities and the distance moved by each monolayer/talc front at different wind speed velocities was then measured and compared. The results are shown in FIG. 3.

Figure 3:
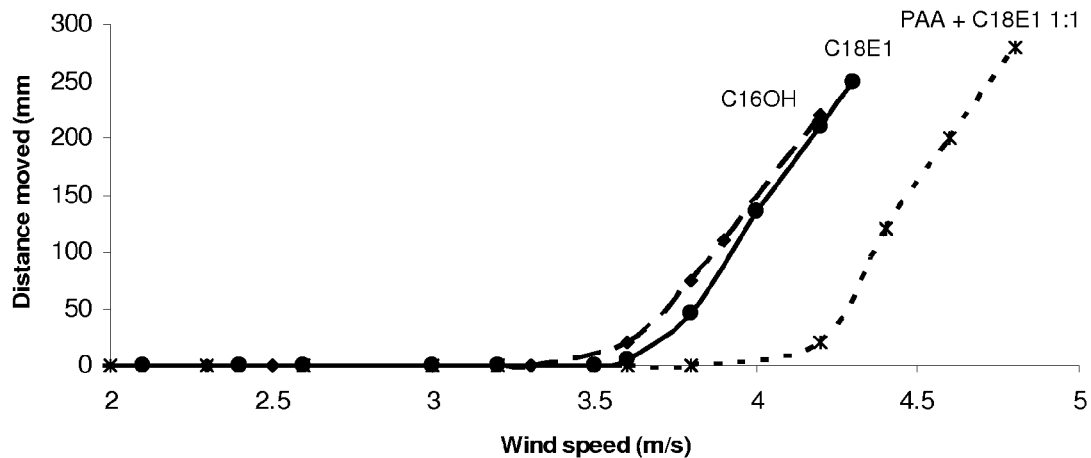
FIG. 3 is a graph illustrating the wind resistance of systems containing poly(acrylic acid) (PAA) and ethylene glycol monostearyl ether (C18E1) in accordance with one embodiment of the invention compared to comparative systems containing either cetyl alcohol (C16OH) or ethylene glycol monostearyl ether (C18E1) alone.

As seen in the results of FIG. 3, the system prepared from a composition containing PAA and C18E1 at a molar ratio of 1:1 demonstrated improved wind resistance as evidence by the fact that the talc front for this system did not begin moving until a wind speed in excess of 4.0 m/s was generated. In comparison, the talc front of layers formed with either cetyl alcohol alone or ethylene glycol monostearyl ether began moving at lower wind speeds.

Therefore, it can be seen that the wind resistance afforded by a system of the invention was greater than that of layers formed using either cetyl alcohol or ethylene glycol monostearyl ether alone. It is believed that the presence of the water soluble polymer, PAA, imparts an increased wind resistance to the monolayer formed using ethylene glycol monostearyl ether.

Example 2

System with Poly(Acrylic Acid) and Stearyl Alcohol

Monolayer Properties

A 700 cm$^2$ Langmuir trough (Nima) was filled with ultra-pure water (18.2 MΩMillipore) and allowed to equilibrate to a temperature of 25±1° C.

A composition containing poly(acrylic acid) and stearyl alcohol was prepared by firstly making up a 1 mg/ml solution of poly(acrylic acid) (PAA, MW=4×10$^6$ g/mol) in water and a 1 mg/ml solution of stearyl alcohol (C18OH) in ethanol, then combining desired quantities of the two solutions to form a single composition solution having a desired molar ratio of PAA:C18OH of 1:1.

A comparative composition containing stearyl alcohol (C18OH) on its own in chloroform at a concentration of 1 mg/ml was also prepared.

For each set of measurements the solution was deposited onto the water surface via a microsyringe. Water without any surface film was used as a control.

Evaporation Resistance

The evaporation resistance of systems prepared with a composition containing PAA and C18OH in a molar ratio of 1:1, or a composition containing stearyl alcohol alone was measured using the procedure described in Example 1. The results are shown in FIG. 4.

Figure 4:
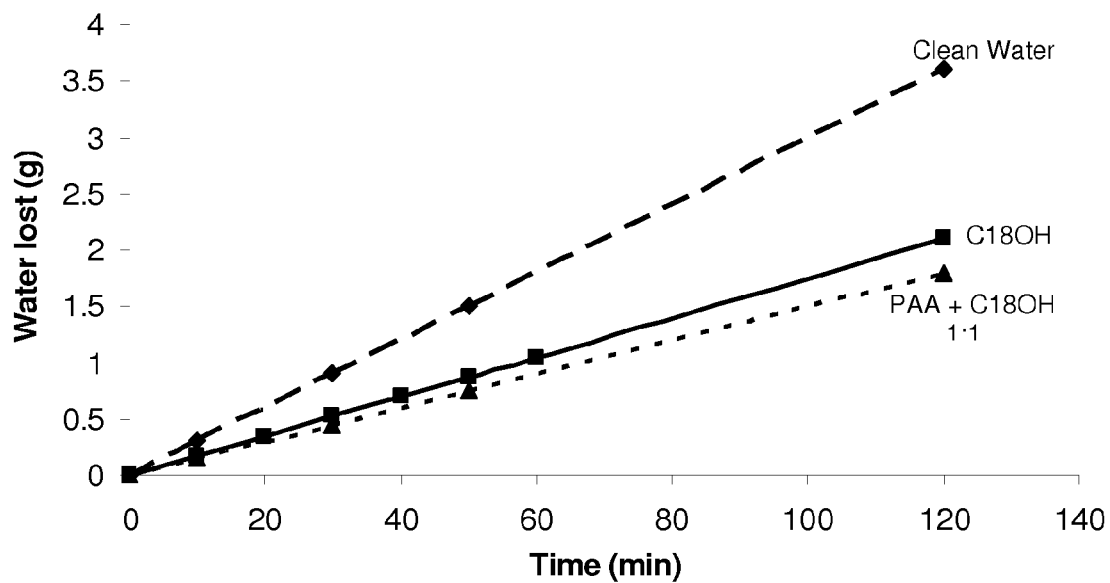
FIG. 4 is a graph illustrating the amount of water lost due to evaporation over time for water samples treated with systems containing poly(acrylic acid) (PAA) and stearyl alcohol (C18OH) in accordance with one embodiment of the invention, as well as water samples treated with a comparative systems containing stearyl alcohol (C18OH) alone and an untreated water sample (control).

As seen in FIG. 4, a film formed from a composition containing a mixture of poly(acrylic acid) and stearyl alcohol at PAA:C18OH molar ratio of 1:1 was effective at controlling water evaporation as evidenced by the reduced water loss compared with an untreated control sample of water. The PAA/C18OH system was also observed to provide small improvement in evaporation resistance compared to a monolayer system containing stearyl alcohol alone.

Wind Resistance

The wind resistance of a system containing PAA and C18OH (1:1 molar ratio) and a comparative layer formed with stearyl alcohol alone was tested using the procedure described in Example 1. The results are shown in FIG. 5.

Figure 5:
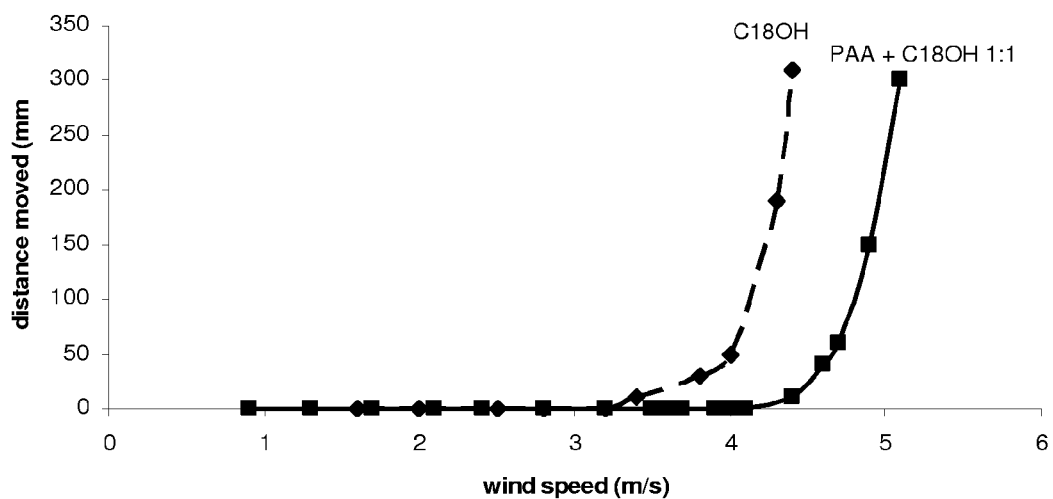
FIG. 5 is a graph illustrating the wind resistance of a system containing poly(acrylic acid) (PAA) and stearyl alcohol (C18OH) in accordance with one embodiment of the invention compared to a comparative system containing stearyl alcohol alone.

As seen in FIG. 5, a system prepared from a composition containing PAA and C18OH had greater wind resistance, as the talc front for this system did not begin moving until a wind speed in excess of 4.0 m/s was reached. This compares to a comparative layer containing stearyl alcohol alone, in which the talc front began moving at lower wind speeds. This experiment therefore shows that the wind resistance afforded by system containing a water soluble polymer was better than a system that did not have the polymer, i.e. stearyl alcohol alone. It is believed that the polymer, PAA, is able to impart an increased wind resistance to the barrier films or layers formed from stearyl alcohol.

Example 3

System with Poly(acrylamide-co-acrylic Acid) and Ethylene Glycol Monostearyl Ether A composition containing poly(acrylamide-co-acrylic acid) and ethylene glycol monostearyl ether (C18E1) was prepared by firstly making up a 1 mg/ml solution of poly(acrylamide-co-acrylic acid) (P(AAm-co-AA)), MW= 5,000,000, 1.5 wt % acrylic acid) in water and a 1 mg/ml solution of ethylene glycol monostearyl ether (C18E1) in ethanol, then combining desired quantities of the two solutions to form a single composition solution having a desired molar ratio of P(AAm-co-AA) functional groups:C18E1 of 1:1.

A comparative composition containing ethylene glycol monostearyl ether (C18E1) on its own in ethanol at a concentration of 1 mg/ml was also prepared.

For each set of measurements the solution was deposited onto the water surface via a microsyringe.

Wind Resistance

The wind resistance of a system containing P(AAm-co-AA) and C18E1 (1:1 molar ratio) and a comparative layer formed with C18E1 alone was tested using the procedure described in Example 1. The results are shown in FIG. 6.

Figure 6:
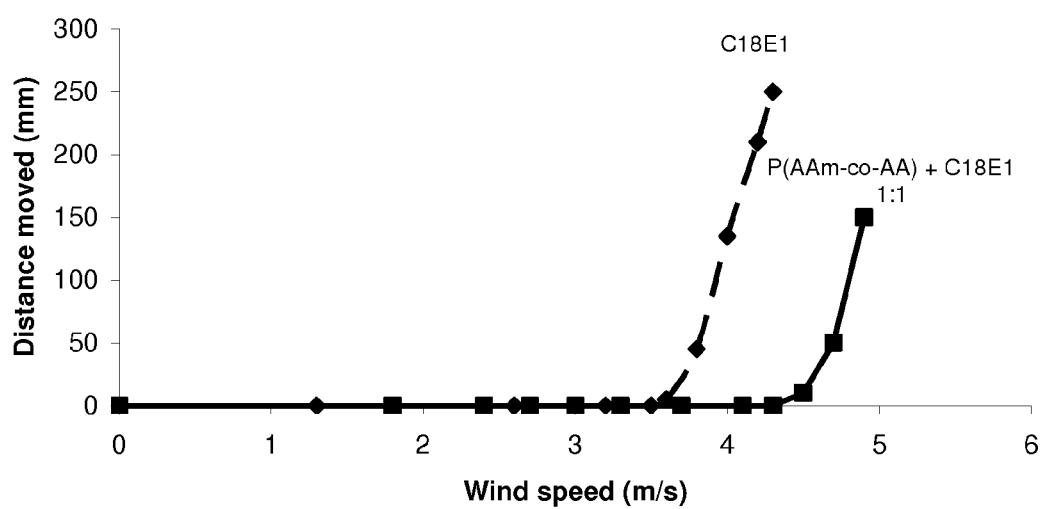
FIG. 6 is a graph illustrating the wind resistance of a system containing poly(acrylamide-co-acrylic acid) P(AAm-co- AA) and ethylene glycol monostearyl ether (C18E1) in accordance with one embodiment of the invention compared to a comparative system containing ethylene glycol monostearyl ether (C18E1) alone.

As seen in FIG. 6, a system prepared from a composition containing P(AAm-co-AA) and C18E1 had greater wind resistance, as the talc front for this system did not begin moving until a wind speed in excess of 4.2 m/s was reached. This compares to a comparative layer containing C18E1 alone, in which the talc front began moving at lower wind speeds. This experiment therefore shows that the wind resistance afforded by system containing a water soluble polymer was better than a system that did not have the polymer, i.e. C18E1 alone. It is believed that the polymer, P(AAm-co-AA), is able to impart an increased wind resistance to the barrier films or layers formed from C18E1.

Example 4

System with Poly(Acrylic Acid) and Stearyl Alcohol

Individual solutions containing stearyl alcohol (C18OH) in ethanol and poly(acrylic acid) (PAA) ($M_w$=4×10$^6$ g/mol) in water were prepared at concentrations of 1 mg/ml. A composition comprising a blend of stearyl alcohol (C18OH) and poly(acrylic acid) (PAA) at a desired mole ratio was then prepared by combining aliquots of the individual solutions of stearyl alcohol and poly(acrylic acid) in the amounts described in Table A. The mole ratio was calculated on the basis of the functional groups so the molecular weight of the PAA unit was used (72 g/mol).

TABLE A

| Volume C18OH (ml) | Volume PAA (ml) | Mole ratio (C18OH:PAA) |
| --- | --- | --- |
| 1.00 | 0.27 | 0.5:0.5 |

The composition prepared in accordance with Table A was tested by applying it to the surface of a sample of water in an 11 cm diameter petri dish. The dish was placed on a digital balance at the mouth of a wind tunnel. The change in weight of the dish was measured over time under exposure to wind; this relates to the evaporation resistance of the film and was compared with a control sample (water only with no film) and with water having films formed with either C18OH or PAA alone. The results are shown in FIG. 7.

Figure 7:
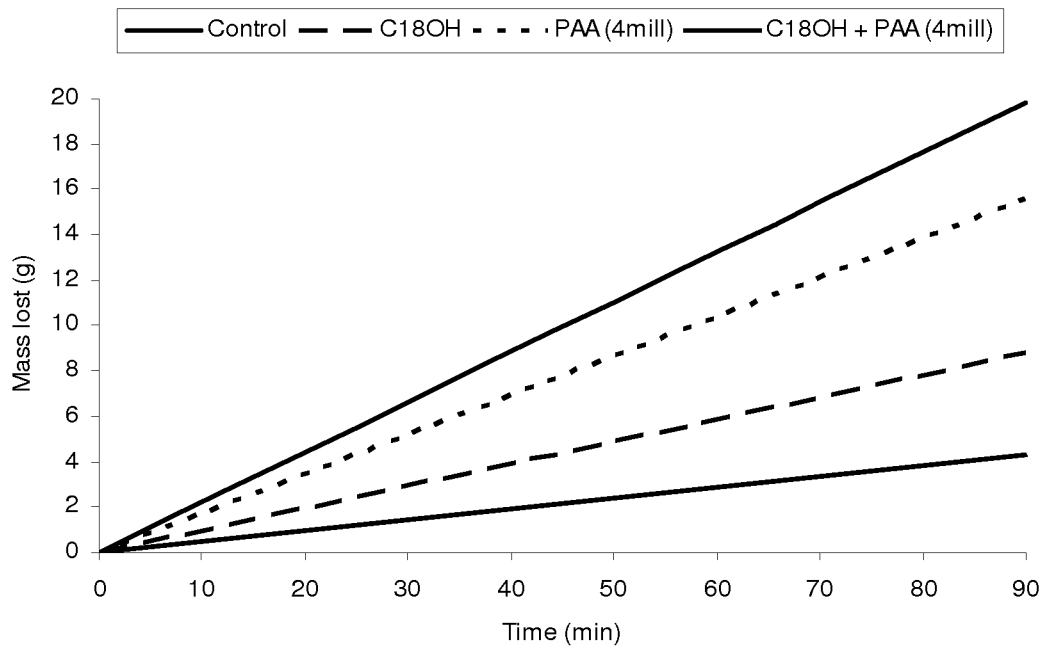
FIG. 7 is a graph illustrating the amount of water lost due to evaporation over time, under exposure to wind, of a system containing poly(acrylic acid) (PAA) and stearyl alcohol (C18OH) in accordance with one embodiment of the invention, compared to comparative systems containing stearyl alcohol alone, poly(acrylic acid) alone, and an untreated water sample (control).

As seen in FIG. 7, less water is lost due to evaporation when a composition comprising the blend of water insoluble compound (C18OH) and polymer (PAA) is used. This compares to the control sample (with no film) or samples with films formed with either C18OH or PAA alone, where a greater mass of water is lost due to evaporation.

Example 5

System with Poly(Acrylic Acid) and Stearyl Diethylene Glycol Monomethyl Ether Individual solutions containing stearyl diethylene glycol monomethyl ether (C18E2Me) in ethanol and poly(acrylic acid) (PAA) ($M_w$=4×10$^6$ g/mol) in water were prepared at concentrations of 1 mg/ml. A composition comprising a blend of stearyl diethylene glycol monomethyl ether (C18E2Me) and poly(acrylic acid) (PAA) in a desired mole ratio was then prepared by combining aliquots of the individual solutions of stearyl diethylene glycol monomethyl ether and poly(acrylic acid) in the amounts described in Table B. The mole ratio was calculated on the basis of the one molecule of C18E2Me interacting with one acid group on the polymer so the molecular weight of the PAA unit was used (72 g/mol). This means that for each acid group there are two ether functional groups.

TABLE B

| Volume C18E2Me (ml) | Volume PAA (ml) | Mole ratio (C18E2Me:PAA) |
|---|---|---|
| 1.00 | 0.19 | 0.5:0.5 |

The composition prepared in accordance with Table B was tested using the procedure in Example 4 for evaporation resistance under wind exposure and compared with a control sample (water only with no film) and with water having films formed with either C18E2Me or PAA alone. The results are shown in FIG. 8.

Figure 8:
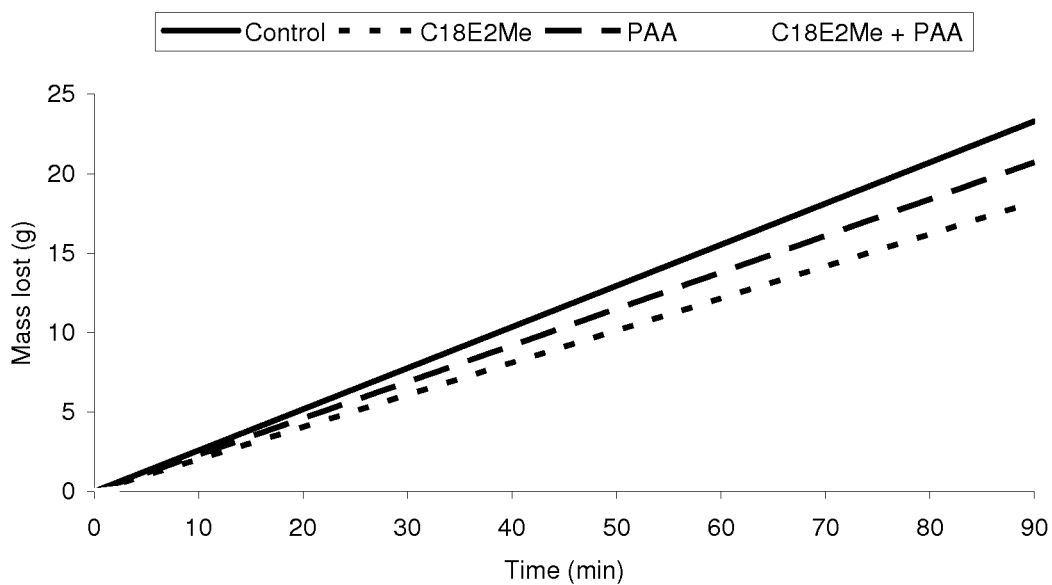
FIG. 8 is a graph illustrating the amount of water lost due to evaporation over time, under exposure to wind, of a system containing poly(acrylic acid) (PAA) and stearyl diethylene glycol monomethyl ether (C18E2Me) in accordance with one embodiment of the invention, compared to comparative systems containing stearyl diethylene glycol monomethyl ether alone, poly(acrylic acid) alone, and an untreated water sample (control).

As seen in FIG. 8, less water is lost due to evaporation when a composition comprising the blend of compounds is used. This compares to the control sample (with no film) or water samples with films formed with either component alone, where a greater mass of water is lost due to evaporation.

Example 6

System with Poly(Acrylic Acid) and Ethylene Glycol Monostearyl Ether

Individual solutions containing ethylene glycol monostearyl ether (C18E1) in ethanol and poly(acrylic acid) (PAA) ($M_w$=4×10$^6$ g/mol) in water were prepared at concentrations of 1 mg/ml. A composition comprising a blend of ethylene glycol monostearyl ether (C18E1) and poly(acrylic acid) (PAA) in a desired mole ratio was then prepared by combining aliquots of the individual solutions of ethylene glycol monostearyl ether and poly(acrylic acid) in the amounts described in Table C. The mole ratio was calculated on the basis of the functional groups so the molecular weight of the PAA unit was used (72 g/mol).

TABLE C

| Volume C18E1 (ml) | Volume PAA (ml) | Mole ratio (C18E1:PAA) |
|---|---|---|
| 1.00 | 0.23 | 0.5:0.5 |

The composition prepared in accordance with Table C was tested for evaporation resistance using the procedure of Example 4 at a wind speed of 15 km/hr and compared with a control sample (water only with no film) and with water having a film formed with C18E1 alone. The results are shown in FIG. 9.

Figure 9:
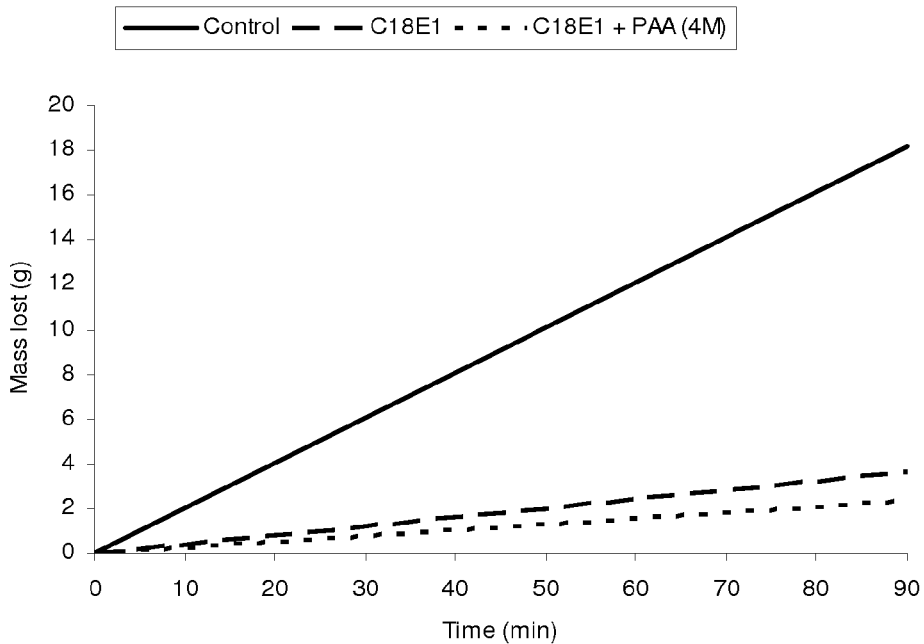
FIG. 9 is a graph illustrating the amount of water lost due to evaporation over time, under exposure to wind, of a system containing poly(acrylic acid) (PAA) and ethylene glycol monostearyl ether (C18E1) in accordance with one embodiment of the invention, compared to comparative systems containing ethylene glycol monostearyl ether alone, and an untreated water sample (control).

As seen in FIG. 9, less water is lost due to evaporation when a composition comprising the blend of compounds is used. This compares to the control sample (with no film) or the sample with films formed with C18E1 alone, where a greater mass of water is lost due to evaporation.

Example 7

Investigation of the Effect of Polymer Molecular Weight

Individual solutions containing stearyl alcohol (C18OH) in ethanol and poly(acrylic acid) (PAA) of various molecular weights in water were prepared at concentrations of mg/ml. Compositions comprising a blend of stearyl alcohol (C18OH) and poly(acrylic acid) (PAA) in desired mole ratios were then prepared by combining aliquots of the individual solutions of stearyl alcohol and poly(acrylic acid) (based on unit molecular weight) in the amounts described in Table D.

TABLE D

| Composition | MW PAA (g/mol) | Volume C18OH (ml) | Volume PAA (ml) | Mole ratio (C18OH:PAA) |
|---|---|---|---|---|
| 7A | 2,000 | 1.00 | 0.27 | 0.5:0.5 |
| 7B | 1.25 × 10$^6$ | 1.00 | 0.27 | 0.5:0.5 |
| 7C | 3 × 10$^6$ | 1.00 | 0.27 | 0.5:0.5 |
| 7D | 4 × 10$^6$ | 1.00 | 0.27 | 0.5:0.5 |

The compositions prepared in accordance with Table D were tested for evaporation resistance and compared with a control sample (water only with no film) and with water samples having films formed with either C18OH or PAA alone. The results are shown in FIG. 10.

Figure 10:
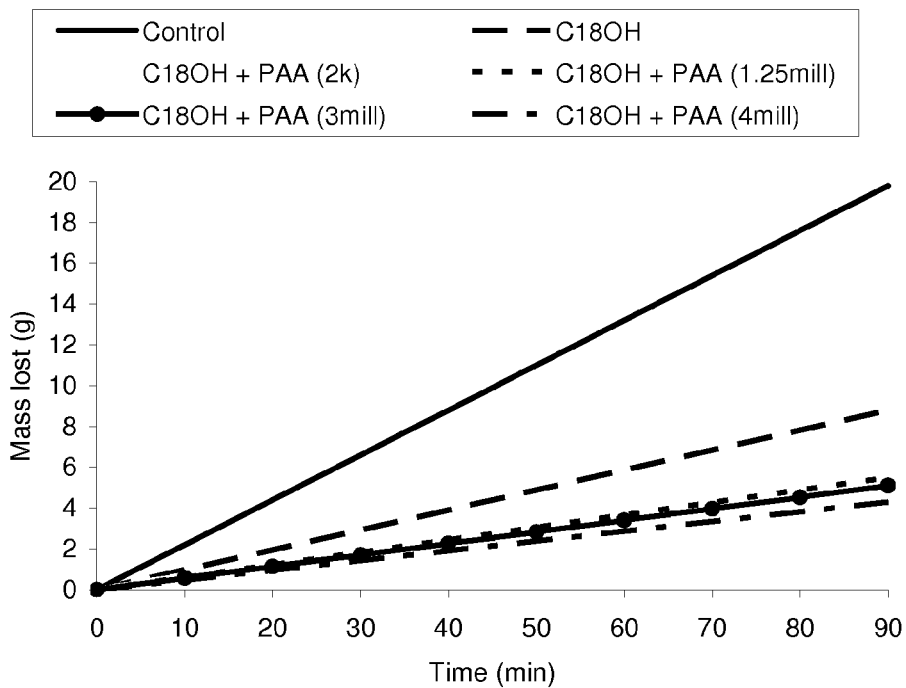
FIG. 10 is a graph illustrating the amount of water lost due to evaporation over time, under exposure to wind, of a system containing poly(acrylic acid) (PAA) of various molecular weights and stearyl alcohol (C18OH) in accordance with embodiments of the invention, compared to comparative systems containing stearyl alcohol alone, and an untreated water sample (control).

As seen in FIG. 10, less water is lost due to evaporation when a composition comprising the blend of compounds is used. This compares to the control sample (with no film) or water with films formed with either C18OH or PAA alone, where a greater mass of water is lost due to evaporation. The compositions containing higher molecular weight PAA were found to perform increasingly better than the compositions with lower molecular weight PAA. This indicates an advantage in using higher molecular weight poly(acrylic acid).

A sample of composition 7B was also tested over a 7 hour period for evaporation control. The mass of water lost to evaporation over this time period was 33 g for composition 7B, compared to 42 g for C18OH alone and 92 g for the control water sample with no film.

Example 8

System with Ethylene Glycol Monostearyl Ether and Carbonyl Polymers

Individual solutions containing ethylene glycol monostearyl ether (C18E1) in ethanol and poly(vinyl pyrrolidone) (PVP) ($M_w$=1.3×10$^6$ g/mol) in water and poly(acrylamide) (PAAm) ($M_w$=4×10$^6$ g/mol) in water were prepared at concentrations of 1 mg/ml. Compositions comprising a blend of C18E1 and either poly(vinyl pyrrolidone) (PVP) or poly(acrylamide) (PAAm) carbonyl polymers in desired mole ratios were then prepared by combining aliquots of the individual solutions of ethylene glycol monostearyl ether and poly(vinyl pyrrolidone) or poly(acrylamide) in the amounts described in Table E.

TABLE E

| Composition | Vol C18E1 (ml) | Vol of polymer (ml) | | Mole ratio (C18E1:polymer) |
| --- | --- | --- | --- | --- |
| | | PVP | PAAm | |
| 8A | 1.00 | 0.35 | — | 0.5:0.5 |
| 8B | 1.00 | — | 0.23 | 0.5:0.5 |

The compositions prepared in accordance with Table E were tested as described in Example 4 at a wind speed of 20 km/hr and compared with a control sample (water only with no film) and with a water sample having a film formed with C18E1 alone. The results for composition 8A are shown in FIG. 11 and for composition 8B in FIG. 12.

Figure 11:
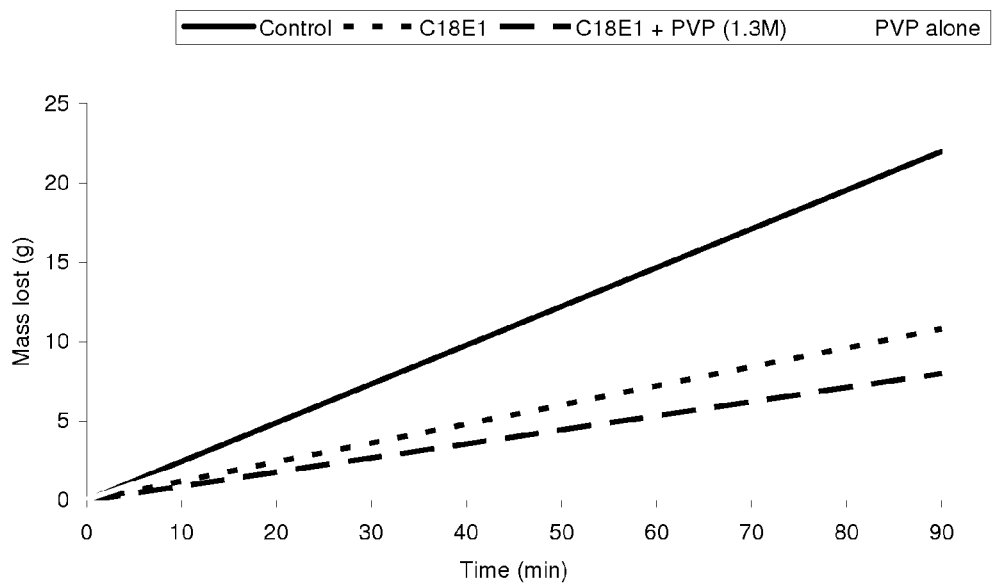
FIG. 11 is a graph illustrating the amount of water lost due to evaporation over time, under exposure to wind, of a system containing poly(vinyl pyrrolidone) (PVP) and ethylene glycol monostearyl ether (C18E1) in accordance with one embodiment of the invention, compared to comparative systems containing ethylene glycol monostearyl ether alone, poly(vinyl pyrrolidone) alone, and an untreated water sample (control).
Figure 12:
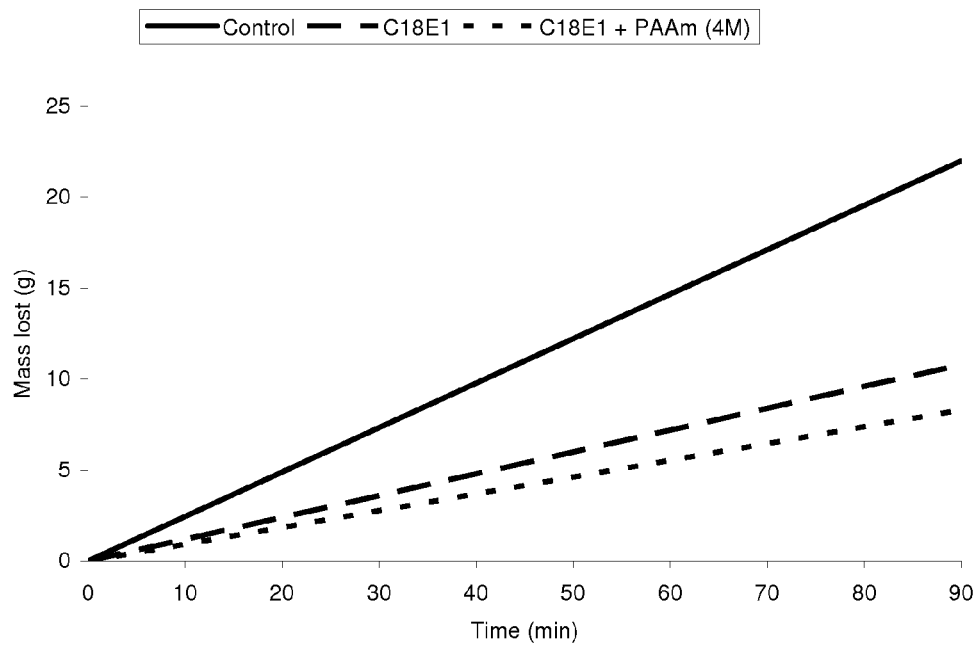
FIG. 12 is a graph illustrating the amount of water lost due to evaporation over time, under exposure to wind, of a system containing poly(acrylamide) (PAAm) and ethylene glycol monostearyl ether (C18E1) in accordance with one embodiment of the invention, compared to comparative systems containing ethylene glycol monostearyl ether alone, and an untreated water sample (control).

As seen in FIGS. 11 and 12, less water is lost due to evaporation when a composition comprising the blend of compounds is used. This compares to the control sample (with no film) or the sample with films formed with C18E1 alone, where a greater mass of water is lost due to evaporation.

Example 9

System with Cetyl Alcohol and Poly(Vinyl Pyrrolidone) at Different Wind Speeds

Individual solutions containing cetyl alcohol (C16OH) in ethanol and poly(vinyl pyrrolidone) (PVP) ($M_w$=1.3×10$^6$ g/mol) in water were prepared at concentrations of 1 mg/ml. A composition comprising a blend of cetyl alcohol (C16OH) and poly(vinyl pyrrolidone) (PVP) at a desired mole ratio was then prepared by combining aliquots of the individual solutions of cetyl alcohol and poly(vinyl pyrrolidone) in the amounts described in Table F. The mole ratio was calculated on the basis of the functional groups so the molecular weight of the PVP unit was used (111 g/mol).

TABLE F

| Volume C16OH (ml) | Volume PVP (ml) | Mole ratio (C16OH:PVP) |
| --- | --- | --- |
| 1.00 | 0.46 | 0.5:0.5 |

The compositions prepared in accordance with Table F were tested as described in Example 4 at wind speeds of 12 km/hr and 7 km/hr and compared with a control sample (water only with no film) and with a water sample having a film formed with C16OH alone. The results are shown in FIG. 13 (12 km/hr) and FIG. 14 (7 km/hr).

Figure 13:
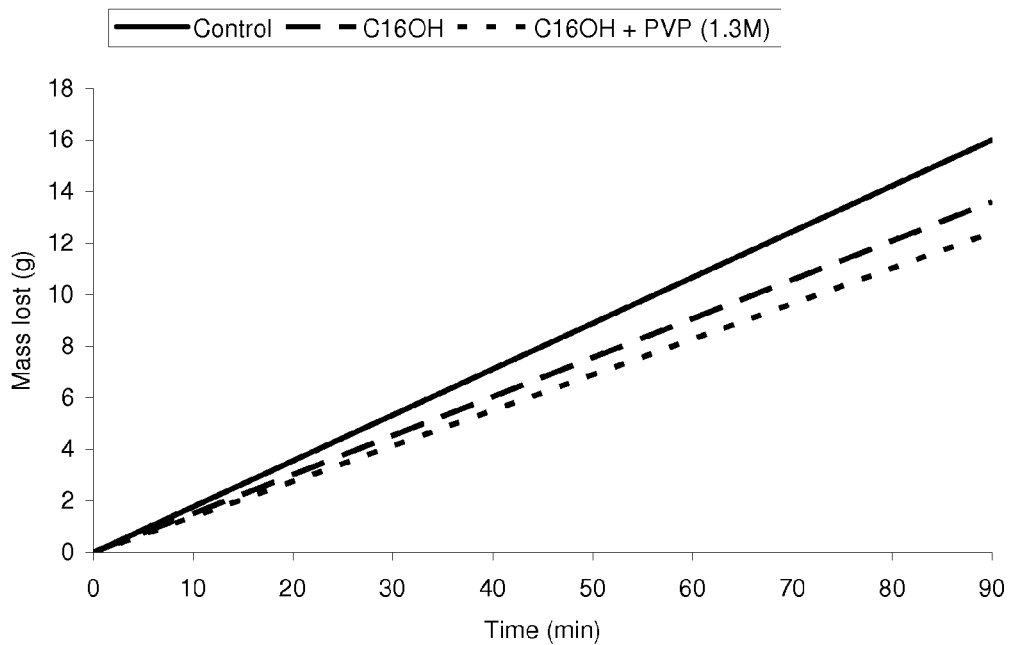
FIG. 13 is a graph illustrating the amount of water lost due to evaporation over time, under exposure to wind, of a system containing poly(vinyl pyrrolidone) (PVP) and cetyl alcohol (C16OH) in accordance with one embodiment of the invention, compared to comparative systems containing cetyl alcohol alone, and an untreated water sample (control).
Figure 14:
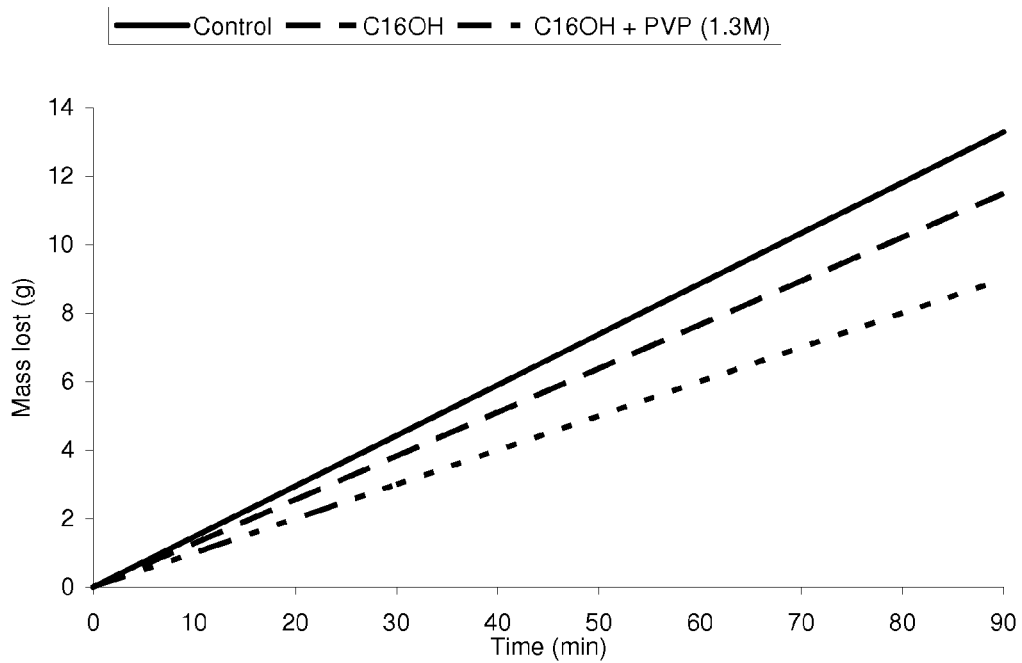
FIG. 14 is a graph illustrating the amount of water lost due to evaporation over time, under exposure to wind, of a system containing poly(vinyl pyrrolidone) (PVP) and cetyl alcohol (C16OH) in accordance with one embodiment of the invention, compared to comparative systems containing cetyl alcohol alone, and an untreated water sample (control).

As seen in FIGS. 13 and 14, less water is lost due to evaporation when a composition comprising a mixture of compounds is used. This compares to the control sample (with no film) or the sample with films formed with C16OH alone, where a greater mass of water is lost due to evaporation.

Example 10

System Including Poly(Vinyl Pyrrolidone) And Comparative System Including an Ionized Polymer Individual solutions of ethylene glycol monostearyl ether (C18E1) in ethanol, poly(vinyl pyrrolidone) (PVP) ($M_w$=1.3×10$^6$ g/mol) in water and carboxymethyl cellulose sodium salt (CMC) ($M_w$=0.7×10$^6$ g/mol) in water were prepared at concentrations of 1 mg/ml. Compositions comprising a blend of ethylene glycol monostearyl ether (C18E1) and poly(vinyl pyrrolidone) (PVP) or carboxymethyl cellulose sodium salt (CMC) in desired mole ratios were then prepared by combining aliquots of the individual solutions of ethylene glycol monostearyl ether and poly(vinyl pyrrolidone) or carboxymethyl cellulose in the amounts described in Table G.

TABLE G

| Composition | Volume C18E1 (ml) | Volume PVP (ml) | Volume CMC (ml) | Mole ratio (C18E1:PVP or CMC) |
| --- | --- | --- | --- | --- |
| 10A | 1.00 | 0.35 | — | 0.5:0.5 |
| 10B (Comparative) | 1.00 | — | 0.77 | 0.5:0.5 |

The compositions prepared in accordance with Table G were tested as described in Example 4 at a wind speed of 24 km/hr and compared with a control sample (water only with no film) and with a water sample having a film formed with C18E1 alone. The results are shown in FIG. 15.

Figure 15:
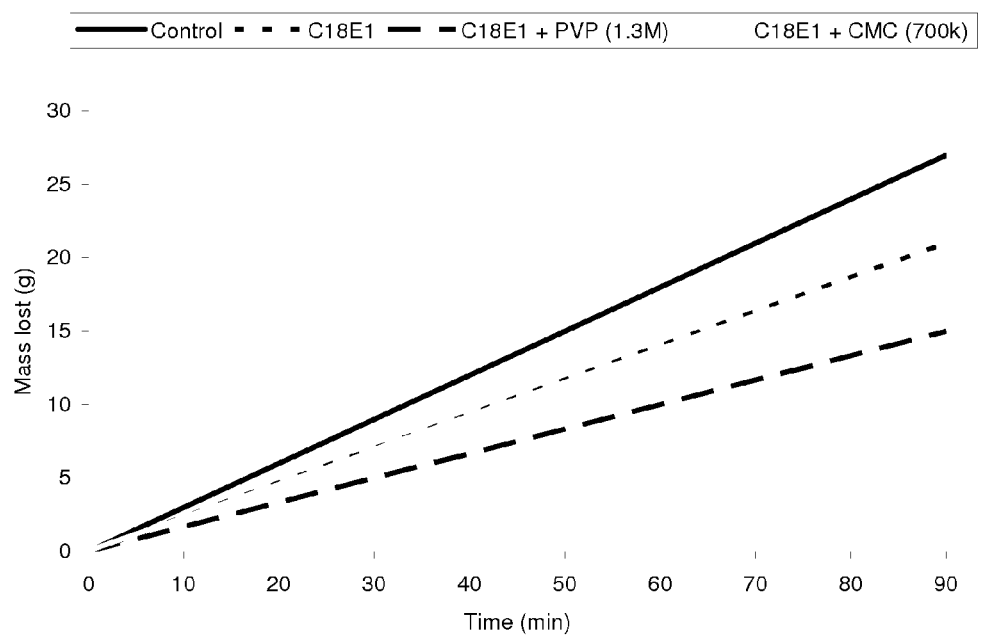
FIG. 15 is a graph illustrating the amount of water lost due to evaporation over time, under exposure to wind, of a system containing poly(vinyl pyrrolidone) (PVP) and ethylene glycol monostearyl ether (C18E1) in accordance with one embodiment of the invention, compared to comparative systems containing carboxymethyl cellulose sodium salt (CMC) with ethylene glycol monostearyl ether, ethylene glycol monostearyl ether alone, and an untreated water sample (control).

As seen in FIG. 15, less water is lost due to evaporation when a composition including the C18E1 and poly(vinyl pyrrolidone) (PVP) is used. In contrast, when a comparative composition containing a water soluble ionized polymer (carboxymethyl cellulose sodium salt) is tested, the reduction in the loss of water by evaporation is the same as for C18E1 alone indicating that ionized polymers do not afford any improvement in the control of water evaporation.

Example 11

Effect of System on Volatilization

Individual solutions containing stearyl alcohol (C18OH) in ethanol and poly(acrylic acid) (PAA) ($M_w$=4×10$^6$ g/mol) in water were prepared at concentrations of 1 mg/ml. A composition comprising a blend of stearyl alcohol (C18OH) and poly(acrylic acid) (PAA) in a desired mole ratio was then prepared by combining aliquots of the individual solutions of stearyl alcohol and poly(acrylic acid) in the amounts described in Table H.

TABLE H

| Volume C18OH (ml) | Volume PAA (ml) | Mole ratio (C18OH:PAA) |
| --- | --- | --- |
| 1.00 | 0.27 | 0.5:0.5 |

Figure 16:
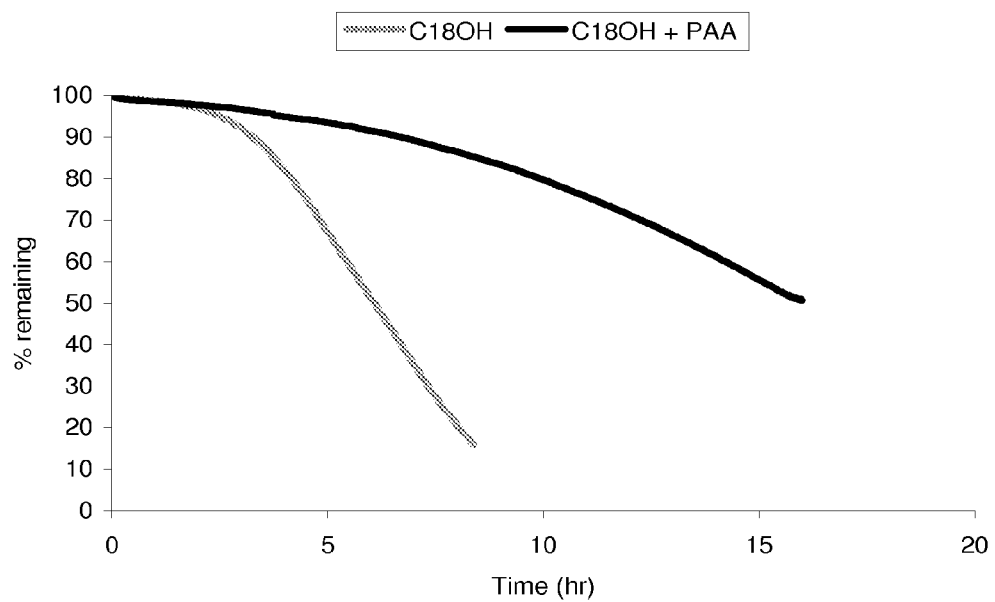
FIG. 16 is a graph illustrating the loss of material from the water surface due to volatilization over time of a system containing poly(acrylic acid) (PAA) and stearyl alcohol (C18OH) in accordance with one embodiment of the invention, compared to a comparative system containing stearyl alcohol alone.

A 700 cm$^2$ Langmuir trough (Nima) was filled with ultra-pure water (18.2 MΩMillipore) and allowed to equilibrate to a temperature of 25±1° C. The composition described in Table H was applied to the water surface and allowed to equilibrate for 15 minutes. The trough barrier was used to compress the monolayer to a surface pressure of 35 mN/m, after which the barrier was instructed to hold the monolayer constantly at that pressure. The change in surface area over time was recorded constantly over several hours. As the monolayer material disappears the barrier was forced to compress the monolayer to maintain the surface pressure of 35 mN/m. The results are compared to the performance of C18OH alone and are shown in FIG. 16. The sample containing poly(acrylic acid) shows a reduced rate of volatilization compared to the sample containing C18OH alone.

Example 12

Effect of System on Spreading

Solid compositions of ethylene glycol monostearyl ether (C18E1) and poly(acrylamide) (PAAm) were prepared by dissolving poly(acrylamide) in water at a concentration of 1 mg/ml and adding the appropriate amount of ethylene glycol monostearyl ether to obtain a mole ratio of 0.5:0.5. The solution was stirred and the water removed through the use of a rotary evaporator. The resulting solid composition included C18E1 and poly(acrylamide) in admixture.

Figure 17:
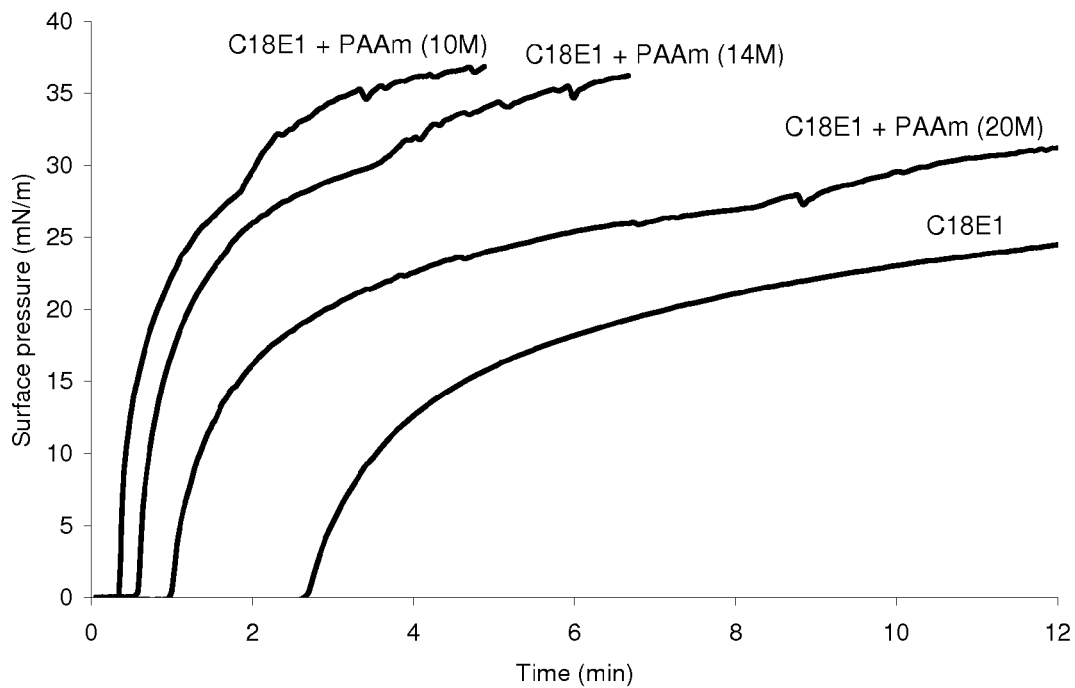
FIG. 17 is a graph illustrating the increase in surface pressure of the water surface over time due to the spreading of material on the water surface of systems containing poly(acrylamide) (PAAm) of various molecular weights and ethylene glycol monostearyl ether (C18E1) in accordance with embodiments of the invention, compared to a comparative system containing ethylene glycol monostearyl ether alone.

The spreading ability of this composition was measured by applying a small amount of the solid to one end of a 70 cm long Langmuir Trough filled with ultrapure water (18.2 MΩMillipore) that had been allowed to equilibrate to a temperature of 25±1° C. The change in surface pressure at the opposite end of the trough was monitored over time using a Wilhelm plate until equilibrium was reached. The change in surface pressure is attributed to the presence of the duolayer. The spreading of the duolayer formulations were compared to that of ethylene glycol monostearyl ether alone. The results are shown in FIG. 17. The samples containing poly(acrylamide) show an enhanced spreading rate compared to the samples containing C18E1 alone. Samples containing lower molecular weight PAAm ($10 \times 10^6$ g/mol) show a faster spreading rate than samples containing higher molecular weight PAAm ($20 \times 10^6$ g/mol).

Example 13

Effect of System on Oxygen Permeation

Individual solutions containing ethylene glycol monostearyl ether (C18E1) in ethanol, poly(acrylic acid) (PAA) ($M_w = 4 \times 10^6$ g/mol) in water and poly(acrylamide) (PAAm) ($M_w = 4 \times 10^6$ g/mol) in water were prepared at concentrations of 1 mg/ml. Compositions comprising a blend of C18E1 and either poly(acrylic acid) (PAA) or poly(acrylamide) (PAAm) in desired mole ratios were then prepared by combining aliquots of the individual solutions of C18E1 and poly(acrylic acid) or poly(acrylamide) in the amounts described in Table I.

TABLE I

| Composition | Volume C18E1 (ml) | Volume PAA (ml) | Volume (PAAm) (ml) | Mole ratio (C18OH:PAA or PAAm) |
|---|---|---|---|---|
| 13A | 1.00 | 0.23 | — | 0.5:0.5 |
| 13B | 1.00 | — | 0.22 | 0.5:0.5 |

Figure 18:
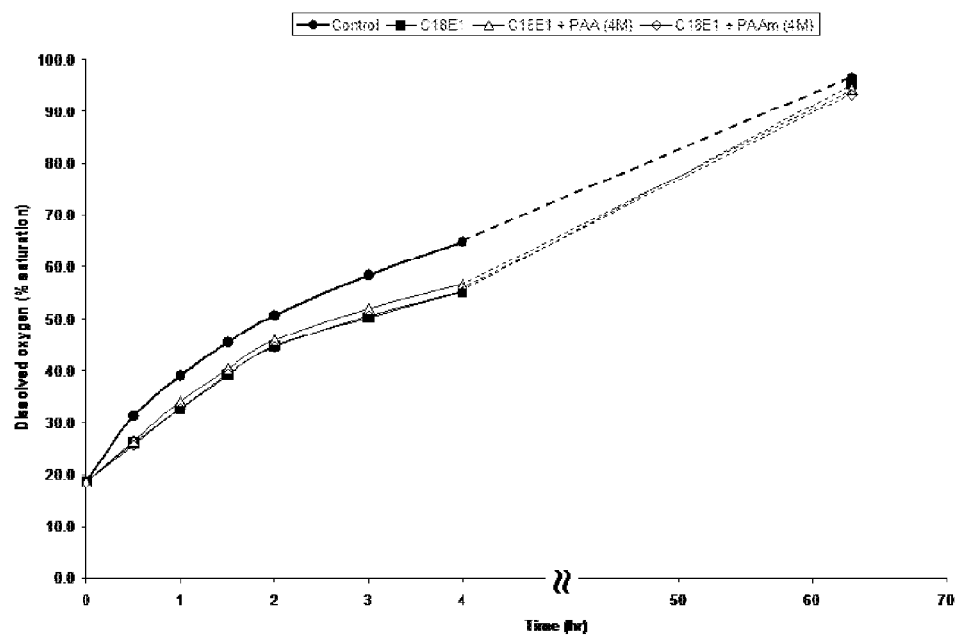
FIG. 18 is a graph illustrating the amount of dissolved oxygen in the water body over time for systems containing ethylene glycol monostearyl ether (C18E1) and either poly(acrylic acid) (PAA) or poly(acrylamide) (PAAm) in accordance with embodiment of the invention, compared to comparative systems containing ethylene glycol monostearyl ether alone, and an untreated water sample (control).

Distilled water was degassed prior to starting the experiment to remove the majority of dissolved oxygen. The degassed water was then distributed into several beakers with the compositions outlined in Table I applied to some beakers while others were treated with C18E1 alone. Beakers of untreated degassed water without films were also used as controls. A dissolved oxygen probe was then used to measure the amount of dissolved oxygen in the water at various time intervals. This allows for comparison between the monolayer and duolayer covered surfaces and surfaces left open to the atmosphere. The results are shown in FIG. 18. Samples containing water soluble polymers (PAA or PAAm) show similar oxygen permeation to the sample containing C18E1 alone, and a minor reduction compared to the control (no film). However a similar equilibrium value is obtained over time for all samples indicating no adverse effect.

Example 14

System with Polyether Polymer and Ethylene Glycol Monostearyl Ether

Individual solutions containing ethylene glycol monostearyl ether (C18E1) in ethanol and high molecular weight poly(ethylene oxide) (PEO) ($M_w = 4 \times 10^6$ g/mol) in water were prepared at concentrations of 1 mg/ml. A composition comprising a blend of C18E1 and PEO in desired mole ratios was then prepared by combining aliquots of the individual solutions of C18E1 and poly(ethylene oxide) in the amounts described in Table J. The mole ratio was calculated on the basis of the ether functional groups so the molecular weight of the PEO unit was used (44 g/mol).

TABLE J

| Volume C18E1 (ml) | Volume PEO (ml) | Mole ratio (C18E1:PEO) |
|---|---|---|
| 1.00 | 0.14 | 0.5:0.5 |

The composition prepared in accordance with Table J was tested as described in Example 4 at a wind speed of 20 km/hr and compared with a control sample (water only with no film) and with a water sample having a film formed with C18E1 alone. The results are shown in FIG. 19.

Figure 19:
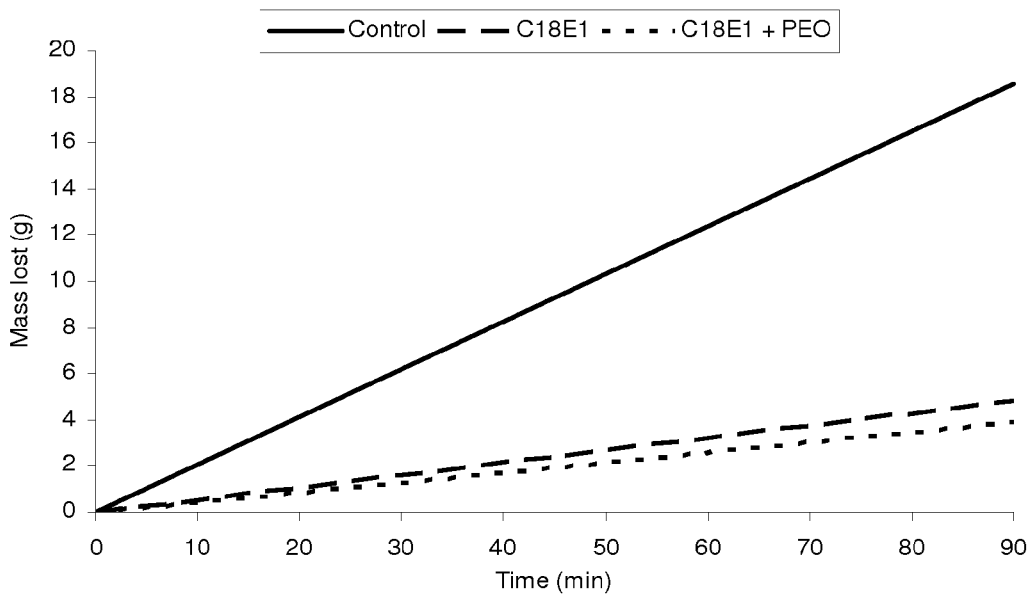
FIG. 19 is a graph illustrating the amount of water lost due to evaporation over time, under exposure to wind, of a system containing poly(ethylene oxide) (PEO) and ethylene glycol monostearyl ether (C18E1) in accordance with one embodiment of the invention, compared to comparative systems containing ethylene glycol monostearyl ether alone, and an untreated water sample (control).

As seen in FIG. 19, less water is lost due to evaporation when a composition including a mixture of water soluble polymer and water insoluble compound is used. This compares to the control sample (with no film) or the sample with films formed with C18E1 alone, where a greater mass of water is lost due to evaporation.

Example 15

System with Poly(Vinyl Alcohol) and Ethylene Glycol Monostearyl Ether

Individual solutions containing ethylene glycol monostearyl ether (C18E1) in ethanol and poly(vinyl alcohol) (PVA) ($M_w = 8.9 – 9.8 \times 10^4$ g/mol) in water were prepared at concentrations of 1 mg/ml. A composition comprising a blend of C18E1 and poly(vinyl alcohol) (PVA) in desired mole ratios was then prepared by combining aliquots of the individual solutions of C18E1 and poly(vinyl alcohol) in the amounts described in Table K. The mole ratio was calculated on the basis of the functional groups so the molecular weight of the PVA unit was used (44 g/mol).

TABLE K

| Volume C18E1 (ml) | Volume PVA (ml) | Mole ratio (C18E1:PVA) |
|---|---|---|
| 1.00 | 0.14 | 0.5:0.5 |

The composition prepared in accordance with Table K was tested as described in Example 4 at a wind speed of 20 km/hr and compared with a control sample (water only) and with a water sample having a film formed with C18E1 alone. The results are shown in FIG. 20.

Figure 20:
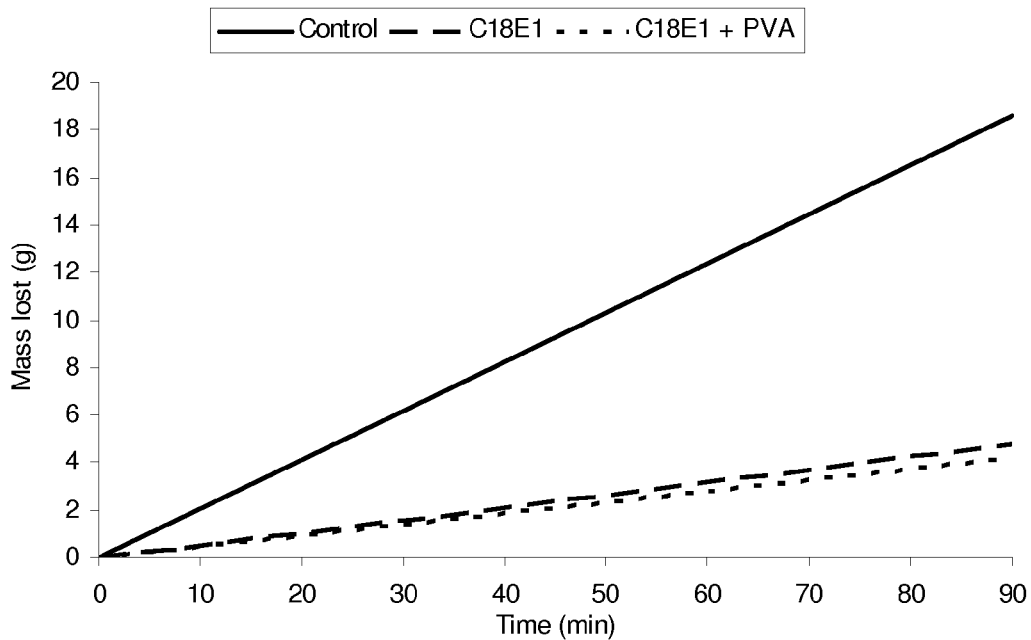
FIG. 20 is a graph illustrating the amount of water lost due to evaporation over time, under exposure to wind, of a system containing poly(vinyl alcohol) (PVA) and ethylene glycol monostearyl ether (C18E1) in accordance with one embodiment of the invention, compared to comparative systems containing ethylene glycol monostearyl ether alone, and an untreated water sample (control).

As seen in FIG. 20, less water is lost due to evaporation when a composition including a water soluble polymer is used. This compares to the control sample (with no film) or the sample with films formed with C18E1 alone, where a greater mass of water is lost due to evaporation.

Example 16

System with Poly(ethylene-alt-maleic Anhydride) and Ethylene Glycol Monostearyl Ether Individual solutions containing ethylene glycol monostearyl ether (C18E1) in ethanol and a copolymer, poly(ethylene-alt-maleic anhydride) (PEMA) ($M_w=1-5\times10^5$ g/mol), in water were prepared at concentrations of 1 mg/ml. A composition comprising a blend of C18E1 and poly(ethylene-alt-maleic anhydride) (PEMA) in the desired mole ratios was then prepared by combining aliquots of the individual solutions of C18E1 and poly(ethylene-alt-maleic anhydride) in the amounts described in Table L. The mole ratios were calculated on the basis of the functional groups so the molecular weight of the PEMA unit was used (126 g/mol). Upon exposure to water, maleic anhydride will convert to maleic acid and therefore there will be two acid groups available on the polymer to interact with each molecule of C18E1.

TABLE L

| Volume C18E1 (ml) | Volume PEMA (ml) | Mole ratio (C18E1:PEMA) |
|---|---|---|
| 1.00 | 0.40 | 0.5:0.5 |

The composition prepared in accordance with Table L was tested as described in Example 4 at a wind speed of 20 km/hr and compared with a control sample (water only) and with a water sample having a film formed with C18E1 alone. The results are shown in FIG. 21.

Figure 21:
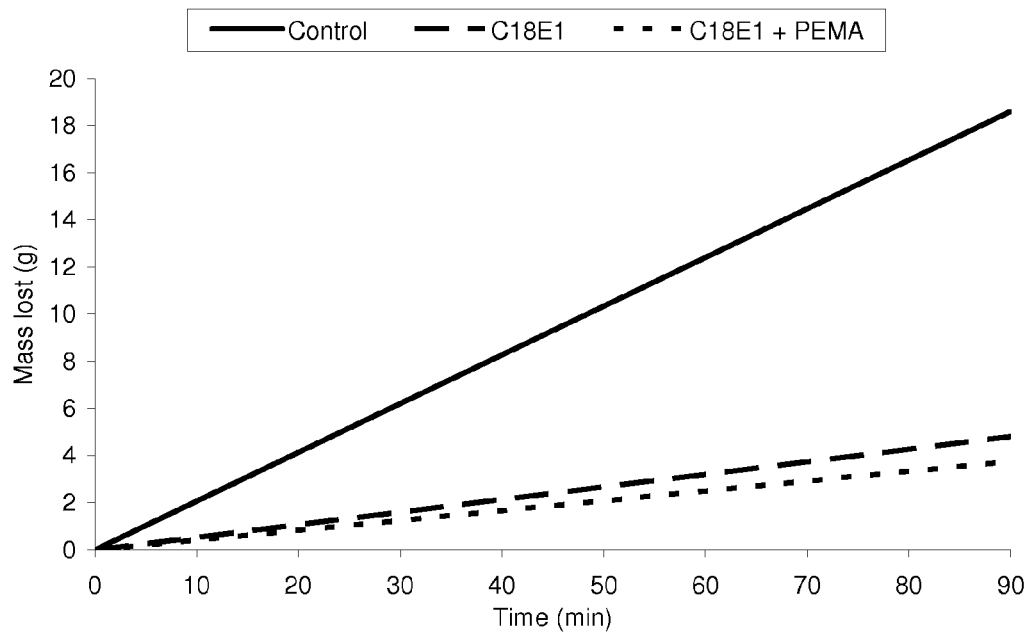
FIG. 21 is a graph illustrating the amount of water lost due to evaporation over time, under exposure to wind, of a system containing poly(ethylene-alt-maleic anhydride) (PEMA) and ethylene glycol monostearyl ether (C18E1) in accordance with one embodiment of the invention, compared to comparative systems containing ethylene glycol monostearyl ether alone, and an untreated water sample (control).

As seen in FIG. 21, less water is lost due to evaporation when a composition including a water soluble copolymer is used. This compares to the control sample (with no film) or the sample with films formed with C18E1 alone, where a greater mass of water is lost due to evaporation.

Example 17

System with Poly(acrylamide-co-acrylic Acid) and Ethylene Glycol Monostearyl Ether Individual solutions containing ethylene glycol monostearyl ether (C18E1) in ethanol and a copolymer, poly(acrylamide-co-acrylic acid) (P(AAm-AA)) ($M_w=5\times10^6$ g/mol, 1.5 wt % acrylic acid), in water were prepared at concentrations of 1 mg/ml. A composition comprising a blend of C18E1 and poly(acrylamide-co-acrylic acid) (P(AAm-AA)) in the desired mole ratio was then prepared by combining aliquots of the individual solutions of ethylene glycol monostearyl ether and poly(acrylamide-co-acrylic acid) in the amounts described in Table M. The mole ratio was calculated on the basis of the acrylamide unit (71 g/mol).

TABLE M

| Volume C18E1 (ml) | Volume P(AAm-AA) (ml) | Mole ratio (C18E1:P(AAm-AA)) |
|---|---|---|
| 1.00 | 0.23 | 0.5:0.5 |

The composition prepared in accordance with Table M was tested as described in Example 4 at a wind speed of 20 km/hr and compared with a control sample (water only with no film) and with a water sample having a film formed with C18E1 alone. The results are shown in FIG. 22.

Figure 22:
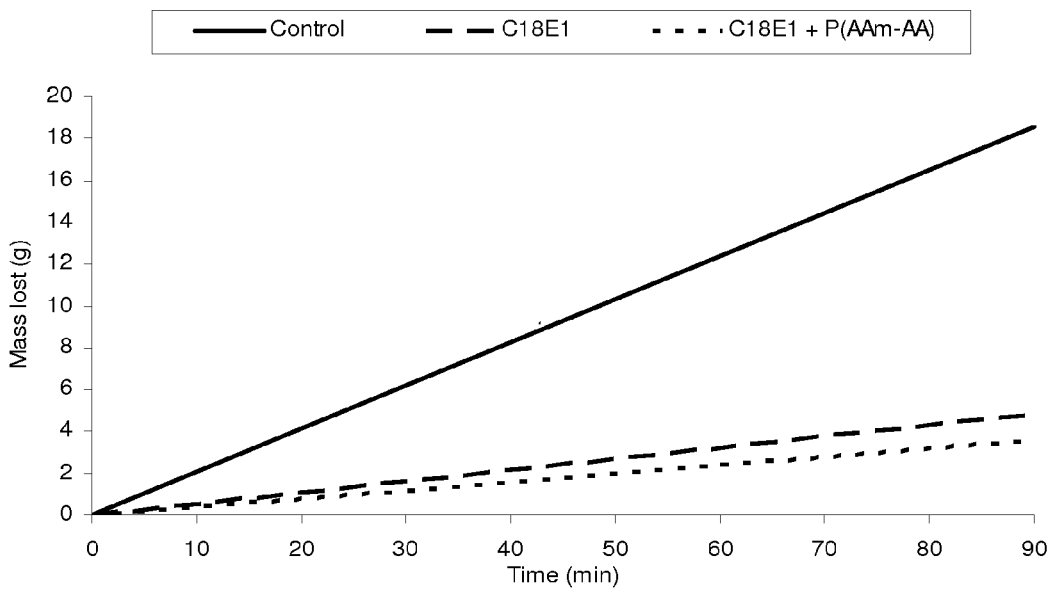
FIG. 22 is a graph illustrating the amount of water lost due to evaporation over time, under exposure to wind, of a system containing poly(acrylamide-co-acrylic acid) (PAAm-AA) and ethylene glycol monostearyl ether (C18E1) in accordance with one embodiment of the invention, compared to comparative systems containing ethylene glycol monostearyl ether alone, and an untreated water sample (control).

As seen in FIG. 22, less water is lost due to evaporation when a composition including a water soluble copolymer is used. This compares to the control sample (with no film) or the sample with films formed with C18E1 alone, where a greater mass of water is lost due to evaporation.

Example 18

System with a Water Soluble Polymer and a Blend of Fatty Alcohols

Individual solutions containing stearyl alcohol (C18OH) in ethanol, cetyl alcohol (C16OH) in ethanol, poly(acrylic acid) (PAA) ($M_w=4\times10^6$ g/mol) in water and poly(vinyl pyrrolidone) (PVP) ($M_w=1.3\times10^6$ g/mol) in water were prepared at concentrations of 1 mg/ml. Compositions comprising a blend of stearyl alcohol (C18OH) and cetyl alcohol (C16OH) together with one polymer selected from poly(acrylic acid) (PAA) or poly(vinyl pyrrolidone) (PVP) in desired mole ratios were then prepared by combining aliquots of the individual solutions in the amounts described in Table N.

TABLE N

| Composition | Vol. C18OH (ml) | Vol. C16OH (ml) | Vol. of polymer (ml) PAA | Vol. of polymer (ml) PVP | Mole ratio (C18OH:C16OH: polymer) |
|---|---|---|---|---|---|
| 18A | 1.00 | 0.90 | 0.53 | — | 0.25:0.25:0.5 |
| 18B | 1.00 | 0.90 | — | 0.82 | 0.25:0.25:0.5 |

The compositions prepared in accordance with Table N were tested as described in Example 4 at a wind speed of 20 km/hr and compared with a control sample (water only with no film) and a sample with a film prepared from a mixture of C18OH and C16OH without polymer. The results are shown in FIG. 23 (with PAA) and FIG. 24 (with PVP).

Figure 23:
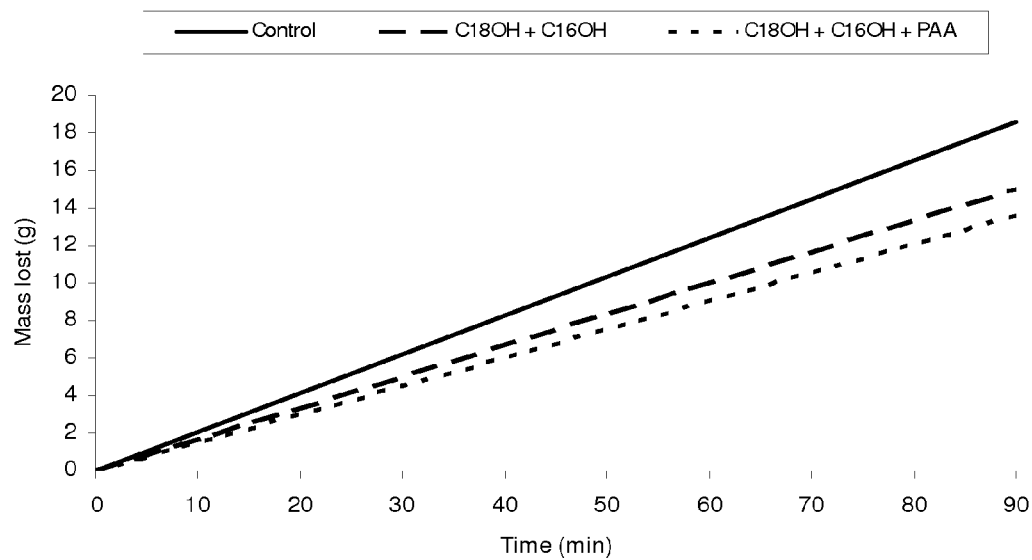
FIG. 23 is a graph illustrating the amount of water lost due to evaporation over time, under exposure to wind, of a system containing poly(acrylic acid) (PAA) and a blend of stearyl alcohol (C18OH) and cetyl alcohol (C16OH) in accordance with one embodiment of the invention, compared to comparative systems containing a blend of stearyl alcohol and cetyl alcohol alone, and an untreated water sample (control).
Figure 24:
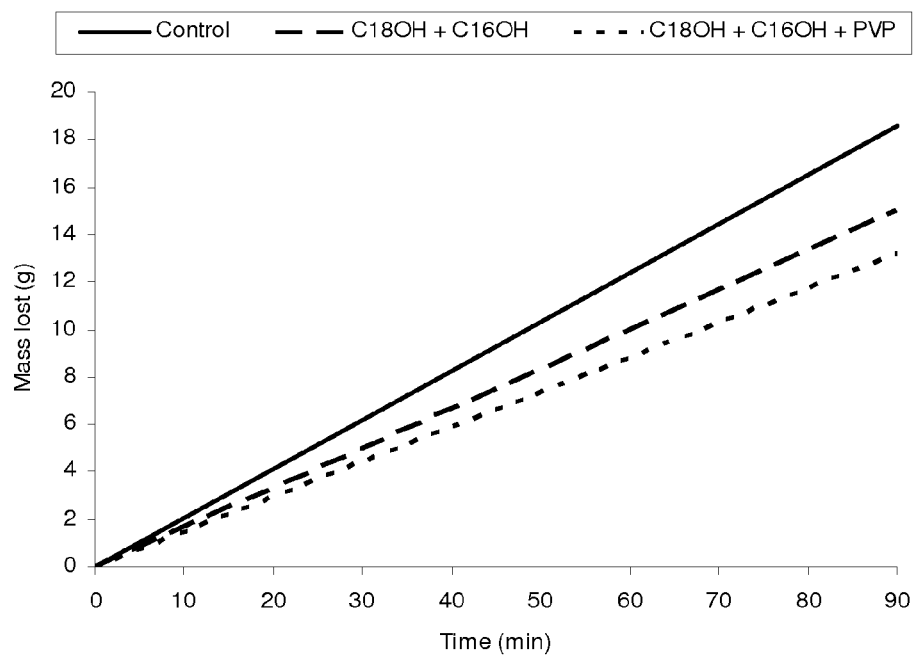
FIG. 24 is a graph illustrating the amount of water lost due to evaporation over time, under exposure to wind, of a system containing poly(vinyl pyrrolidone) (PVP) and a blend of stearyl alcohol (C18OH) and cetyl alcohol (C16OH) in accordance with one embodiment of the invention, compared to comparative systems containing a blend of stearyl alcohol and cetyl alcohol alone, and an untreated water sample (control).

As seen in FIGS. 23 and 24, less water is lost due to evaporation when a composition including a polymer is used. This compares to the control sample (with no film) or the sample with a film formed with the blend of small molecules C18OH and C16OH alone, where a greater mass of water is lost due to evaporation.

Example 19

System with Non-carbonyl Polymers of Varying Molecular Weight and a Mixture of Fatty Alcohols Individual solutions containing stearyl alcohol (C18OH) in ethanol, cetyl alcohol (C16OH) in ethanol and poly(ethylene oxide) (PEO) of different molecular weights ($1\times10^4$ g/mol, $1\times10^5$ g/mol, $4\times10^6$ g/mol and $8\times10^6$ g/mol) in water were prepared at concentrations of 1 mg/ml. Compositions comprising a blend of C18OH, C16OH and poly(ethylene oxide)

(PEO) of different molecular weights in desired mole ratios was then prepared by combining aliquots of the individual solutions in the amounts described in Table O.

TABLE O

| Composition | MW PEO (g/mol) | Volume C18OH (ml) | Volume C16OH (ml) | Volume PEO (ml) | Mole ratio (C18OH: C16OH:PEO) |
|---|---|---|---|---|---|
| 19A | $1 \times 10^4$ | 1.00 | 0.90 | 0.33 | 0.25:0.25:0.5 |
| 19B | $1 \times 10^5$ | 1.00 | 0.90 | 0.33 | 0.25:0.25:0.5 |
| 19C | $4 \times 10^6$ | 1.00 | 0.90 | 0.33 | 0.25:0.25:0.5 |
| 19D | $8 \times 10^6$ | 1.00 | 0.90 | 0.33 | 0.25:0.25:0.5 |

The compositions prepared in accordance with Table O were tested as described in Example 4 at a wind speed of 20 km/hr and compared with a control sample (water only) and a sample with a film of prepared with a blend of C18OH and C16OH without polymer. The results are shown in FIG. 25.

Figure 25:
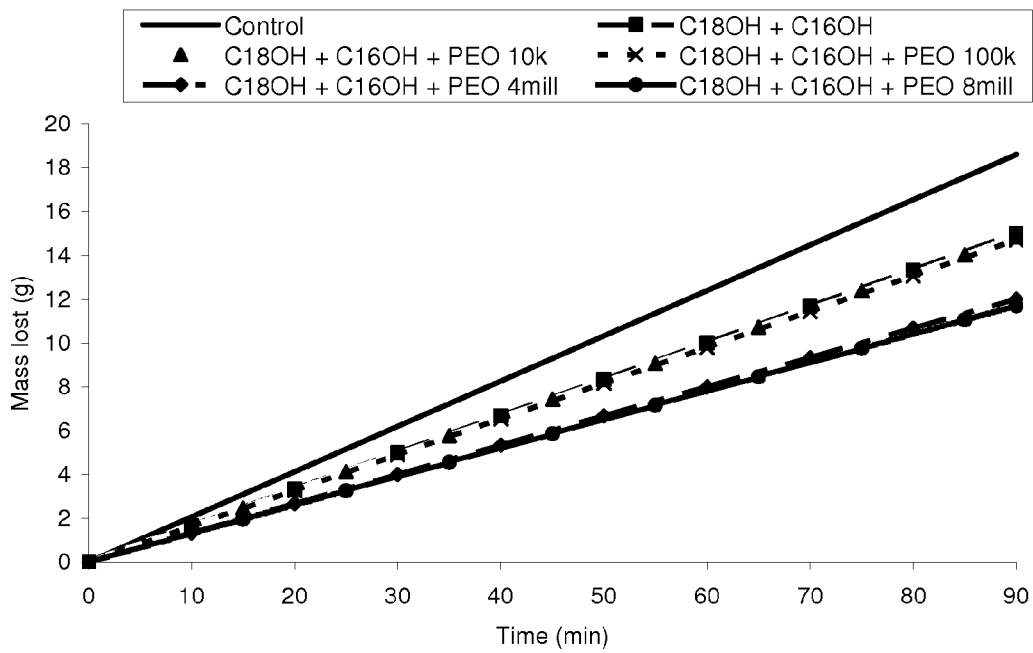
FIG. 25 is a graph illustrating the amount of water lost due to evaporation over time, under exposure to wind, of a system containing poly(ethylene oxide) (PEO) of various molecular weights and stearyl alcohol (C18OH) in accordance with embodiments of the invention, compared to comparative systems containing stearyl alcohol alone, and an untreated water sample (control).

As seen in FIG. 25, less water is lost due to evaporation when a composition including a non-carbonyl polymer of higher molecular weight is used. This compares to the control sample (with no film), the sample with a film formed with the blend of small molecules C18OH and C16OH alone or the samples with a film formed with a blend of small molecules and low molecular weight PEO, where a greater mass of water is lost due to evaporation.

Example 20

System with Poly(Vinyl pyrrolidone-co-methyl Acrylate) and a Mixture of Fatty Alcohols Individual solutions containing stearyl alcohol (C18OH) in ethanol, cetyl alcohol (C16OH) in ethanol and poly(vinyl pyrrolidone-co-methyl acrylate) (P(VP-co-MA)) (75% vinyl pyrrolidone) copolymer in water were prepared at concentrations of 1 mg/ml. A composition comprising a blend of C18OH, C16OH and poly(vinyl pyrrolidone-co-methyl acrylate) (P(VP-co-MA)) in desired mole ratios was then prepared by combining aliquots of the individual solutions in the amounts described in Table P. The average molecular weight for the units was used in the calculations (104.9 g/mol).

TABLE P

| Volume C18OH (ml) | Volume C16OH (ml) | Volume P(VP-co-MA) (ml) | Mole ratio (C18OH:C16OH: P(VP-co-MA)) |
|---|---|---|---|
| 1.00 | 0.90 | 0.78 | 0.25:0.25:0.5 |

The composition prepared in accordance with Table P was tested as described in Example 4 at a wind speed of 20 km/hr and compared with a control sample (water only) and a sample with a film of prepared with a blend of C18OH and C16OH without polymer. The results are shown in FIG. 26.

Figure 26:
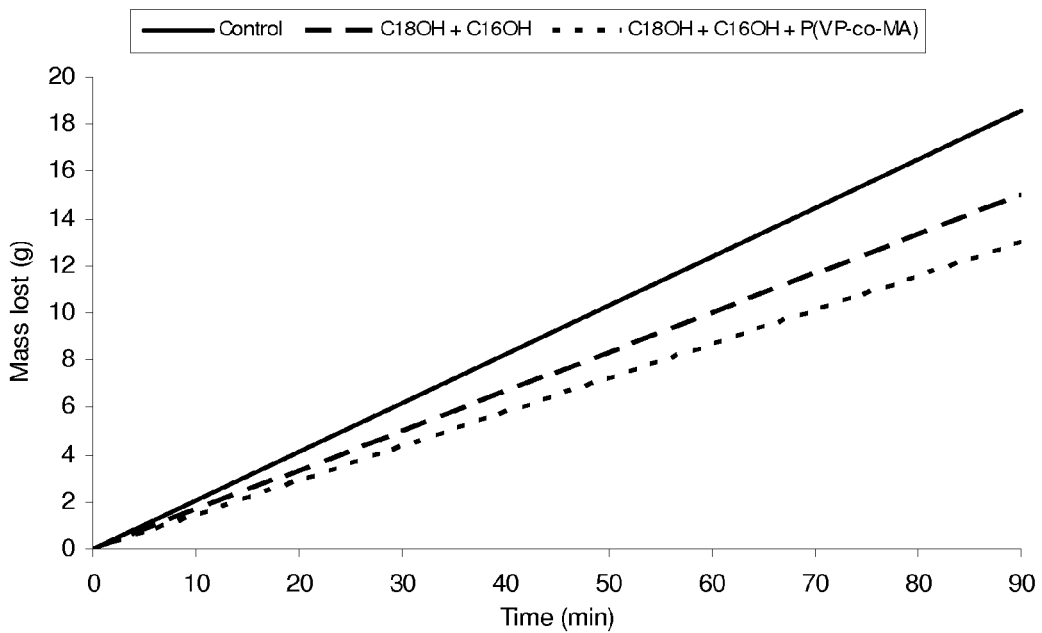
FIG. 26 is a graph illustrating the amount of water lost due to evaporation over time, under exposure to wind, of a system containing poly(vinyl pyrrolidone-co-methyl acrylate) (P(VP-co-MA)) and a blend of stearyl alcohol (C18OH) and cetyl alcohol (C16OH) in accordance with one embodiment of the invention, compared to comparative systems containing a blend of stearyl alcohol (C18OH) and cetyl alcohol (C16OH) alone, and an untreated water sample (control).

As seen in FIG. 26, less water is lost due to evaporation when a composition including a polymer is used. This compares to the control sample (with no film) or the sample with a film formed with the blend of small molecules C18OH and C16OH alone, where a greater mass of water is lost due to evaporation.

Example 21

System with a Mixture of Polymers and a Blend of Fatty Alcohols

Individual solutions containing stearyl alcohol (C18OH) in ethanol, cetyl alcohol (C16OH) in ethanol, poly(acrylic acid) (PAA) ($M_w$=4×10$^6$ g/mol) in water and poly(vinyl pyrrolidone) PVP) ($M_w$=1.3×10$^6$ g/mol) in water were prepared at concentrations of 1 mg/ml. A composition comprising a blend of stearyl alcohol (C18OH), cetyl alcohol (C16OH), poly (acrylic acid) (PAA) and poly(vinyl pyrrolidone) (PVP) in desired mole ratios was then prepared by combining aliquots of the individual solutions in the amounts described in Table Q.

TABLE Q

| Volume C18OH (ml) | Volume C16OH (ml) | Volume PAA (ml) | Volume PVP (ml) | Mole ratio (C18OH:C16OH: PAA:PVP) |
|---|---|---|---|---|
| 1.00 | 0.90 | 0.20 | 0.10 | 0.25:0.25:0.375:0.125 |

The composition prepared in accordance with Table Q was tested at a wind speed of 17 km/hr and compared with a control sample (water only) and a sample with a film prepared using a mixture C18OH and C16OH without polymer. The results are shown in FIG. 27.

Figure 27:
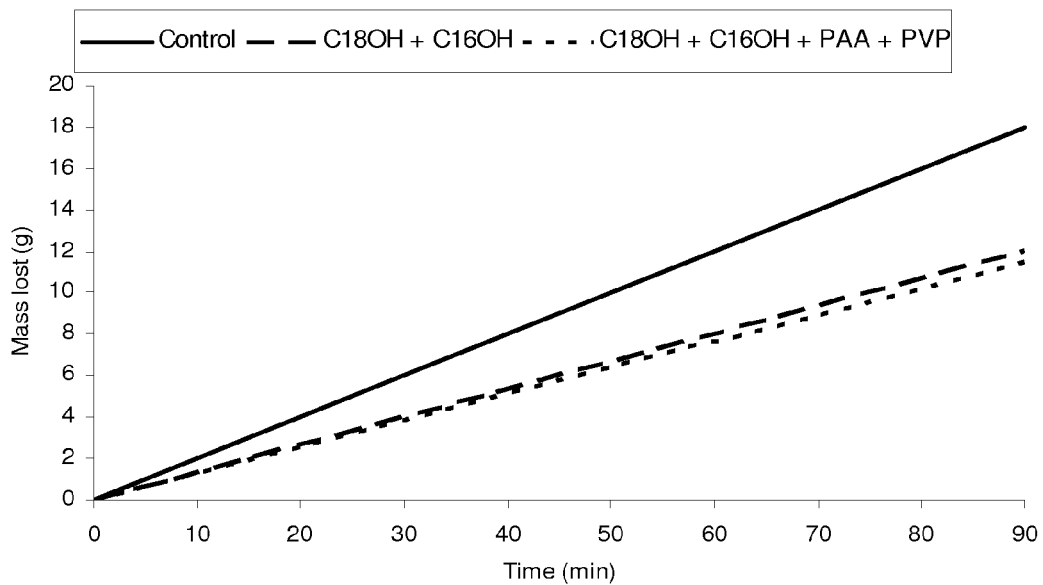
FIG. 27 is a graph illustrating the amount of water lost due to evaporation over time, under exposure to wind, of a system containing poly(vinyl pyrrolidone) (PVP) and poly(acrylic acid) (PAA) and a blend of stearyl alcohol (C18OH) and cetyl alcohol (C16OH) in accordance with one embodiment of the invention, compared to comparative systems containing a blend of stearyl alcohol (C18OH) and cetyl alcohol (C16OH) alone, and an untreated water sample (control).

As seen in FIG. 27, less water is lost due to evaporation when a composition including a polymer is used. This compares to the control sample (with no film) or the sample with a film formed with the blend of small molecules C18OH and C16OH alone, where a greater mass of water is lost due to evaporation.

Example 22

System with Poly(Vinyl Alcohol) and a Mixture of Fatty Alcohols

Individual solutions containing stearyl alcohol (C18OH) in ethanol, cetyl alcohol (C16OH) in ethanol and poly(vinyl alcohol) (PVA) ($M_w$=8.9–9.8×10$^4$ g/mol) in water were prepared at concentrations of 1 mg/ml. A composition comprising a blend of stearyl alcohol (C18OH), cetyl alcohol (C16OH) and poly(vinyl alcohol) (PVA) in desired mole ratios were then prepared by combining aliquots of the individual solutions in the amounts described in Table R.

TABLE R

| Volume C18OH (ml) | Volume C16OH (ml) | Volume PVA (ml) | Mole ratio (C18OH:C16OH:PVA) |
|---|---|---|---|
| 1.00 | 0.90 | 0.32 | 0.25:0.25:0.5 |

The composition prepared in accordance with Table R was tested at a wind speed of 20 km/hr and compared with a control sample (water only with no film) and a sample with a film prepared with a mixture of C18OH and C16OH without polymer. The results are shown in FIG. 28.

Figure 28:
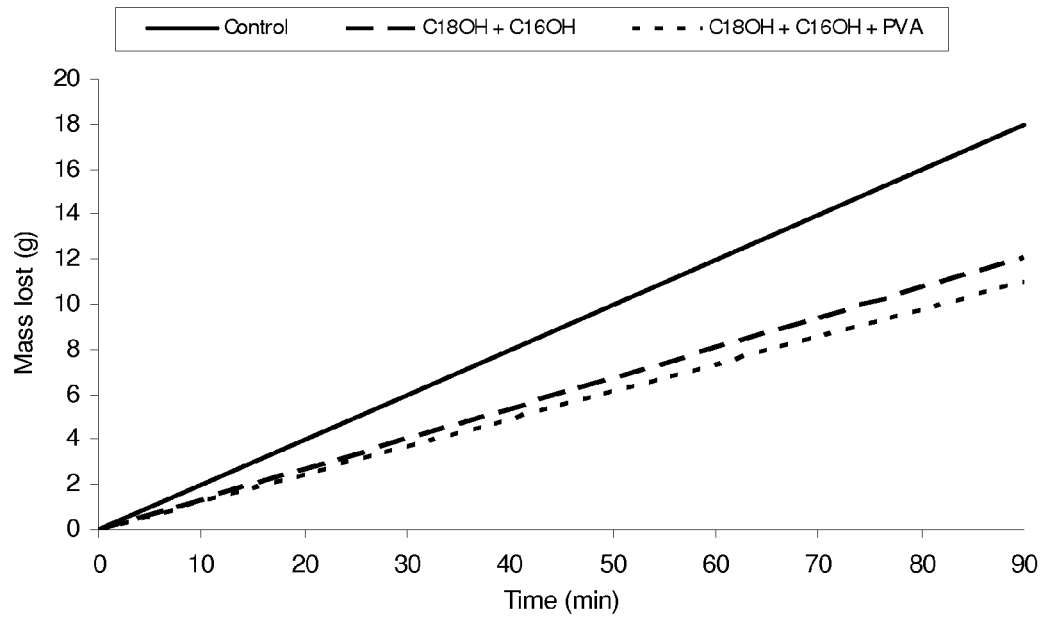
FIG. 28 is a graph illustrating the amount of water lost due to evaporation over time, under exposure to wind, of a system containing poly(vinyl alcohol) (PVA) and a blend of stearyl alcohol (C18OH) and cetyl alcohol (C16OH) in accordance with one embodiment of the invention, compared to comparative systems containing a blend of stearyl alcohol (C18OH) and cetyl alcohol (C16OH) alone, and an untreated water sample (control).

As seen in FIG. 28, less water is lost due to evaporation when a composition including a polymer is used. This compares to the control sample (with no film) or the sample with a film formed with the blend of small molecules C18OH and C16OH alone, where a greater mass of water is lost due to evaporation.

It is understood that various other modifications and/or alterations may be made without departing from the spirit of the present invention as outlined herein.

The invention claimed is:

1. A method for controlling evaporation from a body of water including applying a water insoluble compound and a water soluble polymer including at least one polymer selected from the group consisting of (i) carbonyl polymers including at least one functional group having a carbonyl moiety and (ii) non-carbonyl polymers having a molecular weight of at least about 5000 to the body of water, wherein the water insoluble compound assembles to form a layer at the surface of the body of water and the water soluble polymer is adapted to interact with the water insoluble compound by non-covalent bonding interactions, and wherein the water soluble polymer includes less than 10% (w/w) of water soluble ionized polymers.

2. The method according to claim 1 wherein the water soluble polymer includes a carbonyl polymer including at least one functional group selected from the group consisting of carboxylic acid, ketone, aldehyde, ester and amide functional groups.

3. The method according to claim 1 wherein the water soluble polymer includes a non-carbonyl polymer including at least one functional group selected from the group consisting of alcohol, ether, amine, imine and thiol functional groups.

4. The method according to claim 1 wherein the water soluble polymer includes a mixture of (i) at least one carbonyl polymer including at least one functional group having a carbonyl moiety and (ii) at least one non-carbonyl polymer having a molecular weight of at least about 5000, wherein the mixture includes less than 10% (w/w) of water soluble ionized polymers.

5. The method according to claim 1 wherein the water soluble polymer includes a non-carbonyl polymer having a molecular weight of at least about 10,000, preferably at least about 100,000.

6. The method according to claim 1 wherein the water soluble polymer includes a homopolymer or copolymer derived from at least one compound selected from the group consisting of acrylic acid, methacrylic acid, acrylamide, N-alkyl acrylamide, glycerol, ethyleneimine, ethylene oxide, vinyl pyrrolidone, vinyl acetate, the hydrolysis products of vinyl acetate, 2-hydroxyethyl acrylate, maleic acid, maleic anhydride and dimethylaminoethylacrylate.

7. The method according to claim 1 wherein the water soluble polymer includes at least one polymer selected from:
(i) carbonyl polymers selected from the group consisting of poly(acrylic acid), poly(methacrylic acid), poly(acrylic acid-co-methacrylic acid), copolymers of maleic acid, poly(acrylamide), poly(acrylamide-co-acrylic acid), poly(vinyl pyrrolidone), poly(N-alkylacrylamide), poly(N-alkylmethacrylamide) and poly(dimethylaminoethylacrylate); and
(ii) non-carbonyl polymers selected from the group consisting of poly(glycerol), poly(ethyleneimine), poly(ethylene glycol) and poly(vinyl alcohol).

8. The method according to claim 1 wherein the water insoluble compound is at least one selected from the group consisting of fatty acids, fatty alcohols, fatty amides and alkylene glycol monoethers of a fatty alcohol.

9. The method according to claim 1 wherein the water insoluble compound is of Formula (I):

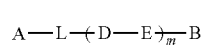
(I)

where
A is a hydrophobic moiety including at least 12 carbon atoms;

L is selected from the group consisting of a bond, O, NR, S, COO, OCO, COS, SCO, S=O, $SO_2$, $O_2P(=O)(OH)$, NRCO, CONR, O(C=O)NR, NR(C=O)O and NR(C=O)NR;

D is an alkylene including at least one carbon atom;

E is selected from the group consisting of a bond, O, $NR^1$, S, COO, OCO, COS, SCO, S=O, $SO_2$, $O_2P(=O)(OH)$, $NR^1CO$, $CONR^1$, $O(C=O)NR'$, $NR^1(C=O)O$ and $NR^1(C=O)NR^1$;

R at each occurrence is independently selected from the group consisting of H, $C_1$ to $C_4$ alkyl and the group $-(D-E)_m-B$;

$R^1$ is selected from the group consisting of H and $C_1$ to $C_4$ alkyl;

B is selected from the group consisting of hydrogen, $C_1$ to $C_4$ alkyl and a hydrophilic moiety including at least one hydrophilic functional group; and m is 0,1,2,3 or 4.

10. The method according to claim 9 wherein m is 0 or 1.

11. The method according to claim 9 wherein D includes from between 2 to 6 carbon atoms.

12. The method according to claim 9 wherein E is selected from the group consisting of a bond, O, NR, COO and OCO.

13. The method according to claim 9 wherein the group D-E at each occurrence is an alkyleneoxy group.

14. The method according to claim 9 wherein the water insoluble compound is of Formula (II):

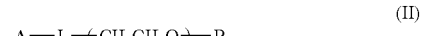
(II)

where
A is a hydrophobic moiety including at least 12 carbon atoms;

L is O;

B is selected from the group consisting of hydrogen, $C_1$ to $C_4$ alkyl and a hydrophilic moiety including at least two hydrophilic functional groups; and m is 0, 1, 2, 3 or 4.

15. The method according to claim 9 wherein the water insoluble compound is of Formula (V):

(V)

where
n is 15 to 21; and the group $-L-(D-E)_m-B$ is selected from the group consisting of:

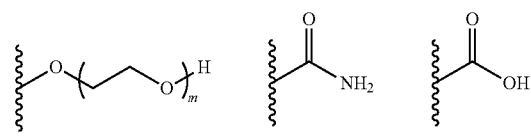

-continued

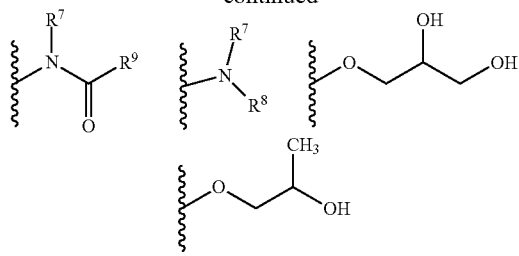

where
R$^7$ and R$^8$ are independently selected from the group consisting of H and C$_1$ to C$_4$ alkyl;
R$^9$ is C$_1$ to C$_4$ alkyl; and
m is 0,1,2,3 or 4.

16. The method according to claim 9 wherein A is a saturated C$_{12}$ to C$_{22}$ alkyl chain.

17. The method according to claim 9 wherein the water insoluble compound is selected from the group consisting of cetyl alcohol, stearyl alcohol, arachidyl alcohol, behenyl alcohol, ethylene glycol monocetyl ether, ethylene glycol monostearyl ether, ethylene glycol monoarachidyl alcohol, ethylene glycol monobehenyl alcohol, and mixtures thereof.

18. The method according to claim 1 wherein the water insoluble compound and the water soluble polymer are applied to the body of water in amounts to provide a mole ratio of the water insoluble compound to the functional groups of the water soluble polymer in the range of from about 0.01:1 to 1:0.01.

19. The method according to claim 1 wherein the water insoluble compound and the water soluble polymer are applied to the body of water in admixture, where the admixture includes the water insoluble compound and the water soluble polymer in mutual association through non-covalent bonding interactions.

20. The method according to claim 19 wherein the water insoluble compound and the water soluble polymer are formulated in a composition and the composition is contained in a buoyant dispenser comprising a housing containing the composition and having one or more openings for providing controlled application of the composition to the body of water.

* * * * *